United States Patent
Abe et al.

(10) Patent No.: US 11,297,322 B2
(45) Date of Patent: Apr. 5, 2022

(54) ENCODER, DECODER, ENCODING METHOD, AND DECODING METHOD

(71) Applicant: Panasonic Intellectual Property Corporation of America, Torrance, CA (US)

(72) Inventors: Kiyofumi Abe, Osaka (JP); Takahiro Nishi, Nara (JP); Takashi Hashimoto, Hyogo (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/141,849

(22) Filed: Jan. 5, 2021

(65) Prior Publication Data

US 2021/0127114 A1    Apr. 29, 2021

Related U.S. Application Data

(63) Continuation of application No. 16/269,018, filed on Feb. 6, 2019, now Pat. No. 10,951,896, which is a
(Continued)

(51) Int. Cl.
*H04N 19/13* (2014.01)
*H04N 19/157* (2014.01)
(Continued)

(52) U.S. Cl.
CPC .......... *H04N 19/13* (2014.11); *H04N 19/157* (2014.11); *H04N 19/18* (2014.11); *H04N 19/91* (2014.11)

(58) Field of Classification Search
CPC ...... H04N 19/13; H04N 19/157; H04N 19/18; H04N 19/91
See application file for complete search history.

(56) References Cited

U.S. PATENT DOCUMENTS

9,224,187 B2    12/2015 Cote
9,654,139 B2    5/2017 Kim
(Continued)

FOREIGN PATENT DOCUMENTS

CN    102497546    6/2012

OTHER PUBLICATIONS

International Search Report dated Sep. 19, 2017 in International (PCT) Application No. PCT/JP2017/028395.
(Continued)

*Primary Examiner* — James M Pontius
(74) *Attorney, Agent, or Firm* — Wenderoth, Lind & Ponack, L.L.P.

(57) ABSTRACT

An encoder includes memory and circuitry accessible to the memory. The circuitry accessible to the memory: switches whether or not to apply arithmetic encoding to a binary data string in which image information has been binarized; binarizes frequency transform coefficient information according to different binarization formats between when arithmetic encoding is applied to the binary data string and when arithmetic encoding is not applied to the binary data string; and binarizes a part or the entirety of prediction parameter information according to a binarization format which is common between when arithmetic encoding is applied to the binary data string and when arithmetic encoding is not applied to the binary data string.

5 Claims, 38 Drawing Sheets

Related U.S. Application Data continuation of application No. PCT/JP2017/028395, filed on Aug. 4, 2017.

(60) Provisional application No. 62/372,881, filed on Aug. 10, 2016.

(51) Int. Cl.
  *H04N 19/91* (2014.01)
  *H04N 19/18* (2014.01)

(56) References Cited

U.S. PATENT DOCUMENTS

| | | | |
|---|---|---|---|
| 10,447,510 B1 | 10/2019 | Rengarajan | |
| 2013/0188734 A1* | 7/2013 | Kim | H04N 19/21 375/240.25 |
| 2014/0192861 A1 | 7/2014 | Chuang | |
| 2015/0091927 A1 | 4/2015 | Cote | |
| 2016/0330471 A1 | 11/2016 | Zhu | |
| 2019/0174132 A1 | 6/2019 | Abe | |
| 2019/0174133 A1 | 6/2019 | Abe | |
| 2019/0191160 A1 | 6/2019 | Abe | |
| 2020/0014955 A1 | 1/2020 | Grangetto | |

OTHER PUBLICATIONS

H.265 (ISO/IEC 23008-2 HEVC (High Efficiency Video Coding)), Dec. 1, 2013.

Lainema J. et al: "Single entropy coder for HEVC with a high throughput binarization mode", Joint Collaborative Team on Video Coding (JCT-VC) of ITU-T SG16 WP3 and ISO/IEC JTC1/SC29/WG11, JCTVC-G569, Nov. 8, 2011, XP030110553.

Extended European Search Report dated Apr. 26, 2019 in corresponding European Patent Application No. 17839362.5.

Official Communication dated Feb. 18, 2020 in corresponding European Patent Application No. 17839362.5.

Khaled Mamou et al., "Frame-based Animated Mesh Compression: integration of the CABAC arithmetic encoder", International Organization for Standardization, Apr. 2007.

Search Report and Office Action dated Jul. 13, 2021 in corresponding Taiwanese Patent Application No. 106126758.

Marpe, Detlev et al., "The H.264/MPEG4 Advanced Video Coding Standard and its Applications", IEEE Communications Magazine, Aug. 2006, http://iphome.hhi.de/wiegand/assets/pdfs/h264-AVC-Standard.pdf.

Office Action dated Dec. 23, 2020 in corresponding Chinese Patent Application No. 201780044739.4, with English language search report.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

16×16 FREQUENCY TRANSFORM BLOCK

4×4 CURRENT BASIC BLOCK = 4×4 SPECIFIC BASIC BLOCK

4×4 BASIC BLOCK

THE NUMBER OF NON-ZERO COEFFICIENTS IN PRECEDING BASIC BLOCK

| PREDICTION VALUE RANGE | TABLE TO BE SELECTED |
|---|---|
| 0 - 1 | TABLE B1 |
| 2 - 3 | TABLE B2 |
| 4 - 7 | TABLE B3 |
| 8 - 16 | TABLE B4 |

LARGEST VALUE

| PREDICTION VALUE RANGE | TABLE TO BE SELECTED |
|---|---|
| 0 - 1 | TABLE B1 |
| 2 - 3 | TABLE B2 |
| 4 - 7 | TABLE B3 |
| 8 - 16 | TABLE B4 |

FIG. 23

ESTIMATED BASED ON
NEIGHBORING FREQUENCY BLOCK ↓

| PREDICTION VALUE RANGE | TABLE TO BE SELECTED |
|---|---|
| 0 - 1 | TABLE B1 |
| 2 - 3 | TABLE B2 |
| 4 - 7 | TABLE B3 |
| 8 - 16 | TABLE B4 |

FIG. 24

| CODING MODE | TABLE TO BE SELECTED |
|---|---|
| INTER PREDICTION | TABLE B1 |
| INTRA PREDICTION | TABLE B2 |

FIG. 25

| QP VALUE RANGE | TABLE TO BE SELECTED |
|---|---|
| 0 - 21 | TABLE B4 |
| 22 - 31 | TABLE B3 |
| 32 - 41 | TABLE B2 |
| 42 - 51 | TABLE B1 |

FIG. 26

```
residual_coding( log2TrafoSize ) {
    if( log2TrafoSize > 2 ) last_sub_block_pos
    for( i = last_sub_block_pos; i >= 0; i-- ) {
        coeff_tolken
        if( TotalCoeff( coeff_token ) == 0 ) return
        if( TotalCoeff( coeff_token ) < 16 ) zerosLeft = total_zeros
        for( i = TotalCoeff( coeff_token ) - 1; i > 0; i-- ) {
            if( zerosLeft > 0 ) run[ i ] = run_before[ i ]
            zerosLeft = zerosLeft - run[ i ]
        }
        run[ 0 ] = zerosLeft
        for( n = 15; n >= 0; n-- ) {
            sig_coeff_flag[ n ] = RunToSigCoeffFlag( run, n )
            if( sig_coeff_flag[ n ] ) coeff_sign_flag[ n ]
        }
        for( n = 15; n >= 0; n-- ) {
            if( sig_coeff_flag[ n ] ) {
                cnt++
                if( cnt <= TrailingOnes( coeff_token ) ) {
                    TransCoeffLevel[ n ] = 1 - 2 * coeff_sign_flag[ n ]
                } else {
                    baseLevel = ( ( cnt == TrailingOnes( coeff_token ) + 1 ) && (TrailingOnes( coeff_token ) < 3) ) ? 2 : 1
                    TransCoeffLevel[ n ] = ( coeff_abs_level_remaining[ n ] + baseLevel ) * ( 1 - 2 * coeff_sign_flag[ n ] )
                }
            }
        }
    }
}
```

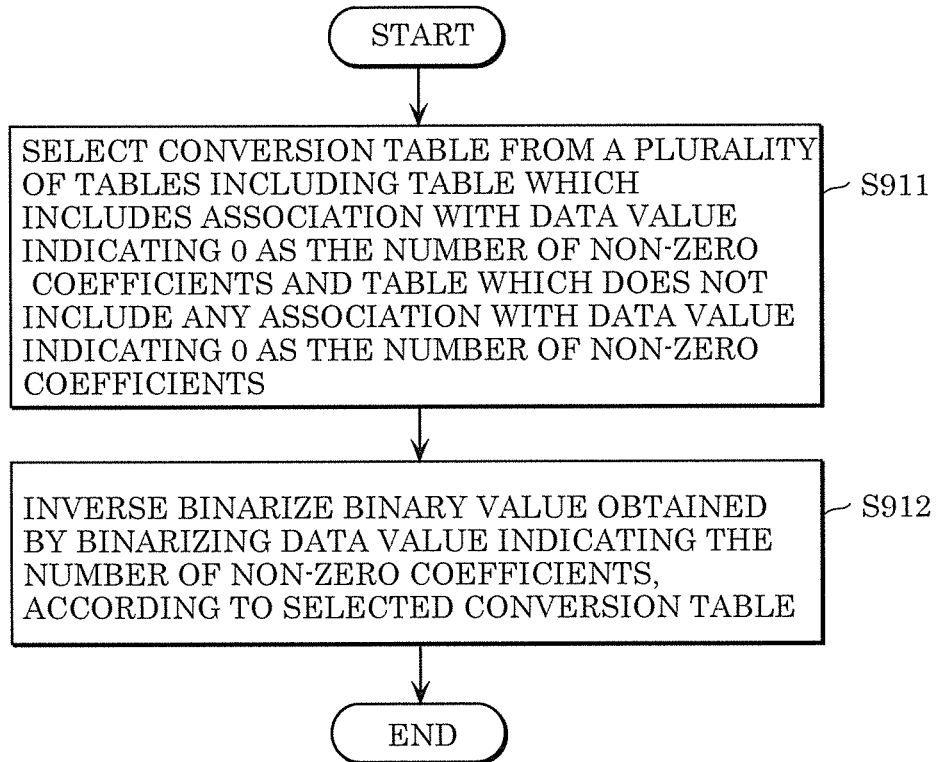
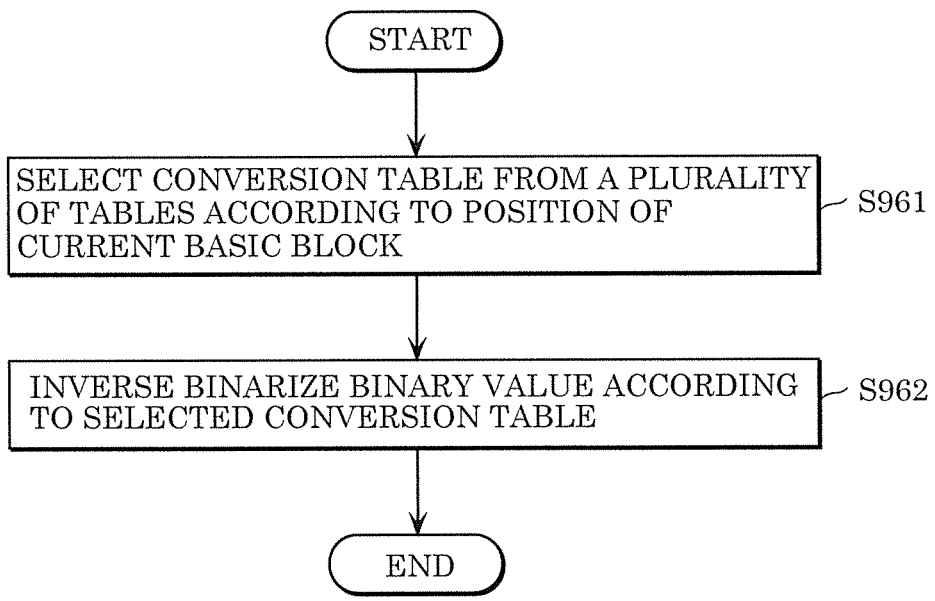

ENCODER, DECODER, ENCODING METHOD, AND DECODING METHOD

CROSS REFERENCE TO RELATED APPLICATIONS

This application is a continuation of U.S. application Ser. No. 16/269,018, filed Feb. 6, 2019, which is a U.S. continuation application of PCT International Patent Application Number PCT/JP2017/028395 filed on Aug. 4, 2017, claiming the benefit of priority of U.S. Patent Application No. 62/372,881 filed on Aug. 10, 2016, the entire contents of which are hereby incorporated by reference.

BACKGROUND

1. Technical Field

The present disclosure relates to an encoder which encodes image information, and to others.

2. Description of the Related Art

In H.265 (ISO/IEC 23008-2 HEVC (High Efficiency Video Coding)) which is a conventional encoding method, image information including frequency transform coefficient information related to frequency components of an image is encoded.

SUMMARY

However, the coding amount of frequency transform coefficient information significantly affects the total coding amount of image information. Accordingly, if the frequency transform coefficient information is not appropriately processed, the total coding amount of the image information may increase.

In view of this, the present disclosure provides an encoder capable of appropriately processing frequency transform coefficient information, and so on.

An encoder according to an aspect of the present disclosure is an encoder which encodes image information and outputs a bitstream in which the image information has been encoded, the encoder including: memory; and circuitry accessible to the memory wherein the circuitry accessible to the memory: binarizes the image information; switches whether or not to apply arithmetic encoding to a binary data string in which the image information has been binarized; when arithmetic encoding is applied to the binary data string, applies arithmetic encoding to the binary data string, and outputs the bitstream which includes the binary data string to which arithmetic encoding has been applied; when arithmetic encoding is not applied to the binary data string, skips applying arithmetic encoding to the binary data string, and outputs the bitstream which includes the binary data string to which arithmetic encoding has not been applied; when binarizing the image information, binarizes frequency transform coefficient information which is related to frequency components of an image and included in the image information, according to different binarization formats between when arithmetic encoding is applied to the binary data string and when arithmetic encoding is not applied to the binary data string; and when binarizing the image information, binarizes a part or an entirety of prediction parameter information which is related to prediction methods of the image and included in the image information, according to a common binarization format between when arithmetic encoding is applied to the binary data string and when arithmetic encoding is not applied to the binary data string.

These general and specific aspects may be implemented using a system, an apparatus, a method, an integrated circuit, a computer program, or a computer-readable recording medium such as a CD-ROM, or any combination of systems, apparatuses, methods, integrated circuits, computer programs, or computer-readable recording media.

The encoder, etc. according to an aspect of the present disclosure enables appropriate processing of frequency transform coefficient information.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 23 is a relationship diagram indicating tables to be selected for a neighboring frequency transform block in the third pattern according to Embodiment 1.

FIG. 24 is a relationship diagram indicating tables to be selected in the coding mode in the third pattern according to Embodiment 1.

FIG. 25 is a relationship diagram indicating tables to be selected based on quantization parameters in the third pattern according to Embodiment 1.

FIG. 26 is a data diagram indicating a syntax structure according to Embodiment 1.

FIG. 41 is a flowchart indicating inverse binarization processing in the example of the third decoding operation performed by the decoder according to Embodiment 1.

FIG. 42 is a flowchart indicating inverse binarization processing in the example of the fourth decoding operation performed by the decoder according to Embodiment 1.

DETAILED DESCRIPTION OF THE EMBODIMENTS

Figure 1:
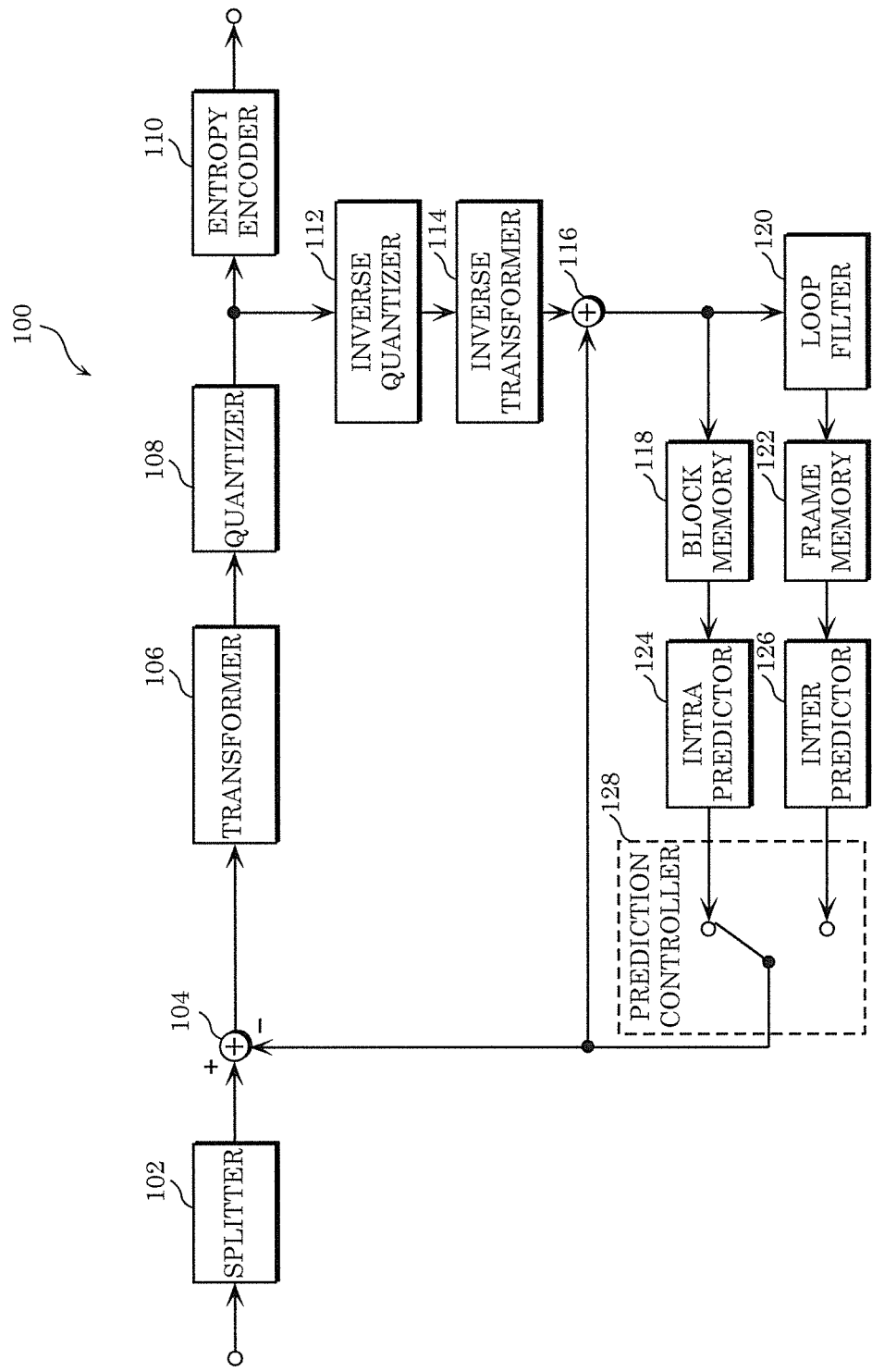
FIG. 1 is a block diagram illustrating a functional configuration of an encoder according to Embodiment 1.

Underlying Knowledge Forming Basis of the Present Disclosure

In H.265 which is a conventional encoding method, arithmetic encoding is used to encode image information efficiently. Specifically, a context-based adaptive binary arithmetic coding method referred to as CABAC is employed.

For example, in the context-based adaptive binary arithmetic coding method, multi-value signals are converted, by binarization, into a binary data string which is a data string in which each of values are represented as 0 or 1. According to context such as a data type, or the like, an occurrence probability of 0 or 1 is selected from a plurality of predetermined occurrence probabilities, and binary arithmetic encoding is applied to the binary data string according to the selected occurrence probability. The occurrence probability is updated according to the value of 0 or 1 included in the binary data string.

In other words, in the context-based adaptive binary arithmetic coding method, binary arithmetic encoding is performed according to a variable occurrence probability. In addition, in the context-based adaptive binary arithmetic coding method, data having a particular data type, or the like is binary arithmetic encoded according to a fixed occurrence probability.

Furthermore, in H.265, image information including frequency transform coefficient information is encoded. The frequency transform coefficient information is information related to frequency components of an image, and is suitable for processing such as encoding and decoding of the image. However, the coding amount of the frequency transform coefficient information significantly affects the total coding amount of the image information. Accordingly, if the frequency transform coefficient information is not appropriately encoded, the total coding amount of the image information may increase.

In view of this, an encoder according to an aspect of the present disclosure is an encoder which encodes image information and outputs a bitstream in which the image information has been encoded, the encoder including: memory; and circuitry accessible to the memory, wherein the circuitry accessible to the memory: binarizes the image information; switches whether or not to apply arithmetic encoding to a binary data string in which the image information has been binarized; when arithmetic encoding is applied to the binary data string, applies arithmetic encoding to the binary data string, and outputs the bitstream which includes the binary data string to which arithmetic encoding has been applied; when arithmetic encoding is not applied to the binary data string, skips applying arithmetic encoding to the binary data string, and outputs the bitstream which includes the binary data string to which arithmetic encoding has not been applied; when binarizing the image information, binarizes frequency transform coefficient information which is related to frequency components of an image and included in the image information, according to different binarization formats between when arithmetic encoding is applied to the binary data string and when arithmetic encoding is not applied to the binary data string; and when binarizing the image information, binarizes a part or an entirety of prediction parameter information which is related to prediction methods of the image and included in the image information, according to a common binarization format between when arithmetic encoding is applied to the binary data string and when arithmetic encoding is not applied to the binary data string.

In this way, the encoder is capable of skipping arithmetic encoding, Accordingly, the encoder is capable of supporting reduction in processing delay generated by arithmetic encoding. Furthermore, the encoder is capable of appropriately binarizing the frequency transform coefficient information which significantly affects the total coding amount, according to the binarization formats which are different depending on whether or not arithmetic encoding is applied. Accordingly, the encoder is capable of appropriately encoding the frequency transform coefficient information, thereby being able to reduce increase in the total coding amount.

For example, the circuitry may binarize at least one of the following kinds of information included in the prediction parameter information: information related to coding modes, information related to prediction directions in intra prediction, information related to reference pictures in inter prediction, and information related to motion vectors in inter prediction, according to the common binarization format between when arithmetic encoding is applied to the binary data string and when arithmetic encoding is not applied to the binary data string.

In this way, the encoder is capable of efficiently binarizing the at least part of information included in the prediction parameter information according to the common binarization format.

For example, the circuitry may binarize the following kinds of information included in the prediction parameter information: information related to coding modes, information related to prediction directions in intra prediction, information related to reference pictures in inter prediction, and information related to motion vectors in inter prediction, according to the common binarization format between when arithmetic encoding is applied to the binary data string and when arithmetic encoding is not applied to the binary data string.

In this way, the encoder is capable of efficiently binarizing the various kinds of information included in the prediction parameter information according to the common binarization format.

In addition, for example, when binarizing the image information, the circuitry may binarize only the frequency transform coefficient information in the image information according to the different binarization formats, and may binarize all information other than the frequency transform coefficient information in the image information according to the common binarization format.

In this way the encoder is capable of binarizing all of the information other than the frequency transform coefficient information, according to the common binarization format. Accordingly, the processing is simplified.

In addition, for example, when binarizing the image information, the circuitry may binarize the frequency transform coefficient information according to a format which generates a smaller number of bits when arithmetic encoding is not applied to the binary data string than when arithmetic encoding is applied to the binary data string.

In this way, the encoder is capable of assisting reduction in coding amount of the frequency transform coefficient information when arithmetic encoding is not applied.

Furthermore, a decoder according to an aspect of the present disclosure is a decoder which obtains a bitstream in which image information has been encoded and decodes the image information, the decoder including: memory; circuitry accessible to the memory, wherein the circuitry accessible to the memory: obtains the bitstream which includes a binary data string in which the image information has been binarized; switches whether or not to apply arithmetic decoding to the binary data string included in the bitstream; when arithmetic decoding is applied to the binary data string, applies arithmetic decoding to the binary data string, and inverse binarizes the binary data string to which arithmetic decoding has been applied, to decode the image information; when arithmetic decoding is not applied to the binary data string, skips applying arithmetic decoding to the binary data string, and inverse binarizes the binary data string to which arithmetic decoding has not been applied, to decode the image information; when inverse binarizing the binary data string, inverse binarizes a first portion which is included in the binary data string and in which frequency transform coefficient information related to frequency components of an image has been binarized, according to different inverse binarization formats between when arithmetic decoding is applied to the binary data string and when arithmetic decoding is not applied to the binary data string; and when inverse binarizing the binary data string, inverse binarizes a second portion which is included in the binary data string and in which a part or an entirety of prediction parameter information related to prediction methods of an image has been binarized, according to a common inverse binarization format between when arithmetic decoding is applied to the binary data string and when arithmetic decoding is not applied to the binary data string.

In this way, the decoder is capable of skipping arithmetic decoding. Accordingly, the decoder is capable of supporting reduction in processing delay generated by the arithmetic decoding. Furthermore, the decoder is capable of appropriately inverse binarizing the first portion in which the frequency transform coefficient information which significantly affects the total coding amount has been binarized, according to whether or not arithmetic decoding is applied. Accordingly, the decoder is capable of appropriately decoding the frequency transform coefficient information, thereby being able to reduce increase in the total coding amount.

For example, the circuitry may inverse binarize the second portion in which at least one of the following kinds of information included in the prediction parameter information has been binarized: information related to coding modes; information related to prediction directions in intra prediction; information related to reference pictures in inter prediction; and information related to motion vectors in inter prediction, according to the common inverse binarization format between when arithmetic decoding is applied to the binary data string and when arithmetic decoding is not applied to the binary data string.

In this way, the decoder is capable of efficiently inverse binarizing the portion in which the at least part of information included in the prediction parameter information has been binarized, according to the common inverse binarization format.

In addition, for example, the circuitry may inverse binarize the second portion in which the following kinds of information included in the prediction parameter information have been binarized: information related to coding modes, information related to prediction directions in intra prediction, information related to reference pictures in inter prediction, and information related to motion vectors in inter prediction, according to the common inverse binarization format between when arithmetic decoding is applied to the binary data string and when arithmetic decoding is not applied to the binary data string.

In this way, the decoder is capable of efficiently inverse binarizing the portion in which the various kinds of information included in the prediction parameter information has been binarized, according to the common inverse binarization format.

In addition, for example, when inverse binarizing the binary data string, the circuitry may inverse binarize only the first portion in the binary data string according to the different inverse binarization formats, and may inverse binarize all information other than the first portion in the binary data string according to the common inverse binarization format.

In this way, the decoder is capable of inverse binarizing all of the portion other than the first portion in which the frequency transform coefficient information has been binarized, according to the common inverse binarization format. Accordingly, the processing is simplified.

In addition, for example, when inverse binarizing the binary data string, the circuitry may inverse binarize the first portion in which the frequency transform coefficient information has been binarized according to a format which generates a smaller number of bits when arithmetic decoding is not applied to the binary data string than when arithmetic decoding is applied to the binary data string.

In this way, the decoder is capable of assisting reduction in coding amount of the frequency transform coefficient information when arithmetic decoding is not applied.

Furthermore, an encoding method according to an aspect of the present disclosure is an encoding method for encoding image information and outputting a bitstream in which the image information has been encoded, the encoding method including: binarizing the image information; switching whether or not to apply arithmetic encoding to a binary data string in which the image information has been binarized; when arithmetic encoding is applied to the binary data string, applying arithmetic encoding to the binary data string, and outputting the bitstream which includes the binary data string to which arithmetic encoding has been applied; when arithmetic encoding is not applied to the binary data string, skipping applying arithmetic encoding to the binary data string, and outputting the bitstream which includes the binary data string to which arithmetic encoding has not been applied; in the binarizing of the image information, binarizing frequency transform coefficient information which is related to frequency components of an image and included in the image information, according to different binarization formats between when arithmetic encoding is applied to the binary data string and when arithmetic encoding is not applied to the binary data string; and in the binarizing of the image information, binarizing a part or an entirety of prediction parameter information which is related to prediction methods of the image and included in the image information, according to a common binarization format between when arithmetic encoding is applied to the binary data string and when arithmetic encoding is not applied to the binary data string.

In this way, the apparatus, etc. which performs the encoding method is capable of skipping arithmetic encoding. Accordingly, the apparatus, etc. which performs the encoding method is capable of supporting reduction in processing delay generated by the arithmetic encoding. Furthermore, the apparatus, etc. which performs the encoding method is capable of appropriately binarizing the frequency transform coefficient information which significantly affects the total coding amount, according to the binarization formats which are different depending on whether or not arithmetic encoding is applied. Accordingly the apparatus, etc. which performs the encoding method is capable of appropriately encoding the frequency transform coefficient information, thereby being able to reduce increase in the total coding amount.

Furthermore, a decoding method according to an aspect of the present disclosure is a decoding method for obtaining a bitstream in which image information has been encoded and decoding the image information, the decoding method including: obtaining the bitstream which includes a binary data string in which the image information has been binarized; switching whether or not to apply arithmetic decoding to the binary data string included in the bitstream; when arithmetic decoding is applied to the binary data string, applying arithmetic decoding to the binary data string, and inverse binarizing the binary data string to which arithmetic decoding has been applied, to decode the image information; when arithmetic decoding is not applied to the binary data string, skipping applying arithmetic decoding to the binary data string, and inverse binarizing the binary data string to which arithmetic decoding has not been applied, to decode the image information; in the inverse binarizing of the binary data string, inverse binarizing a first portion which is included in the binary data string and in which frequency transform coefficient information related to frequency components of an image has been binarized, according to different inverse binarization formats between when arithmetic decoding is applied to the binary data string and when arithmetic decoding is not applied to the binary data string; and in the inverse binarizing of the binary data string, inverse binarizing a second portion which is included in the binary data string and in which a part or an entirety of prediction parameter information related to prediction methods of an image has been binarized, according to a common inverse binarization format between when arithmetic decoding is applied to the binary data string and when arithmetic decoding is not applied to the binary data string.

In this way, the apparatus, etc. which performs the decoding method is capable of skipping arithmetic decoding. Accordingly, the apparatus, etc. which performs the decoding method is capable of supporting reduction in processing delay generated by the arithmetic decoding. Furthermore, the apparatus, etc. which performs the decoding method is capable of appropriately inverse binarizing the first portion in which the frequency transform coefficient information which significantly affects the total coding amount has been binarized, according to whether or not arithmetic decoding is applied. Accordingly the apparatus, etc. which performs the decoding method is capable of appropriately decoding the frequency transform coefficient information, thereby being able to reduce increase in the total coding amount.

Furthermore, an encoder according to an aspect of the present disclosure may be an encoder which encodes image information, the encoder including: memory; and circuitry accessible to the memory, wherein the circuitry accessible to the memory: encodes position information indicating a position of a specific basic block which is a basic block including a non-zero coefficient first in a predetermined scan order defined in a descending order of frequencies of one or more basic blocks included in a frequency transform block composed of a plurality of frequency transform coefficients; and encodes only block information indicating a plurality of frequency transform coefficients of each of the specific basic block and a following basic block in the predetermined scan order.

In this way, the encoder is capable of binarizing the position information and the block information as the frequency transform coefficient information. Since the encoder encodes the block information of each of the specific basic block and the following basic block in the predetermined scan order, the encoder is capable of assisting reduction in the coding amount of the frequency transform coefficient information.

For example, the circuitry may encode the position information only when the number of the one or more basic blocks is two or more.

In this way, when, for example, the size of the frequency transform block and the size of each basic block is the same, the encoder is capable of assisting further reduction in coding amount of the frequency transform coefficient information.

In addition, for example, the circuitry may encode the position information and the block information only when the specific basic block is present in the frequency transform block.

In this way, when, for example, no non-zero coefficient is included in the frequency transform block, the encoder is capable of assisting further reduction in coding amount of the frequency transform coefficient information.

In addition, for example, the circuitry: may encode the image information, and may output a bitstream in which the image information has been encoded; when encoding the image information and outputting the bitstream: may binarize the image information; may switch whether or not to apply arithmetic encoding to a binary data string in which the image information has been binarized; when arithmetic encoding is applied to the binary data string, may apply arithmetic encoding to the binary data string, and may output the bitstream which includes the binary data string to which arithmetic encoding has been applied; and when arithmetic encoding is not applied to the binary data string, may skip applying arithmetic encoding to the binary data string and may output the bitstream which includes the binary data string to which arithmetic encoding has not been applied, and when binarizing the image information, may binarize frequency transform coefficient information which is related to frequency components of an image and included in the image information, according to different binarization formats between when arithmetic encoding is applied to the binary data string and when arithmetic encoding is not applied to the binary data string; when binarizing the image information, may binarize a part or an entirety of prediction parameter information which is related to prediction methods of an image and included in the image information, according to a common binarization format between when arithmetic encoding is applied to the binary data string and when arithmetic encoding is not applied to the binary data string; and when binarizing the frequency transform coefficient information in the case where arithmetic encoding is not applied to the binary data string, may binarize the frequency transform coefficient information including the position information and the block information, to encode the position information and the block information.

In this way, the encoder is capable of assisting reduction in coding amount of the frequency transform coefficient information when arithmetic encoding is not applied.

Furthermore, a decoder according to an aspect of the present disclosure may be a decoder which decodes image information, the decoder including: memory; and circuitry accessible to the memory, wherein the circuitry accessible to the memory: decodes position information indicating a position of a specific basic block which is a basic block including a non-zero coefficient first in a predetermined scan order defined in a descending order of frequencies of one or more basic blocks included in a frequency transform block composed of a plurality of frequency transform coefficients; and decodes only block information indicating a plurality of frequency transform coefficients of each of the specific basic block and a following basic block in the predetermined scan order.

In this way, the decoder is capable of decoding the position information and the block information as the frequency transform coefficient information. Since the decoder decodes the block information of each of the specific basic block and the following basic block in the predetermined scan order, the decoder is capable of assisting reduction in the coding amount of the frequency transform coefficient information.

For example, the circuitry may decode the position information only when the number of the one or more basic blocks is two or more.

In this way, when, for example, the size of the frequency transform block and the size of each basic block is the same, the encoder is capable of assisting further reduction in coding amount of the frequency transform coefficient information.

In addition, for example, the circuitry may decode the position information and the block information only when the specific basic block is present in the frequency transform block.

In this way, when, for example, no non-zero coefficient is included in the frequency transform block, the decoder is capable of assisting further reduction in coding amount of the frequency transform coefficient information.

In addition, for example, the circuitry: may obtain a bitstream in which the image information has been encoded, and may decode the image information; when obtaining the bitstream and decoding the image information: may obtain the bitstream which includes a binary data string in which the image information has been binarized; may switch whether or not to apply arithmetic decoding to the binary data string which is included in the bitstream; when arithmetic decoding is applied to the binary data string, may apply arithmetic decoding to the binary data string, and may inverse binarize the binary data string to which arithmetic decoding has been applied, to decode the image information; and when arithmetic decoding is not applied to the binary data string, may skip applying arithmetic decoding to the binary data string, and may inverse binarize the binary data string to which arithmetic decoding has not been applied, to decode the image information; when inverse binarizing the binary data string, may inverse binarize a first portion which is included in the binary data string and in which frequency transform coefficient information related to frequency components of an image has been binarized, according to different inverse binarization formats between when arithmetic decoding is applied to the binary data string and when arithmetic decoding is not applied to the binary data string; when inverse binarizing the binary data string, may inverse binarize a second portion which is included in the binary data string and in which a part or an entirety of prediction parameter information related to prediction methods of the image has been binarized, according to a common inverse binarization format between when arithmetic decoding is applied to the binary data string and when arithmetic decoding is not applied to the binary data string; and when inverse binarizing the first portion in the case where arithmetic decoding is not applied to the binary data string, may inverse binarize the first portion in which the frequency transform coefficient information including the position information and the block information has been binarized, to decode the position information and the block information.

In this way, the decoder is capable of assisting reduction in coding amount of the frequency transform coefficient information when arithmetic decoding is not applied.

Furthermore, an encoding method according to an aspect of the present disclosure may be an encoding method for encoding image information, the encoding method including: encoding position information indicating a position of a specific basic block which is a basic block including a non-zero coefficient first in a predetermined scan order defined in a descending order of frequencies of one or more basic blocks included in a frequency transform block composed of a plurality of frequency transform coefficients; and encoding only block information indicating a plurality of frequency transform coefficients of each of the specific basic block and a following basic block in the predetermined scan order.

In this way, the apparatus, etc. which performs the encoding method is capable of encoding the position information and the block information as the frequency transform coefficient information. Since the apparatus, etc. which performs the encoding method encodes the block information of each of the specific basic block and the following basic block in the predetermined scan order, the encoder is capable of assisting reduction in the coding amount of the frequency transform coefficient information.

Furthermore, a decoding method according to an aspect of the present disclosure may be a decoding method for decoding image information, the decoding method including: decoding position information indicating a position of a specific basic block which is a basic block including a non-zero coefficient first in a predetermined scan order defined in a descending order of frequencies of one or more basic blocks included in a frequency transform block composed of a plurality of frequency transform coefficients; and decoding only block information indicating a plurality of frequency transform coefficients of each of the specific basic block and a following basic block in the predetermined scan order.

In this way, the apparatus, etc. which performs the decoding method is capable of decoding the position information and the block information as the frequency transform coefficient information. Since the apparatus, etc. which performs the decoding method decodes the block information of each of the specific basic block and the following basic block in the predetermined scan order, the decoder is capable of assisting reduction in the coding amount of the frequency transform coefficient information.

Furthermore, an encoder according to an aspect of the present disclosure may be an encoder which encodes image information, the encoder including: memory; and circuitry accessible to the memory, wherein the circuitry accessible to the memory: binarizes a data value indicating the number of non-zero coefficients included in a current basic block which is one of one or more basic blocks in a frequency transform block composed of a plurality of frequency transform coefficients, according to a conversion table in which a plurality of data values and a plurality of binary values are associated with each other, to encode the image information which includes the data value; and when binarizing the data value, selects the conversion table from a plurality of tables including a first table which includes association with a data value indicating 0 as the number of non-zero coefficients and a second table which does not include association with a data value indicating 0 as the number of non-zero coefficients, and binarizes the data value according to the conversion table selected.

In this way the encoder is capable of appropriately encoding the information for efficiently representing the plurality of frequency transform coefficients which constitute the basic block. In addition, the encoder is capable of using the table having a reduced information amount as the conversion table for binarization. Accordingly, the encoder is capable of assisting reduction in coding amount of the frequency transform coefficient information.

For example, when binarizing the binary value, the circuitry may binarize, as the data value indicating the number of non-zero coefficients included in a current basic block, a data value indicating the number of non-zero coefficients included in only each of a specific basic block and a following basic block in a scan order defined as a descending order of frequencies of the one or more basic blocks, the specific basic block being a basic block including a non-zero coefficient first in the one or more basic blocks.

In this way, the encoder is capable of assisting reduction in coding amount of the frequency transform coefficient information.

In addition, for example, the circuitry: when binarizing the data value, may binarize the data value only when the specific basic block is present in the one or more basic blocks; and when selecting the conversion table, may select the second table as the conversion table when the frequency transform block and the current basic block are identical.

In this way, when, for example, the size of the frequency transform block and the size of each basic block are the same, the encoder is capable of assisting further reduction in coding amount of the frequency transform coefficient information, using the second table which does not include any association with a data value indicating 0 as the number of non-zero coefficients.

In addition, for example, the circuitry when selecting the conversion table, may select the second table as the conversion table when the current basic block is the specific basic block.

In this way, when, for example, the current basic block is a specific basic block, the encoder is capable of assisting further reduction in coding amount of the frequency transform coefficient information, using the second table which does not include any association with a data value indicating 0 as the number of non-zero coefficients.

In addition, for example, the circuitry: may encode the image information, and may output a bitstream in which the image information has been encoded: when encoding the image information and outputting the bitstream: may binarize the image information; may switch whether or not to apply arithmetic encoding to a binary data string in which the image information has been binarized; when arithmetic encoding is applied to the binary data string, may apply arithmetic encoding to the binary data string, and may output the bitstream which includes the binary data string to which arithmetic encoding has been applied; and when arithmetic encoding is not applied to the binary data string, may skip applying arithmetic encoding to the binary data string and may output the bitstream which includes the binary data string to which arithmetic encoding has not been applied, and when binarizing the image information, may binarize frequency transform coefficient information which is related to frequency components of an image and included in the image information, according to different binarization formats between when arithmetic encoding is applied to the binary data string and when arithmetic encoding is not applied to the binary data string; when binarizing the image information, may binarize a part or an entirety of prediction parameter information which is related to prediction methods of an image and included in the image information, according to a common binarization format between when arithmetic encoding is applied to the binary data string and when arithmetic encoding is not applied to the binary data string; and when binarizing the frequency transform coefficient information in the case where arithmetic encoding is not applied to the binary data string, may binarize the data value included in the frequency transform coefficient information, according to the conversion table selected from the plurality of tables including the first table and the second table.

In this way when arithmetic encoding is not applied, the encoder is capable of assisting reduction in coding amount of the frequency transform coefficient information, using the conversion table selected from the plurality of tables including the second table which does not include any association with a data value indicating 0 as the number of non-zero coefficients.

Furthermore, a decoder according to an aspect of the present disclosure may be a decoder which decodes image information, the decoder including: memory; and circuitry accessible to the memory, wherein the circuitry accessible to the memory: inverse binarizes a binary value which has been obtained by binarizing a data value according to a conversion table in which a plurality of data values and a plurality of binary values are associated with each other, to decode the image information which includes the data value, the data value indicating the number of non-zero coefficients included in a current basic block which is one of one or more basic blocks in a frequency transform block composed of a plurality of frequency transform coefficients; and when inverse binarizing the data value, selects the conversion table from a plurality of tables including a first table which includes association with a data value indicating 0 as the number of non-zero coefficients and a second table which does not include association with a data value indicating 0 as the number of non-zero coefficients, and inverse binarizes the binary value according to the conversion table selected.

In this way, the decoder is capable of appropriately decoding the information for efficiently representing the plurality of frequency transform coefficients which constitute the basic block. In this way, the decoder is capable of using the table having a reduced information amount as the conversion table for inverse binarization. Accordingly, the decoder is capable of assisting reduction in coding amount of the frequency transform coefficient information.

For example, when inverse binarizing the binary value, the circuitry may binarize, as a binary value obtained by binarizing the data value indicating the number of non-zero coefficients included in a current basic block, a binary value obtained by binarizing a data value indicating the number of non-zero coefficients included in only each of a specific basic block and a following basic block in a scan order defined as a descending order of frequencies of the one or more basic blocks, the specific basic block being a basic block including a non-zero coefficient first in the one or more basic blocks.

In this way, the decoder is capable of assisting reduction in coding amount of the frequency transform coefficient information.

In addition, for example, the circuitry: when inverse binarizing the binary value, may inverse binarize the binary value only when the specific basic block is present in the one or more basic blocks; and when selecting the conversion table, may select the second table as the conversion table when the frequency transform block and the current basic block are identical.

In this way when, for example, the size of the frequency transform block and the size of each basic block are the same, the decoder is capable of assisting further reduction in coding amount of the frequency transform coefficient information, using the second table which does not include any association with a data value indicating 0 as the number of non-zero coefficients.

In addition, for example, the circuitry, when selecting the conversion table, may select the second table as the conversion table when the current basic block is the specific basic block.

In this way, when, for example, the current basic block is the specific basic block, the decoder is capable of assisting further reduction in coding amount of the frequency transform coefficient information, using the second table which does not include any association with a data value indicating 0 as the number of non-zero coefficients.

In addition, for example, the circuitry: may obtain a bitstream in which the image information has been encoded, and may decode the image information; when obtaining the bitstream and decoding the image information: may obtain the bitstream which includes a binary data string in which the image information has been binarized; may switch whether or not to apply arithmetic decoding to the binary data string which is included in the bitstream; when arithmetic decoding is applied to the binary data string, may apply arithmetic decoding to the binary data string, and may inverse binarize the binary data string to which arithmetic decoding has been applied, to decode the image information; and when arithmetic decoding is not applied to the binary data string, may skip applying arithmetic decoding to the binary data string, and may inverse binarize the binary data string to which arithmetic decoding has not been applied, to decode the image information; when inverse binarizing the binary data string, may inverse binarize a first portion which is included in the binary data string and in which frequency transform coefficient information related to frequency components of an image has been binarized, according to different inverse binarization formats between when arithmetic decoding is applied to the binary data string and when arithmetic decoding is not applied to the binary data string; when inverse binarizing the binary data string, may inverse binarize a second portion which is included in the binary data string and in which a part or an entirety of prediction parameter information related to prediction methods of the image has been binarized, according to a common inverse binarization format between when arithmetic decoding is applied to the binary data string and when arithmetic decoding is not applied to the binary data string; and when inverse binarizing the first portion in the case where arithmetic decoding is not applied to the binary data string, may inverse binarize the binary value included in the first portion, according to the conversion table selected from the plurality of tables including the first table and the second table.

In this way, when arithmetic decoding is not applied, the decoder is capable of assisting reduction in coding amount of the frequency transform coefficient information, using the conversion table selected from the plurality of tables including the second table which does not include any association with a data value indicating 0 as the number of non-zero coefficients.

Furthermore, an encoding method according to an aspect of the present disclosure may be an encoding method for encoding image information, the encoding method including: binarizing a data value indicating the number of non-zero coefficients included in a current basic block which is one of one or more basic blocks in a frequency transform block composed of a plurality of frequency transform coefficients, according to a conversion table in which a plurality of data values and a plurality of binary values are associated with each other, to encode the image information which includes the data value; and in the binarizing of the data value, selecting the conversion table from a plurality of tables including a first table which includes association with a data value indicating 0 as the number of non-zero coefficients and a second table which does not include association with a data value indicating 0 as the number of non-zero coefficients, and binarizing the data value according to the conversion table selected.

In this way, the apparatus, etc. which performs the encoding method is capable of appropriately encoding the information for efficiently representing the plurality of frequency transform coefficients which constitute the basic block. In addition, the apparatus, etc. which performs the encoding method is capable of using the table having a reduced information amount as the conversion table for binarization. Accordingly, the apparatus, etc. which performs the encoding method is capable of assisting reduction in coding amount of the frequency transform coefficient information.

In addition, a decoding method according to an aspect of the present disclosure may be a decoding method for decoding image information, the decoding method including: inverse binarizing a binary value which has been obtained by binarizing a data value according to a conversion table in which a plurality of data values and a plurality of binary values are associated with each other, to decode the image information which includes the data value, the data value indicating the number of non-zero coefficients included in a current basic block which is one of one or more basic blocks in a frequency transform block composed of a plurality of frequency transform coefficients; and in the inverse binarizing of the data value, selecting the conversion table from a plurality of tables including a first table which includes association with a data value indicating 0 as the number of non-zero coefficients and a second table which does not include association with a data value indicating 0 as the number of non-zero coefficients, and inverse binarizing the binary value according to the conversion table selected.

In this way, the apparatus, etc. which performs the decoding method is capable of appropriately decoding the information for efficiently representing the plurality of frequency transform coefficients which constitute the basic block. In addition, the apparatus, etc. which performs the decoding method is capable of using the table having a reduced information amount as the conversion table for inverse binarization. Accordingly, the apparatus, etc. which performs the decoding method is capable of assisting reduction in coding amount of the frequency transform coefficient information.

Furthermore, an encoder according to an aspect of the present disclosure may be an encoder which encodes image information, the encoder including: memory; and circuitry accessible to the memory, wherein the circuitry accessible to the memory: binarizes a data value indicating the number of non-zero coefficients included in a current basic block which is one of one or more basic blocks in a frequency transform block composed of a plurality of frequency transform coefficients, according to a conversion table in which a plurality of data values and a plurality of binary values are associated with each other, to encode the image information which includes the data value; and when binarizing the data value, selects the conversion table from a plurality of tables including two or more tables which differ from each other in difference between a longest bit length and a shortest bit length of a plurality of binary values associated with the plurality of data values, according to a position of the current basic block in the current frequency transform block which is the frequency transform block including the current basic block, and binarizes the data value according to the conversion table selected.

In this way the encoder is capable of appropriately encoding the information for efficiently representing the plurality of frequency transform coefficients which constitute the basic block. In this way, the encoder is capable of selecting the conversion table for binarizing the data value indicating the number of non-zero coefficients, according to the position of the current basic block. The characteristics of the number of non-zero coefficients differ depending on the position of the current basic block. Accordingly, the encoder is capable of reflecting the characteristic of the number of non-zero coefficients in the selection of the conversion table, using the position of the current basic block. Accordingly, the encoder is capable of appropriately selecting the conversion table, and assisting reduction in coding amount of the frequency transform coefficient information.

For example, when selecting the conversion table, the circuitry may select the conversion table according to the number of non-zero coefficients included in a preceding basic block which is a basic block located before the current basic block in a predetermined scan order defined in a descending order of frequencies of the one or more basic blocks in the case where the preceding basic block is present at the same frequency level as a frequency level at the position of the current basic block.

In this way, the encoder is capable of selecting the conversion table according to the non-zero coefficients of the preceding basic block which is estimated to have a similar number of non-zero coefficients with respect to the number of non-zero coefficients of the current basic block.

In addition, for example, when selecting the conversion table, the circuitry: may select, as the conversion table, a first table from the plurality of tables when the preceding basic block is present at the same frequency level and the number of non-zero coefficients included in the preceding basic block is a first number; and may select, as the conversion table, a second table from the plurality of tables when the preceding basic block is present at the same frequency level and the number of non-zero coefficients included in the preceding basic block is a second number larger than the first number, the second table having a smaller difference between a longest bit length and a shortest bit length of a plurality of binary values than the first table.

In this way when the number of non-zero coefficients of the current basic block is estimated to be large according to the number of non-zero coefficients of the preceding basic block, the encoder is capable of selecting the table in which the difference in bit length is small as the conversion table, and assisting reduction in increase in coding amount.

In addition, for example, when selecting the conversion table, the circuitry may select, from the plurality of tables, the conversion table which has a smaller difference between a longest bit length and a shortest bit length of a plurality of binary values than a predetermined difference, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is present at a frequency level higher than the frequency level at the position of the current basic block.

In this way when the number of non-zero coefficients is estimated to be large according to the relationship between the current basic block and the specific basic block, the encoder is capable of selecting the table in which the difference in bit length is small as the conversion table, and assisting reduction in increase in coding amount.

In addition, for example, when selecting the conversion table, the circuitry may select the conversion table which has a smallest difference between a longest bit length and a shortest bit length of a plurality of binary values from the plurality of tables when the preceding basic block is not present at the same frequency level and the specific basic block is present at the frequency level higher than the frequency level at the position of the current basic block.

In this way, when the number of non-zero coefficients is estimated to be large according to the relationship between the current basic block and the specific basic block, the encoder is capable of selecting the table in which the difference in bit length is small as the conversion table, and assisting reduction in increase in coding amount.

In addition, for example, when selecting the conversion table, the circuitry may select the conversion table according to the number of non-zero coefficients estimated to be the number of non-zero coefficients included in the current basic block based on a neighboring frequency transform block which is a frequency transform block located around the current frequency transform block, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is not present at a frequency level higher than a frequency level at a position of the current basic block.

In this way, the encoder is capable of selecting the conversion table using the neighboring frequency transform block which is estimated to have a similar number of non-zero coefficients with respect to the number of non-zero coefficients of the current basic block.

In addition, for example, when selecting the conversion table, the circuitry: may select a first table as the conversion table from the plurality of tables, when (i) the preceding basic block is not present at the same frequency level, (ii) the specific basic block is not present at the higher frequency level, and (iii) the number of non-zero coefficients estimated to be the number of non-zero coefficients based on the neighboring frequency transform block is a first number; and may select a second table which has a smaller difference between a longest bit length and a shortest bit length of a plurality of binary values than the first table as the conversion table from the plurality of tables, when (i) the preceding basic block is not present at the same frequency level, (ii) the specific basic block is not present at the higher frequency level, and (iii) the number of non-zero coefficients estimated to be the number of non-zero coefficients based on the neighboring frequency transform block is a second number larger than the first number.

In this way, when the number of non-zero coefficients of the current basic block is estimated to be large according to the neighboring frequency transform block, the encoder is capable of selecting the table in which the difference in bit length is small as the conversion table, and assisting reduction in increase in coding amount.

In addition, for example, the neighboring frequency transform block may be one of (i) a frequency transform block adjacent to a left of or above the current frequency transform block, (ii) a frequency transform block which has been encoded immediately before the current frequency transform block, and (iii) a frequency transform block which is located within a predetermined range from the current frequency transform block and is the same as the current frequency transform block in coding mode, the coding mode being one of an inter prediction mode and an intra prediction mode.

In this way, the encoder is capable of selecting the conversion table using the appropriate neighboring frequency transform block.

In addition, for example, the number of non-zero coefficients estimated based on the neighboring frequency transform block may be estimated based on one of (i) the number of non-zero coefficients included in a basic block which is one of the one or more basic blocks in the neighboring frequency transform block and whose position relative to the neighboring frequency transform block is equivalent to a position of the current basic block relative to the current frequency transform block and (ii) the number of non-zero coefficients included in an entirety of the neighboring frequency transform block.

In this way, the encoder is capable of selecting the conversion table according to the number of non-zero coefficients which is appropriately estimated based on the neighboring frequency transform block.

In addition, for example, when selecting the conversion table, the circuitry may select the conversion table according to whether a coding mode of the current basic block is an inter prediction mode or an intra prediction mode, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is not present at a frequency level higher than a frequency level at the position of the current basic block.

In this way, the encoder is capable of selecting the conversion table according to the coding mode which is the inter prediction mode or the intra prediction mode. The characteristics of the number of non-zero coefficients are estimated to be different depending on the coding mode. Accordingly the encoder is capable of reflecting the characteristic of the number of non-zero coefficients in the selection of the conversion table, using the coding mode. Accordingly, the encoder is capable of appropriately selecting the conversion table, and assisting reduction in coding amount of the frequency transform coefficient information.

In addition, for example, when selecting the conversion table, the circuitry: may select, as the conversion table, a first table from the plurality of tables when (i) the preceding basic block is not present at the same frequency level, (ii) the specific basic block is not present at the higher level, and (iii) the coding mode of the current basic block is an inter prediction mode; and may select, as the conversion table, a second table from the plurality of tables when (i) the preceding basic block is not present at the same frequency level, (ii) the specific basic block is not present at the higher level, and (iii) the coding mode for the current basic block is an intra prediction mode, the second table having a smaller difference between a longest bit length and a shortest bit length of a plurality of binary values than the first table.

In this way, the encoder is capable of selecting the table having the small difference in bit length as the conversion table when the coding mode is the intra prediction mode in which a prediction accuracy is low, and the number of non-zero coefficients is large, thereby assisting reduction in increase in coding amount.

In addition, for example, when selecting the conversion table, the circuitry may select the conversion table according to a quantization parameter which is used to encode the current basic block, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is not present at a frequency level higher than a frequency level at the position of the current basic block.

In this way, the encoder is capable of selecting the conversion table according to the quantization parameter which is used to encode the current basic block. The characteristics of the number of non-zero coefficients are estimated to be different depending on the quantization parameter. Accordingly, the encoder is capable of reflecting the characteristic of the number of non-zero coefficients in the selection of the conversion table, using the quantization parameter. Accordingly, the encoder is capable of appropriately selecting the conversion table, and assisting reduction in coding amount of the frequency transform coefficient information.

In addition, for example, when selecting the conversion table, the circuitry: may select a first table as the conversion table from the plurality of tables, when (i) the preceding basic block is not present at the same frequency level, (ii) the specific basic block is not present at the higher frequency level, and (iii) the quantization parameter is a first value; and may select a second table which has a smaller difference than the first table as the conversion table from the plurality of tables, when (i) the preceding basic block is not present at the same frequency level, (ii) the specific basic block is not present at the higher frequency level, and (iii) the quantization parameter is a second value smaller than the first value, the second table having a smaller difference between a longest bit length and a shortest bit length of a plurality of binary values than the first table.

In this way, the encoder is capable of selecting the table having the small difference in bit length as the conversion table when the quantization parameter is small and thus the number of non-zero coefficients is estimated to be large, thereby assisting reduction in increase in coding amount.

In addition, for example, the circuitry: may encode the image information, and may output a bitstream in which the image information has been encoded; when encoding the image information and outputting the bitstream: may binarize the image information; may switch whether or not to apply arithmetic encoding to a binary data string in which the image information has been binarized; when arithmetic encoding is applied to the binary data string, may apply arithmetic encoding to the binary data string, and may output the bitstream which includes the binary data string to which arithmetic encoding has been applied; and when arithmetic encoding is not applied to the binary data string, may skip applying arithmetic encoding to the binary data string and may output the bitstream which includes the binary data string to which arithmetic encoding has not been applied, and when binarizing the image information, may binarize frequency transform coefficient information which is related to frequency components of an image and included in the image information, according to different binarization formats between when arithmetic encoding is applied to the binary data string and when arithmetic encoding is not applied to the binary data string; when binarizing the image information, may binarize a part or an entirety of prediction parameter information which is related to prediction methods of an image and included in the image information, according to a common binarization format between when arithmetic encoding is applied to the binary data string and when arithmetic encoding is not applied to the binary data string; and when binarizing the frequency transform coefficient information in the case where arithmetic encoding is not applied to the binary data string, may binarize the data value included in the frequency transform coefficient information, according to the conversion table selected from the plurality of tables based on the position of the current basic block.

In this way, when arithmetic encoding is not applied, the encoder is capable of assisting reduction in coding amount of frequency transform coefficient information, using the conversion table selected from the plurality of tables according to the position of the current basic block.

In addition, a decoder according to an aspect of the present disclosure may be a decoder which decodes image information, the decoder including: memory; and circuitry accessible to the memory, wherein the circuitry accessible to the memory: inverse binarizes a binary value which has been obtained by binarizing a data value, according to a conversion table in which a plurality of data values and a plurality of binary values are associated with each other, to decode the image information which includes the data value, the data value indicating the number of non-zero coefficients included in a current basic block which is one of one or more basic blocks in a frequency transform block composed of a plurality of frequency transform coefficients; and when inverse binarizing the binary value, selects the conversion table from a plurality of tables including two or more tables which differ from each other in difference between a longest bit length and a shortest bit length of a plurality of binary values associated with the plurality of data values, according to a position of the current basic block in the current frequency transform block which is the frequency transform block including the current basic block, and inverse binarizes the binary value according to the conversion table selected.

In this way, the decoder is capable of appropriately decoding the information for efficiently representing the plurality of frequency transform coefficients which constitute the basic block. In this way the decoder is capable of selecting the conversion table for inverse binarizing the data value indicating the number of non-zero coefficients, according to the position of the current basic block. The characteristics of the number of non-zero coefficients differ depending on the position of the current basic block. Accordingly the decoder is capable of reflecting the characteristics of the number of non-zero coefficients in the selection of the conversion table, using the position of the current basic block. Accordingly, the decoder is capable of appropriately selecting the conversion table, and assisting reduction in coding amount of the frequency transform coefficient information.

For example, when selecting the conversion table, the circuitry may select the conversion table according to the number of non-zero coefficients included in a preceding basic block which is a basic block located before the current basic block in a predetermined scan order defined in a descending order of frequencies of the one or more basic blocks in the case where the preceding basic block is present at the same frequency level as a frequency level at the position of the current basic block.

In this way, the decoder is capable of selecting the conversion table according to the non-zero coefficients of the preceding basic block which is estimated to have a similar number of non-zero coefficients with respect to the number of non-zero coefficients of the current basic block.

In addition, for example, when selecting the conversion table, the circuitry: may select, as the conversion table, a first table from the plurality of tables when the preceding basic block is present at the same frequency level and the number of non-zero coefficients included in the preceding basic block is a first number; and may select, as the conversion table, a second table from the plurality of tables when the preceding basic block is present at the same frequency level and the number of non-zero coefficients included in the preceding basic block is a second number larger than the first number, the second table having a smaller difference between a longest bit length and a shortest bit length of a plurality of binary values than the first table.

In this way, when the number of non-zero coefficients of the current basic block is estimated to be large according to the number of non-zero coefficients of the preceding basic block, the decoder is capable of selecting the table in which the difference in bit length is small as the conversion table, and assisting reduction in increase in coding amount.

In addition, for example, when selecting the conversion table, the circuitry may select, from the plurality of tables, the conversion table which has a smaller difference between a longest bit length and a shortest bit length of a plurality of binary values than a predetermined difference, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is present at a frequency level higher than the frequency level at the position of the current basic block.

In this way, when the number of non-zero coefficients is estimated to be large according to the relationship between the current basic block and the specific basic block, the decoder is capable of selecting the table in which the difference in bit length is small as the conversion table, and assisting reduction in increase in coding amount.

In addition, for example, when selecting the conversion table, the circuitry may select the conversion table which has a smallest difference between a longest bit length and a shortest bit length of a plurality of binary values from the plurality of tables when the preceding basic block is not present at the same frequency level and the specific basic block is present at the frequency level higher than the frequency level at the position of the current basic block.

In this way, when the number of non-zero coefficients is estimated to be large according to the relationship between the current basic block and the specific basic block, the decoder is capable of selecting the table in which the difference in bit length is small as the conversion table, and assisting reduction in increase in coding amount.

In addition, for example, when selecting the conversion table, the circuitry may select the conversion table according to the number of non-zero coefficients estimated to be the number of non-zero coefficients included in the current basic block based on a neighboring frequency transform block which is a frequency transform block located around the current frequency transform block, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is not present at a frequency level higher than a frequency level at a position of the current basic block.

In this way, the decoder is capable of selecting the conversion table using the neighboring frequency transform block which is estimated to have a similar number of non-zero coefficients with respect to the number of non-zero coefficients of the current basic block.

In addition, for example, when selecting the conversion table, the circuitry: may select a first table as the conversion table from the plurality of tables, when (i) the preceding basic block is not present at the same frequency level, (ii) the specific basic block is not present at the higher frequency level, and (iii) the number of non-zero coefficients estimated to be the number of non-zero coefficients based on the neighboring frequency transform block is a first number; and may select a second table which has a smaller difference between a longest bit length and a shortest bit length of a plurality of binary values than the first table as the conversion table from the plurality of tables, when (i) the preceding basic block is not present at the same frequency level, (ii) the specific basic block is not present at the higher frequency level, and (iii) the number of non-zero coefficients estimated to be the number of non-zero coefficients based on the neighboring frequency transform block is a second number larger than the first number.

In this way, when the number of non-zero coefficients of the current basic block is estimated to be large according to the neighboring frequency transform block, the decoder is capable of selecting the table in which the difference in bit length is small as the conversion table, and assisting reduction in increase in coding amount.

In addition, for example, the neighboring frequency transform block may be one of (i) a frequency transform block adjacent to a left of or above the current frequency transform block, (ii) a frequency transform block which has been encoded immediately before the current frequency transform block, and (iii) a frequency transform block which is located within a predetermined range from the current frequency transform block and is the same as the current frequency transform block in coding mode, the coding mode being one of an inter prediction mode and an intra prediction mode.

In this way, the decoder is capable of selecting the conversion table using the appropriate neighboring frequency transform block.

In addition, for example, the number of non-zero coefficients estimated based on the neighboring frequency transform block may be estimated based on one of (i) the number of non-zero coefficients included in a basic block which is one of the one or more basic blocks in the neighboring frequency transform block and whose position relative to the neighboring frequency transform block is equivalent to a position of the current basic block relative to the current frequency transform block and (ii) the number of non-zero coefficients included in an entirety of the neighboring frequency transform block.

In this way, the decoder is capable of selecting the conversion table according to the number of non-zero coefficients which is appropriately estimated based on the neighboring frequency transform block.

In addition, for example, when selecting the conversion table, the circuitry may select the conversion table according to whether a coding mode of the current basic block is an inter prediction mode or an intra prediction mode, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is not present at a frequency level higher than a frequency level at the position of the current basic block.

In this way, the decoder is capable of selecting the conversion table according to the coding mode which is the inter prediction mode or the intra prediction mode. The characteristics of the number of non-zero coefficients are estimated to be different depending on the coding mode. Accordingly, the decoder is capable of reflecting the characteristics of the number of non-zero coefficients in the selection of the conversion table, using the coding mode. Accordingly, the decoder is capable of appropriately selecting the conversion table, and assisting reduction in coding amount of the frequency transform coefficient information.

In addition, for example, when selecting the conversion table, the circuitry: may select, as the conversion table, a first table from the plurality of tables when (i) the preceding basic block is not present at the same frequency level, (ii) the specific basic block is not present at the higher level, and (iii) the coding mode of the current basic block is an inter prediction mode; and may select, as the conversion table, a second table from the plurality of tables when (i) the preceding basic block is not present at the same frequency level, (ii the specific basic block is not present at the higher level, and (iii) the coding mode for the current basic block is an intra prediction mode, the second table having a smaller difference between a longest bit length and a shortest bit length of a plurality of binary values than the first table.

In this way, the decoder is capable of selecting the table having the small difference in bit length as the conversion table when the coding mode is the intra prediction mode in which the prediction accuracy is low and the number of non-zero coefficients is large, thereby assisting reduction in increase in coding amount.

In addition, for example, when selecting the conversion table, the circuitry may select the conversion table according to a quantization parameter which is used to encode the current basic block, in the case where (i) a preceding basic block which is a basic block located before the current basic block in a predetermined scan order defined in a descending order of frequencies of the one or more basic blocks is not present at the same frequency level as a frequency level at the position of the current basic block and (ii) a specific basic block which is a basic block including a non-zero coefficient first in the predetermined scan order is not present at a frequency level higher than a frequency level at the position of the current basic block.

In this way, the decoder is capable of selecting the conversion table according to the quantization parameter which is used to decode the current basic block. The characteristics of the number of non-zero coefficients are estimated to be different depending on the quantization parameter. Accordingly, the decoder is capable of reflecting the characteristic of the number of non-zero coefficients in the selection of the conversion table, using the quantization parameter. Accordingly, the decoder is capable of appropriately selecting the conversion table, and assisting reduction in coding amount of the frequency transform coefficient information.

In addition, for example, when selecting the conversion table, the circuitry: may select a first table as the conversion table from the plurality of tables, when (i) the preceding basic block is not present at the same frequency level, (ii) the specific basic block is not present at the higher frequency level, and (iii) the quantization parameter is a first value; and may select a second table which has a smaller difference than the first table as the conversion table from the plurality of tables, when (i) the preceding basic block is not present at the same frequency level, (ii) the specific basic block is not present at the higher frequency level, and (iii) the quantization parameter is a second value smaller than the first value, the second table having a smaller difference between a longest bit length and a shortest bit length of a plurality of binary values than the first table.

In this way the decoder is capable of selecting the table having the small difference in bit length as the conversion table when the quantization parameter is small and thus the number of non-zero coefficients is estimated to be large, thereby assisting reduction in increase in coding amount.

In addition, for example, the circuitry: may obtain a bitstream in which the image information has been encoded, and may decode the image information; when obtaining the bitstream and decoding the image information: may obtain the bitstream which includes a binary data string in which the image information has been binarized; may switch whether or not to apply arithmetic decoding to the binary data string which is included in the bitstream; when arithmetic decoding is applied to the binary data string, may apply arithmetic decoding to the binary data string, and may inverse binarize the binary data string to which arithmetic decoding has been applied, to decode the image information; and when arithmetic decoding is not applied to the binary data string, may skip applying arithmetic decoding to the binary data string, and may inverse binarize the binary data string to which arithmetic decoding has not been applied, to decode the image information; when inverse binarizing the binary data string, may inverse binarize a first portion which is included in the binary data string and in which frequency transform coefficient information related to frequency components of an image has been binarized, according to different inverse binarization formats between when arithmetic decoding is applied to the binary data string and when arithmetic decoding is not applied to the binary data string; when inverse binarizing the binary data string, may inverse binarize a second portion which is included in the binary data string and in which a part or an entirety of prediction parameter information related to prediction methods of the image has been binarized, according to a common inverse binarization format between when arithmetic decoding is applied to the binary data string and when arithmetic decoding is not applied to the binary data string; and when inverse binarizing the first portion in the case where arithmetic decoding is not applied to the binary data string, may inverse binarize the binary value included in the first portion, according to the conversion table selected from the plurality of tables based on a position of the current basic block.

In this way, when arithmetic decoding is not applied, the decoder is capable of assisting reduction in coding amount of frequency transform coefficient information, using the conversion table which is selected from the plurality of tables according to the position of the current basic block.

Furthermore, an encoding method according to an aspect of the present disclosure may be an encoding method for encoding image information, the encoding method including: binarizing a data value indicating the number of non-zero coefficients included in a current basic block which is one of one or more basic blocks in a frequency transform block composed of a plurality of frequency transform coefficients, according to a conversion table in which a plurality of data values and a plurality of binary values are associated with each other, to encode the image information which includes the data value; and in the binarizing of the data value, selecting the conversion table from a plurality of tables including two or more tables which differ from each other in difference between a longest bit length and a shortest bit length of a plurality of binary values associated with the plurality of data values, according to a position of the current basic block in the current frequency transform block which is the frequency transform block including the current basic block, and binarizing the data value according to the conversion table selected.

In this way, the apparatus, etc. which performs the encoding method is capable of appropriately encoding the information for efficiently representing the plurality of frequency transform coefficients which constitute the basic block. In this way, the apparatus, etc. which performs the encoding method is capable of selecting the conversion table for binarizing the data value indicating the number of non-zero coefficients, according to the position of the current basic block. The characteristics of the number of non-zero coefficients differ depending on the position of the current basic block. Accordingly the apparatus, etc. which performs the encoding method is capable of reflecting the characteristics of the number of non-zero coefficients in the selection of the conversion table, using the position of the current basic block. Accordingly, the apparatus, etc. which performs the encoding method is capable of appropriately selecting the conversion table, and assisting reduction in coding amount of the frequency transform coefficient information.

Furthermore, a decoding method according to an aspect of the present disclosure may be a decoding method for decoding image information, the decoding method including: inverse binarizing a binary value which has been obtained by binarizing a data value, according to a conversion table in which a plurality of data values and a plurality of binary values are associated with each other, to decode the image information which includes the data value, the data value indicating the number of non-zero coefficients included in a current basic block which is one of one or more basic blocks in a frequency transform block composed of a plurality of frequency transform coefficients; and in the inverse binarizing of the binary value, selecting the conversion table from a plurality of tables including two or more tables which differ from each other in difference between a longest bit length and a shortest bit length of a plurality of binary values associated with the plurality of data values, according to a position of the current basic block in the current frequency transform block which is the frequency transform block including the current basic block, and inverse binarizing the binary value according to the conversion table selected.

In this way, the apparatus, etc. which performs the decoding method is capable of appropriately decoding the information for efficiently representing the plurality of frequency transform coefficients which constitute the basic block. In this way, the apparatus, etc. which performs the decoding method is capable of selecting the conversion table for inverse binarizing the binary value of the data value indicating the number of non-zero coefficients, according to the position of the current basic block. The characteristics of the number of non-zero coefficients differ depending on the position of the current basic block. Accordingly, the apparatus, etc. which performs the decoding method is capable of reflecting the characteristics of the number of non-zero coefficients in the selection of the conversion table, using the position of the current basic block. Accordingly, the apparatus, etc. which performs the decoding method is capable of appropriately selecting the conversion table, and assisting reduction in coding amount of the frequency transform coefficient information.

Furthermore, these general and specific aspects may be implemented using a system, an apparatus, a method, an integrated circuit, a computer program, or a computer-readable recording medium such as a CD-ROM, or any combination of systems, apparatuses, methods, integrated circuits, computer programs, or computer-readable recording media.

Hereinafter, embodiments will be described with reference to the drawings.

It is to be noted that the embodiments described below each show a general or specific example. The numerical values, shapes, materials, constituent elements, the arrangement and connection of the constituent elements, steps, order of the steps, etc., indicated in the following embodiments are mere examples, and therefore are not intended to limit the scope of the claims. Therefore, among the constituent elements in the following embodiments, those not recited in any of the independent claims defining the most generic inventive concepts are described as optional constituent elements.

Embodiment 1

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
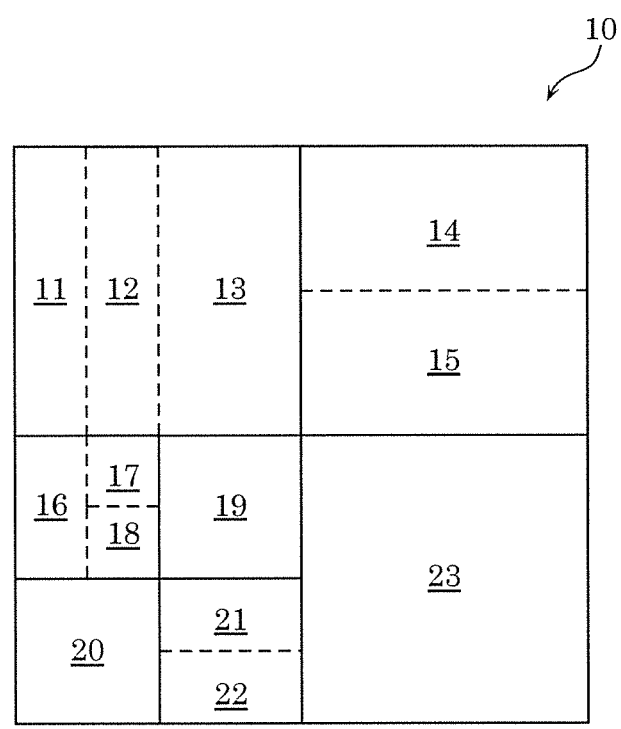
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF a least square error filter for removing compression artifacts is applied. For example, one filter from among a plurality of filters is selected for each 2×2 sub-block in the current block based on direction and activity of local gradients, and is applied.

More specifically first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, $C=5D+A$). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
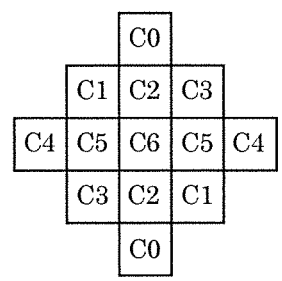
FIG. 4A illustrates one example of a filter shape used in ALF.
Figure 4B:
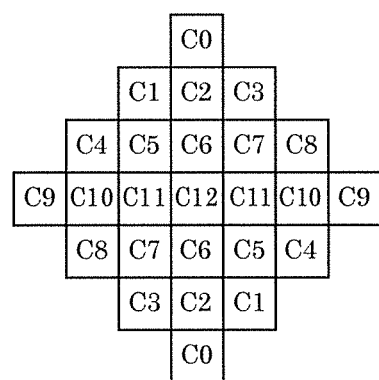
FIG. 4B illustrates another example of a filter shape used in ALF.
Figure 4C:
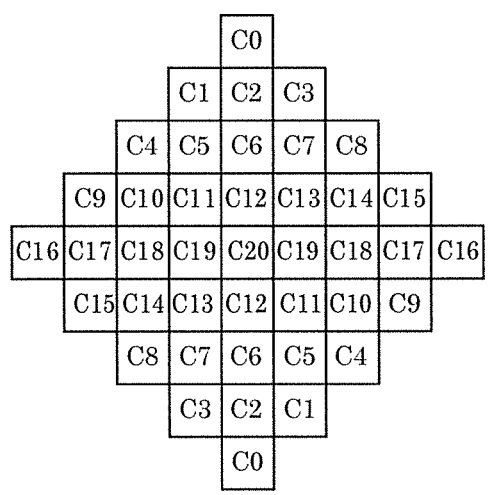
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5:
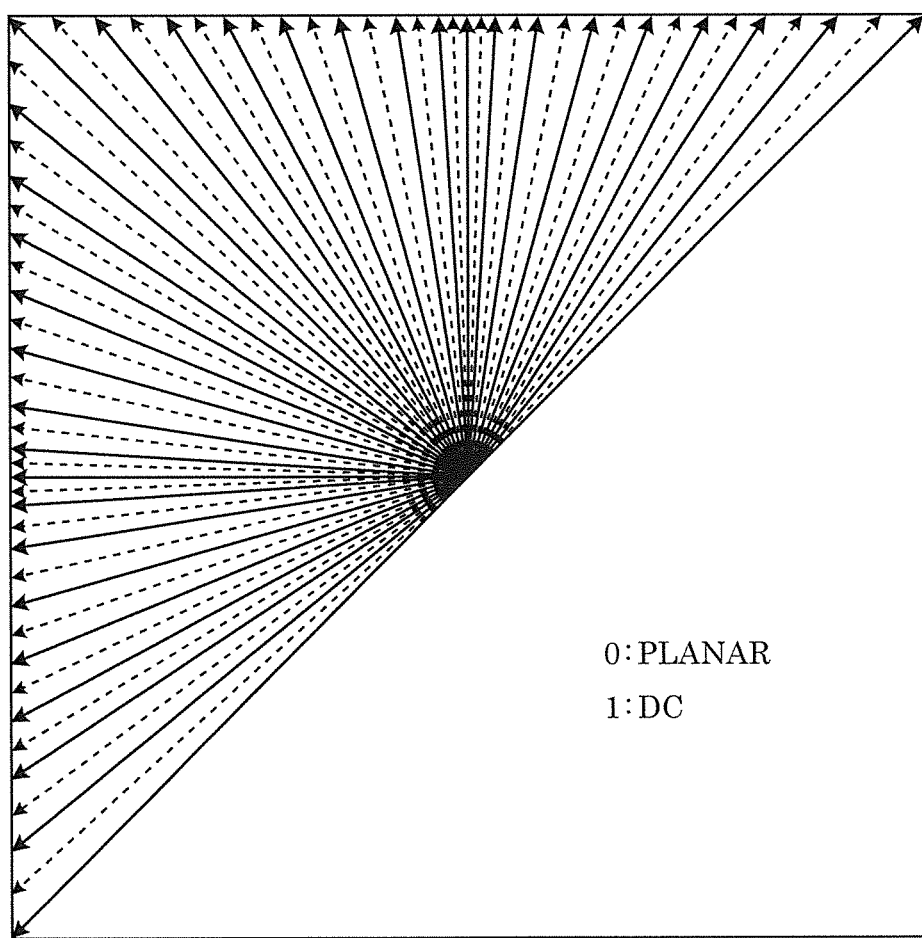
FIG. 5 illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5 illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Note that the motion information may be derived on the decoder side without being signalled. For example, a merge mode defined in the H.265/HEVC standard may be used.

Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

First, a candidate list (a candidate list may be a merge list) of candidates each including a motion vector predictor is generated with reference to motion vectors of encoded blocks that spatially or temporally neighbor the current block. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate, as-is. Alternatively, the motion vector for the current block may be derived by pattern matching performed in the vicinity of a position in a reference picture corresponding to the motion vector of the selected candidate.

Note that an evaluation value is calculated by pattern matching performed between a region in a reference picture corresponding to a motion vector and a predetermined region.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
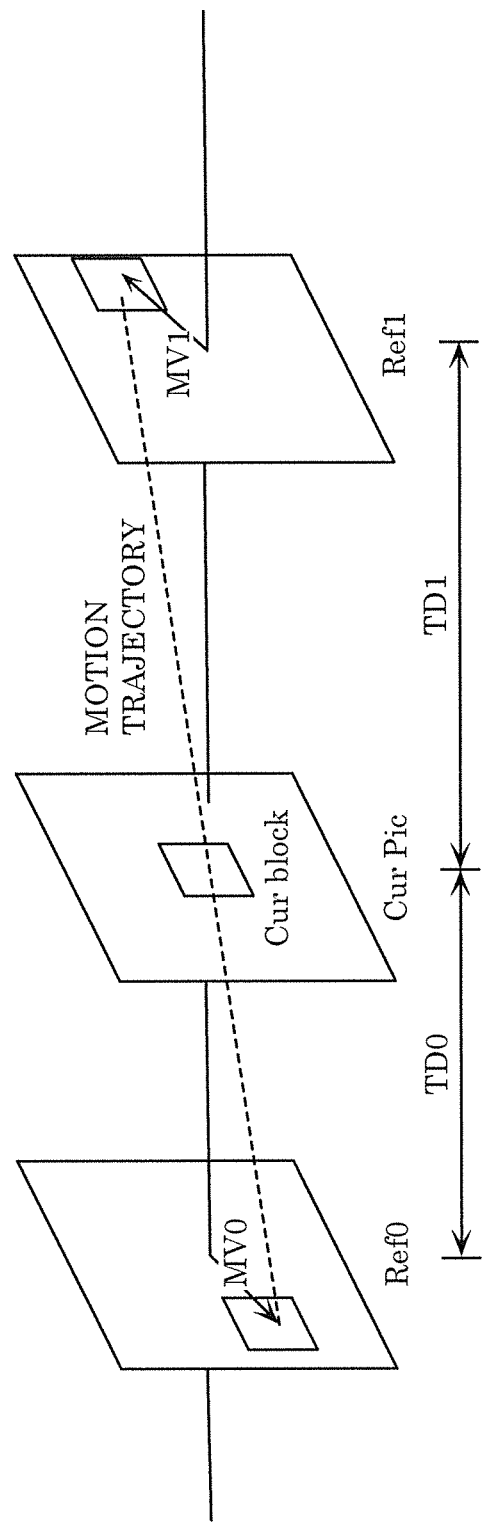
FIG. 6 is for illustrating pattern matching (bilateral matching) between two blocks along a motion trajectory.

FIG. 6 is for illustrating pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1).

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
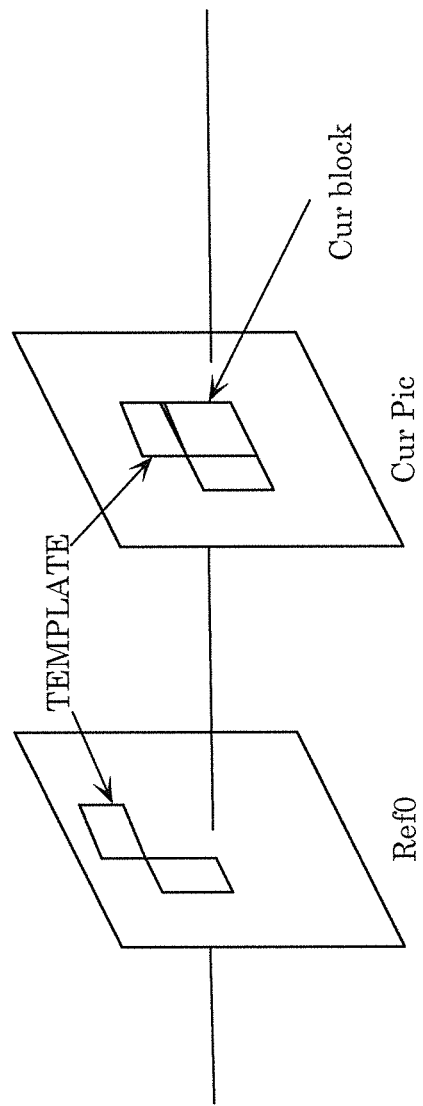
FIG. 7 is for illustrating pattern matching (template matching) between a template in a current picture and a block in a reference picture.

FIG. 7 is for illustrating pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic).

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

It is to be noted that motion information may be derived on the decoder side using a method different from motion estimation. For example, the amount of correction for a motion vector may be calculated using the pixel value of a neighboring pixel in units of a pixel, based on a model assuming uniform linear motion.

Here, a mode for deriving a motion vector based on a model assuming uniform linear motion will be described. This mode is also referred to as a bi-directional optical flow (BIO) mode.

Figure 8:
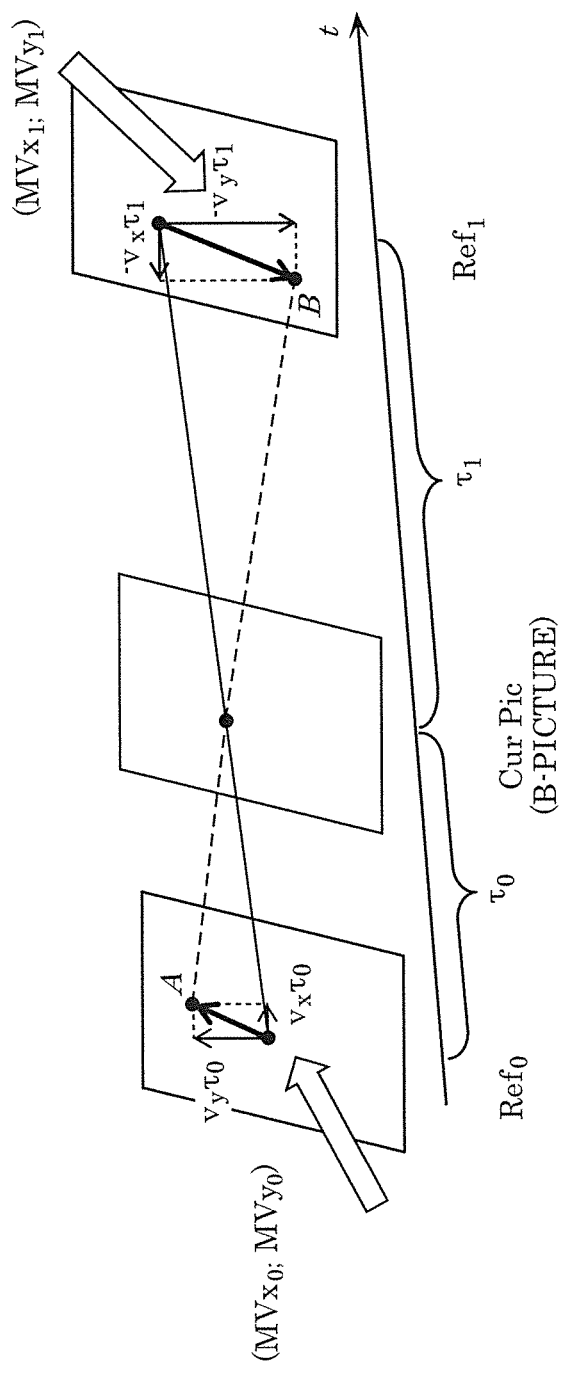
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures ($Ref_0$, $Ref_1$). ($MVx_0$, $MVy_0$) denotes a motion vector corresponding to reference picture $Ref_1$, and ($MVx_1$, $MVy_1$) denotes a motion vector corresponding to reference picture $Ref_1$.

Here, under the assumption of uniform linear motion exhibited by velocity vector $(v_x, v_y)$, ($MVx_0$, $MVy_0$) and ($MVx_1$, $MVy_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \tag{1}$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9:
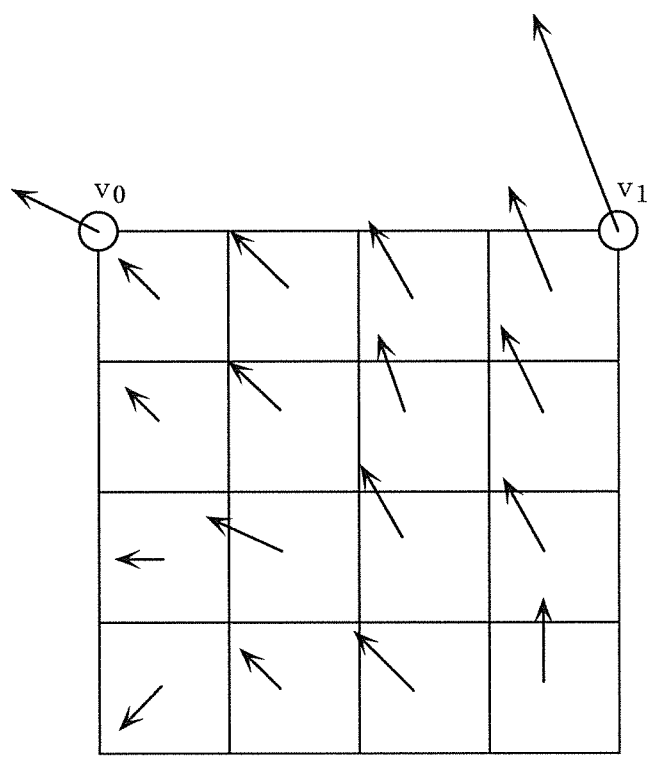
FIG. 9 is for illustrating deriving a motion vector of each sub-block based on motion vectors of neighboring blocks.

FIG. 9 is for illustrating deriving a motion vector of each sub-block based on motion vectors of neighboring blocks. In FIG. 9, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level. CTU level, or sub-block level).

[Prediction Controller]

Prediction controller 128 selects either the intra prediction signal or the inter prediction signal, and outputs the selected prediction signal to subtractor 104 and adder 116.

[Decoder Outline]

Figure 10:
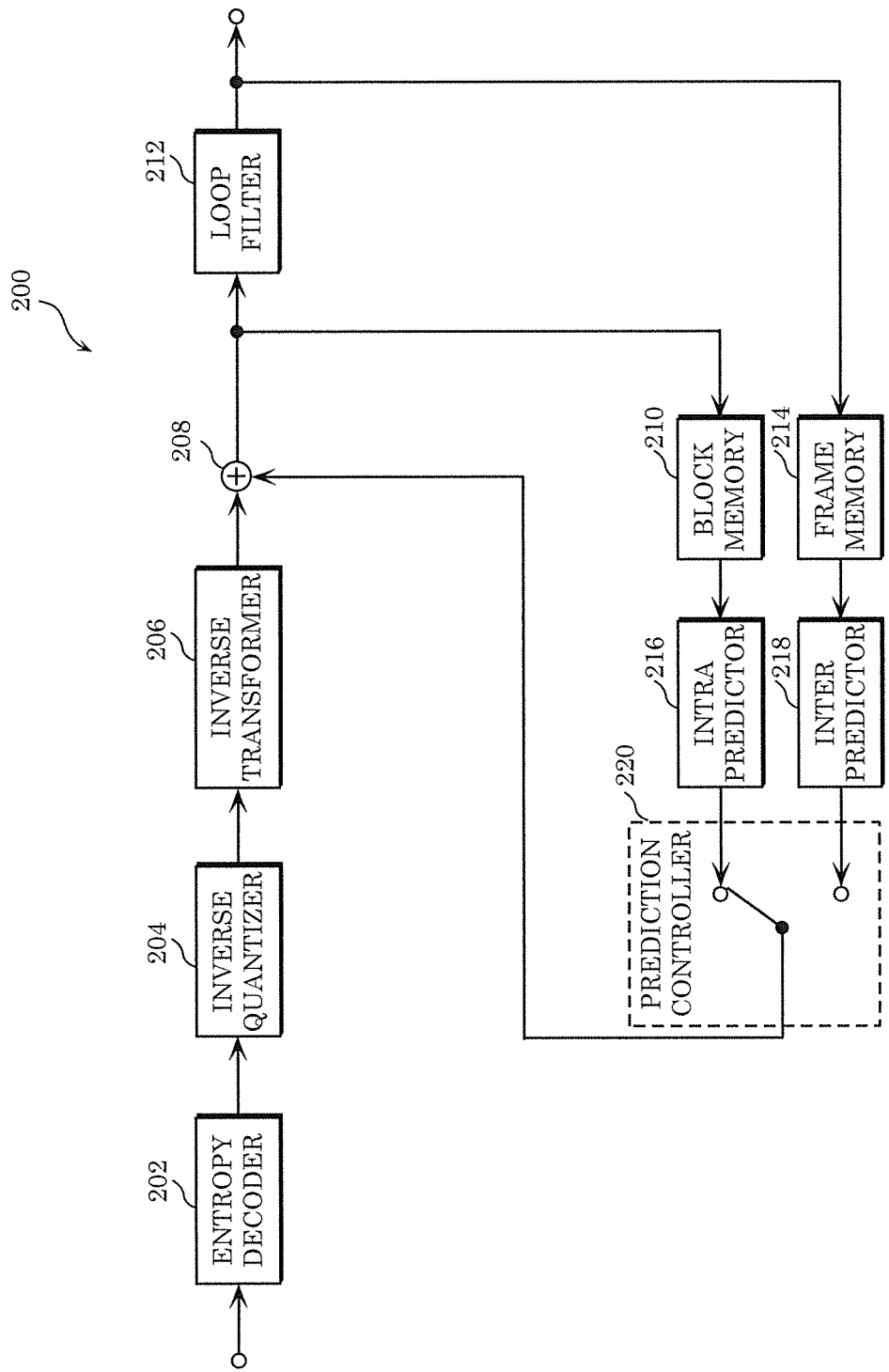
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[A Specific Configuration of the Entropy Encoder in the Encoder]

Figure 11:
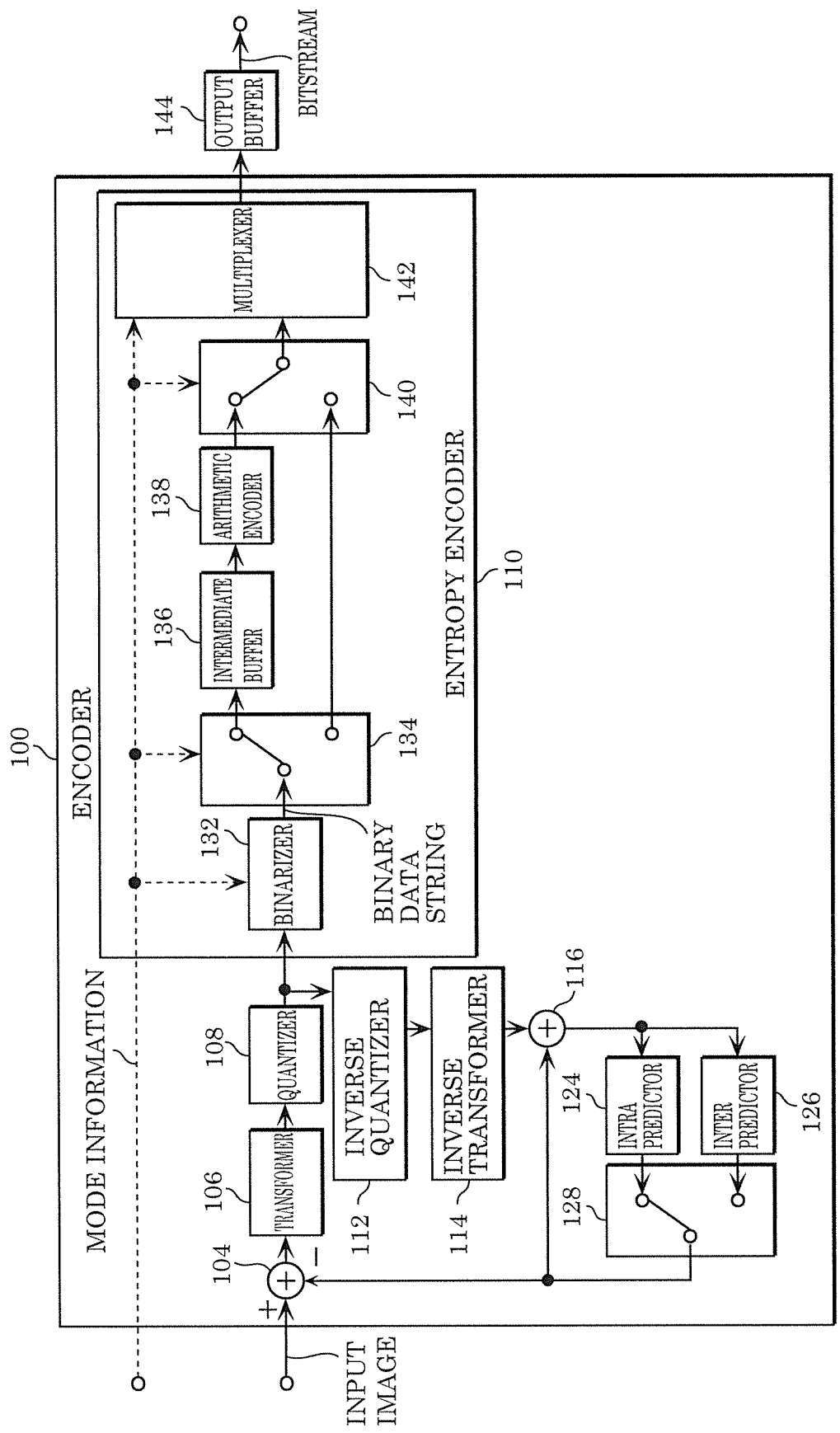
FIG. 11 is a block diagram illustrating a specific functional configuration of an entropy encoder in an encoder according to Embodiment 1.

FIG. 11 is a block diagram illustrating a specific functional configuration of entropy encoder 110 in encoder 100 according to Embodiment 1. Entropy encoder 110 variable-length encodes quantized coefficients output from quantizer 108 to generate a bitstream, and outputs the generated bitstream. The bitstream corresponds to encoded image information, and is also referred to as an encoded signal, an encoded bitstream, or an encoded bit string.

In the example of FIG. 11, entropy encoder 110 includes: binarizer 132; switch 134; intermediate buffer 136; arithmetic encoder 138; switch 140; and multiplexer 142. Entropy encoder 110 generates a bitstream and outputs the generated bitstream to store the generated bitstream in output buffer 144. The bitstream stored in output buffer 144 is arbitrarily output from output buffer 144. Entropy encoder 110 may include output buffer 144.

[The Binarizer in the Entropy Encoder]

Binarizer 132 binarizes quantized coefficients, etc. More specifically, binarizer 132 converts quantized frequency transform coefficients, etc. into a data string in which each of the values is represented by 0 or 1, and outputs the resulting data string. Hereinafter, the data string is also referred to as a binary data string. In addition, the binarization performed by binarizer 132 is basically binarization for arithmetic encoding, and more specifically for binary arithmetic encoding. In other words, binarizer 132 basically derives the binary data string of the image information according to the binarization for arithmetic encoding.

It is to be noted that examples of binarization methods include: unary binarization; truncated unary binarization; unary and kth order exponential Golomb combined binarization; fixed length binarization, table reference, etc.

In addition, for example, entropy encoding according to a context-based adaptive binary arithmetic coding method is performed as the binarization by binarizer 132 and the arithmetic encoding by arithmetic encoder 138. The context-based adaptive binary arithmetic coding method is also referred to as CABAC. The binarization performed by binarizer 132 can be represented as binarization for context-based adaptive binary arithmetic coding method.

[The Switch in the Entropy Encoder]

Switches 134 and 140 operate together according to mode information, and switch whether or not to apply arithmetic encoding to the binary data string. For example, switches 134 and 140 switch whether or not to apply arithmetic encoding to the binary data string according to mode information which is given from outside encoder 100. The mode information may be given as an instruction from a user, a host system, or the like.

For example, the mode information selectively indicates a first mode and a second mode. In other words, the mode information indicates a selected one of the first mode and the second mode. For example, arithmetic encoding is applied to a binary data string in the first mode, and arithmetic encoding is not applied to a binary data string in the second mode.

More specifically, when the mode information indicates the first mode, switch 134 outputs the binary data string output from binarizer 132 to intermediate buffer 136 so as to store the binary data string in intermediate buffer 136. Arithmetic encoder 138 applies arithmetic encoding to the binary data string stored in intermediate buffer 136, and outputs the binary data string to which arithmetic encoding has been applied. Switch 140 outputs the binary data string output from arithmetic encoder 138 to multiplexer 142.

When the mode information indicates the second mode, switch 134 outputs the binary data string output from binarizer 132 to switch 140 as it is. Switch 140 outputs the binary data string output from switch 134 to multiplexer 142. In other words, arithmetic encoding is bypassed. It is to be noted that bypassing arithmetic encoding may be represented as skipping arithmetic encoding in order to avoid confusion with bypass arithmetic encoding which is an aspect of arithmetic encoding.

Mode information and a mode may be also represented as delay mode information and a delay mode, respectively. More specifically, the first mode is a normal mode, and the second mode is a low delay mode. Processing delay is reduced more significantly in the second mode than in the first mode.

[The Intermediate Buffer in the Entropy Encoder]

Intermediate buffer 136 is storage for storing binary data strings, and is also referred to as intermediate memory. Delay occurs in the arithmetic encoding performed by arithmetic encoder 138. In addition, the delay amount varies depending on the content of a binary data string. Intermediate buffer 136 absorbs variation in delay amount, which facilitates the subsequent processing. It is to be noted that inputting data in the storage such as intermediate buffer 136, or the like corresponds to storing data in the storage, and outputting the data from the storage corresponds to reading the data from the storage.

[The Arithmetic Encoder in the Entropy Encoder]

Arithmetic encoder 138 performs arithmetic encoding. More specifically arithmetic encoder 138 reads the binary data string stored in intermediate buffer 136, and applies arithmetic encoding to the binary data string. Arithmetic encoder 138 may apply arithmetic encoding to the binary data string according to the context-based adaptive binary coding method.

For example, arithmetic encoder 138 selects an occurrence probability according to context of a data type, or the like, performs arithmetic encoding according to the selected occurrence probability, and updates the occurrence probability according to the result of the arithmetic encoding. In other words, arithmetic encoder 138 may perform arithmetic encoding according to the variable occurrence probability. The arithmetic encoding performed according to the variable occurrence probability may be also referred to as context-based adaptive arithmetic coding.

In addition, arithmetic encoder 138 may arithmetic encode data having a particular data type, or the like according to a fixed occurrence probability. More specifically, arithmetic encoder 138 may perform arithmetic encoding according to an occurrence probability of 50% as an occurrence probability of 0 or 1. The arithmetic encoding performed according to the fixed occurrence probability may be also referred to as bypass arithmetic encoding.

[The Multiplexer in the Entropy Encoder]

Multiplexer 142 multiplexes mode information and a binary data string to generate a bitstream including the mode information and the binary data string. Multiplexer 142 outputs the bitstream to output buffer 144 so as to store the bitstream in output buffer 144. The bitstream stored in output buffer 144 is arbitrarily output from output buffer 144. In other words, multiplexer 142 outputs the bitstream via output buffer 144.

For example, the mode information may be included in the bitstream as a higher-order parameter. More specifically, the mode information may be included in a sequence parameter set (SPS) in a bitstream, in a picture parameter set (PPS) in the bitstream, or in the slice header in the bitstream. The mode information included in the bitstream is represented as one or more bits.

The binary data string may be included in the slice data. Here, the binary data string may be a binary data string to which arithmetic encoding has been applied, or may be a binary data string to which arithmetic encoding has not been applied.

In addition, the mode information included in the bitstream may be represented also as application information indicating whether or not the binary data string included in the bitstream has been arithmetic encoded. In other words, the mode information may be included in the bitstream as application information indicating whether or not the binary data string included in the bitstream has been arithmetic encoded. The application information may indicate whether the bitstream includes the binary data string to which arithmetic encoding has been applied or the binary data string to which arithmetic encoding has not been applied.

It is to be noted that the mode information may not be included in the bitstream, for example, when the mode information is exchanged in the host system and when the mode information is predefined. In other words, in this case, multiplexing does not need to be performed.

[The Output Buffer]

Output buffer 144 is storage for storing bitstreams, and is also referred to as a coded picture buffer (CPB) or output memory. A bitstream which is obtained by means of encoder 100 encoding image information is stored in output buffer 144. The bitstream stored in output buffer 144 is arbitrarily output, and is multiplexed with, for example, an encoded audio signal, etc.

[A Specific Configuration of an Entropy Decoder in a Decoder]

Figure 12:
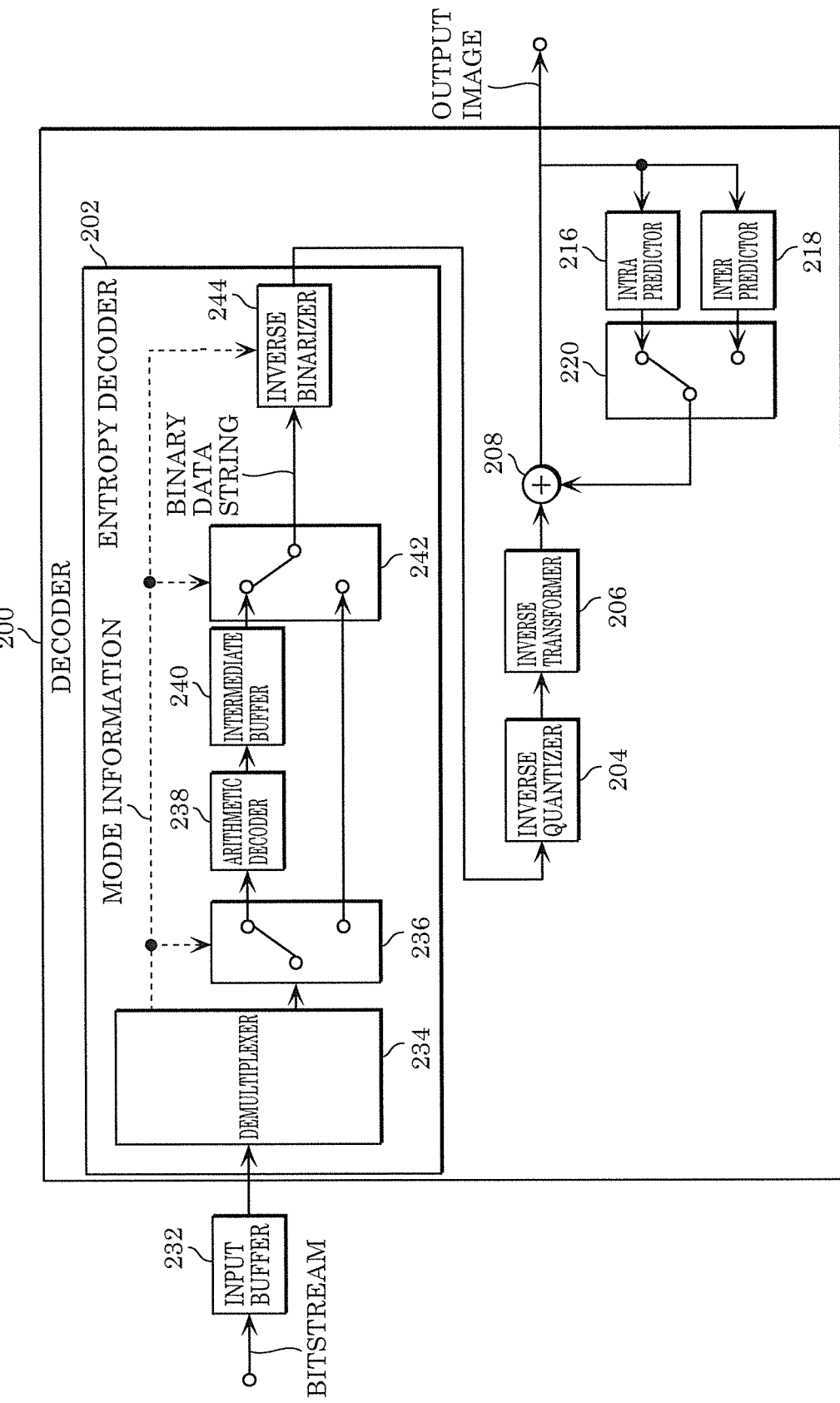
FIG. 12 is a block diagram illustrating a specific functional configuration of an entropy decoder in a decoder according to Embodiment 1.

FIG. 12 is a block diagram illustrating a specific functional configuration of entropy decoder 202 in decoder 200 according to Embodiment 1. Entropy decoder 202 derives quantized coefficients, etc. by entropy decoding a bitstream input via input buffer 232. The bitstream is a bitstream generated by encoder 100 and has, for example, the above-described data structure.

In the example of FIG. 12, entropy decoder 202 includes: demultiplexer 234; switch 236; arithmetic decoder 238; intermediate buffer 240; switch 242; and inverse binarizer 244. Entropy decoder 202 may include input buffer 232.

[The Input Buffer]

Input buffer 232 is storage for storing bitstreams and is also referred to as a CPB or input memory. A bitstream decoded by decoder 200 is, for example, demultiplexed from an encoded audio signal, etc. and is stored in input buffer 232. Decoder 200 reads the bitstream stored in input buffer 232, and decodes the bitstream.

[The Demultiplexer in the Entropy Decoder]

Demultiplexer 234 obtains a bitstream from input buffer 232, demultiplexes mode information and the binary data string from the bitstream, and outputs the mode information and the binary data string. In other words, demultiplexer 234 obtains the bitstream including the mode information and the binary data string via input buffer 232, and outputs the mode information and the binary data string included in the bitstream. The binary data string may be a binary data string to which arithmetic encoding has been applied, or may be a binary data string to which arithmetic encoding has not been applied.

As described above, the mode information may be represented also as application information indicating whether or not the binary data string included in the bitstream to which arithmetic encoding has been applied. It is to be noted that the mode information may not be included in the bitstream, for example, when the mode information is exchanged in the host system and when the mode information is predefined. In this case, the mode information does not need to be demultiplexed and output. The mode information may be given as an instruction from outside decoder 200, specifically, from a user, the host system, or the like.

[The Switch in the Entropy Decoder]

Switches 236 and 242 operate together according to mode information which is obtained from demultiplexer 234, or the like, and switches whether or not to apply arithmetic decoding to the binary data string. For example, arithmetic decoding is applied to the binary data string in the first mode out of the first mode and the second mode selectively indicated by the mode information, and arithmetic decoding is not applied to the binary data string in the second mode.

More specifically, when the mode information indicates the first mode, switch 236 outputs the binary data string which is output from demultiplexer 234 to arithmetic decoder 238. Arithmetic decoder 238 applies arithmetic decoding to the binary data string, and outputs the binary data string which has been arithmetic decoded to store the binary data string to which arithmetic decoding has been applied in intermediate buffer 240. Switch 242 arbitrarily obtains the binary data string stored in intermediate buffer 240, and outputs the binary data string obtained from intermediate buffer 240 to inverse binarizer 244.

When the mode information indicates the second mode, switch 236 outputs the binary data string which is output from demultiplexer 234 to switch 242 as it is. Switch 242 outputs the binary data string output from switch 236 to inverse multiplexer 244. In other words, arithmetic decoding is bypassed. It is to be noted that bypassing arithmetic decoding may be represented as skipping arithmetic decoding in order to avoid confusion with bypass arithmetic decoding which is an aspect of arithmetic decoding.

[The Arithmetic Decoder in the Entropy Decoder]

Arithmetic decoder 238 performs arithmetic decoding. Specifically, arithmetic decoder 238 applies arithmetic decoding to binary data string to which arithmetic encoding has been applied, and outputs the binary data string to which arithmetic decoding has been applied to store the binary data string to which arithmetic decoding has been applied in intermediate buffer 240. The arithmetic decoded binary data string corresponds to the original binary data string to which arithmetic encoding has not been applied. Arithmetic decoder 238 may apply arithmetic decoding to the binary data string according to the context-based adaptive binary coding method.

For example, arithmetic decoder 238 selects an occurrence probability according to context of a data type, or the like, performs arithmetic decoding according to the selected occurrence probability, and updates the occurrence probability according to the result of the arithmetic decoding. In other words, arithmetic decoder 238 may perform arithmetic decoding according to the variable occurrence probability. The arithmetic decoding performed according to the variable occurrence probability may be also referred to as context-based adaptive arithmetic decoding.

In addition, arithmetic decoder 238 may arithmetic decode data having a particular data type, or the like according to a fixed occurrence probability. Specifically arithmetic decoder 238 may perform arithmetic decoding according to an occurrence probability of 50% as an occurrence probability of 0 or 1. The arithmetic decoding performed according to a fixed occurrence probability is also referred to as bypass arithmetic decoding.

[The Intermediate Buffer in the Entropy Decoder]

Intermediate buffer 240 is storage for storing binary data strings which have been arithmetic decoded, and is also referred to as intermediate memory. Delay occurs in the arithmetic decoding performed by arithmetic decoder 238. In addition, the delay amount varies depending on the content of a binary data string. Intermediate buffer 240 absorbs variation in delay amount, which facilitates the subsequent processing.

[The Inverse Binarizer in the Entropy Decoder]

Inverse binarizer 244 derives quantized coefficients, etc. by inverse binarizing a binary data string. Specifically inverse binarizer 244 converts the binary data string in which each of values is represented as 0 or 1 into quantized frequency transform coefficients, etc., and outputs the quantized frequency transform coefficients, etc. to inverse quantizer 204. In addition, inverse binarization performed by inverse binarizer 244 is basically inverse binarization corresponding to binarization for arithmetic encoding, and more specifically inverse binarization corresponding to binarization for binary arithmetic encoding.

In addition, for example, entropy decoding according to a context-based adaptive binary arithmetic coding method is performed as the arithmetic decoding by arithmetic decoder 238 and the inverse binarization by inverse binarizer 244. In other words, inverse binarizer 244 may perform inverse binarization corresponding to the context-based binary arithmetic coding method. In addition, the inverse binarization is also referred to as multi-value processing.

[To Apply or Skip Applying Arithmetic Encoding and Arithmetic Decoding]

Encoder 100 and decoder 200 according to this embodiment are particularly applicable to real-time communication systems, etc. in which encoding and decoding are desired to be performed in a short time. Specifically, encoder 100 and decoder 200 are applicable to teleconference systems, electronic mirrors, etc. For example, in these system environments, a second mode in which arithmetic encoding and arithmetic decoding are not performed is used.

In addition, application information basically indicates, in units of at least one entire picture, whether arithmetic encoding has been applied to a binary data string included in a bitstream. In addition, whether or not to apply arithmetic encoding is switched in units of at least one entire picture.

However, whether or not to apply arithmetic encoding may be switched in smaller unit. For example, arithmetic encoding and arithmetic decoding may be skipped for data having a particular data type. More specifically, arithmetic encoding and arithmetic decoding may be skipped instead of bypass arithmetic encoding and bypass arithmetic decoding.

In addition, for example, switching between context arithmetic encoding, bypass arithmetic encoding, and arithmetic encoding may be performed. Likewise, switching between context arithmetic decoding, bypass arithmetic decoding, and arithmetic decoding may be performed.

In addition, application information indicating whether or not arithmetic encoding has been applied to a binary data string may be represented by a 1-bit flag or in another form. For example, by adding, to a bitstream, information indicating that arithmetic encoding has been applied to a binary data string, the bitstream can include additional information as application information. Alternatively, by adding, to a bitstream, information indicating that arithmetic encoding has been applied to a binary data string, the bitstream can include additional information as application information.

In addition, the application information may be included in the bitstream as information common to the other information. For example, when information indicating the type of a picture has been included in the bitstream and whether or not to apply arithmetic encoding is switched according to the type of the picture, the information indicating the type of the picture may be application information.

[Switching Syntax Structures]

Coding amounts may vary significantly depending on whether arithmetic encoding and arithmetic decoding are applied. In particular, the information amount of frequency transform coefficient information related to frequency components of an image is large. Accordingly, when arithmetic encoding and arithmetic decoding are not used for such frequency transform coefficient information, the coding amount may be extremely large.

In view of this, binarizer 132 of encoder 100 binarizes such frequency transform coefficient information in image information according to two different binarization formats which are a first mode in which arithmetic encoding is applied and a second mode in which arithmetic encoding is not applied. Likewise, inverse binarizer 244 of decoder 200 inverse binarizes such frequency transform coefficient information in image information according to two different inverse binarization formats which are a first mode in which arithmetic decoding is applied and a second mode in which arithmetic decoding is not applied.

Binarizer 132 of encoder 100 may be provided with mode information in the same manner as switches 134 and 140 of encoder 100. Binarizer 132 of encoder 100 may obtain given mode information and switch between the binarization formats for the frequency transform coefficient information according to the mode information.

Likewise, inverse binarizer 244 of decoder 200 may be provided with the mode information in the same manner as switches 236 and 242 of decoder 200. Inverse binarizer 244 of decoder 200 may obtain the given mode information and switch between inverse binarization formats for the frequency transform coefficient information according to the mode information.

For example, different syntax structures are applied to the frequency transform coefficient information between the first mode and the second mode.

Figure 13:
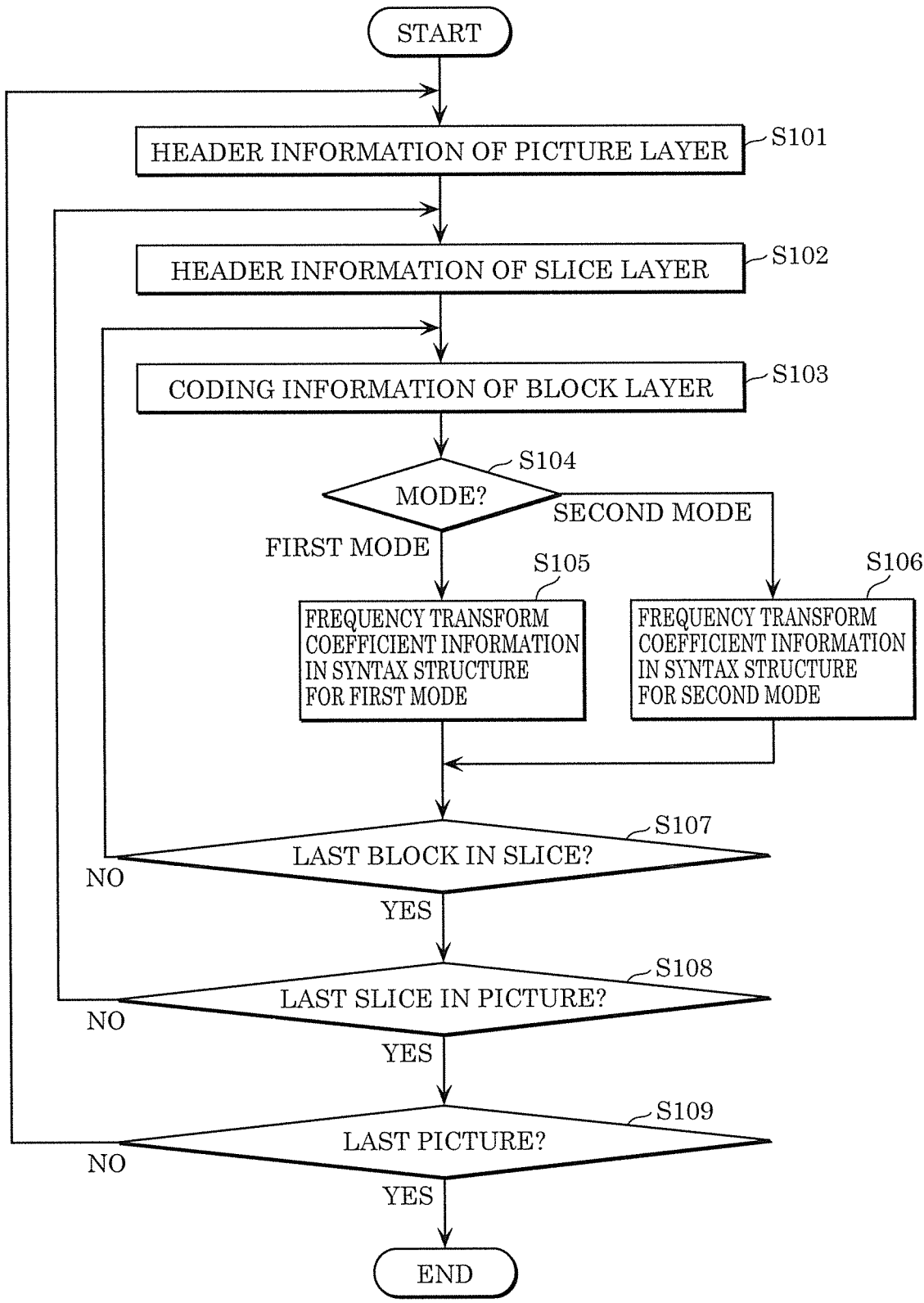
FIG. 13 is a flowchart indicating a syntax structure according to Embodiment 1.

FIG. 13 is a flowchart indicating a syntax structure according to Embodiment 1. The syntax structure corresponds to a binarization format and an inverse binarization format. Binarizer 132 binarizes image information according to the syntax structure indicated in FIG. 13 to transform the image information to a binary data string.

More specifically, binarizer 132 binarizes header information of a picture layer (S101). Next, binarizer 132 binarizes header information of a slice layer (S102). Next, binarizer 132 binarizes coding information of a block layer (S103).

More specifically, binarizer 132 binarizes the coding information of the block layer other than the frequency transform coefficient information. For example, the frequency transform coefficient information indicates quantized frequency transform coefficients. In addition, for example, the coding information of the block layer includes prediction parameter information. The prediction parameter information indicates a prediction parameter related to a prediction method for an image.

The prediction parameter information may indicate a coding mode which is either an intra prediction mode or an inter prediction mode. In addition, the prediction parameter information may indicate a motion vector and a reference picture which are related to inter prediction. In addition, the prediction parameter information may indicate an intra prediction mode related to a prediction direction of the intra prediction.

Binarizer 132 then binarizes, in the first mode (the first mode in S104), frequency transform coefficient information using a syntax structure for the first mode (S105). Binarizer 132 then binarizes, in the second mode (the second mode in S104), frequency transform coefficient information in a syntax structure for the second mode (S106).

Binarizer 132 then repeats processes (S103 to S106) on each of the blocks included in a slice (S107). Binarizer 132 then repeats processes (S102 to S107) on each of the slices included in a picture (S108). Binarizer 132 then repeats processes (S101 to S108) on each of pictures (S109).

In this way, binarizer 132 binarizes the frequency transform coefficient information using different syntaxes between the first mode and the second mode, and binarizes the other information using a common syntax between the first mode and the second mode.

In addition, inverse binarizer 244 of decoder 200 inverse binarizes binary data string according to the syntax structure indicated in FIG. 13 to transform the binary data string to image information.

More specifically, inverse binarizer 244 inverse binarizes the binary data string of the header information of the picture layer (S101). Next, inverse binarizer 244 inverse binarizes the binary data string of the header information of the slice layer (S102). Next, inverse binarizer 244 inverse binarizes the binary data string of coding information in a block layer (S103). More specifically, inverse binarizer 244 inverse binarizes the binary data string of coding information in the block layer other than the binary data string of the frequency transform coefficient information.

Inverse binarizer 244 then inverse binarizes, in the first mode (the first mode in S104), the binary data string of the frequency transform coefficient information using the syntax structure for the first mode (S105). Inverse binarizer 244 then inverse binarizes, in the second mode (the second mode in S104), the binary data string of the frequency transform coefficient information using the syntax structure for the second mode (S106).

Inverse binarizer 244 then repeats processes (S103 to S106) on each of the blocks included in the slice (S107). Inverse binarizer 244 then repeats processes (S102 to S107) on each of the slices included in the picture (S108). Inverse binarizer 244 then repeats processes (S101 to S108) on each of the pictures (S109).

In this way, inverse binarizer 244 inverse binarizes the binary data string of the frequency transform coefficient information using the different syntax structures between the first mode and the second mode, and inverse binarizes the binary data string of the other information using the common syntax structure between the first mode and the second mode.

In the first mode, arithmetic encoding and arithmetic decoding are applied. Accordingly, the syntax structure suitable for application of arithmetic encoding and arithmetic decoding is used as the syntax structure for the first mode. For example, the syntax structure for the first mode may be a uniform syntax structure for reducing the coding amount in arithmetic encoding, or a simple syntax structure that requires a small processing load for binarization.

In the second mode, arithmetic encoding and arithmetic decoding are not applied. Accordingly, the syntax structure for reducing the coding amount which is required for the binarization itself is used as the syntax structure for the second mode.

In the example indicated in FIG. 13, the different syntax structures between the first mode and the second mode are applied only to the frequency transform coefficient information included in image information and indicating the frequency transform coefficients related to the frequency components of an image. Subsequently, the common syntax structure between the first mode and the second mode is applied to all the image information other than the frequency transform coefficient information. For example, the common syntax structure between the first mode and the second mode is applied to prediction parameter information included in the image information and indicating prediction parameters related to prediction methods for an image.

Although the different syntax structures between the first mode and the second mode are applied to only the frequency transform coefficient information in the example of FIG. 13, it is to be noted that the different syntax structures between the first mode and the second mode may be applied to the other information. More specifically, the different syntax structures between the first mode and the second mode may be applied to the information part which is included in the image information and including (i) the frequency transform coefficient information and (ii) the information which is other than the frequency transform coefficient information and to which the different syntax structures are to be applied. In this case, different syntax structures are applied also to the information which is other than the frequency transform coefficient information and to which the different syntax structures are to be applied in addition to the frequency transform coefficient information, according to one of the first mode in which arithmetic encoding and arithmetic decoding are applied and the second mode in which arithmetic encoding and arithmetic decoding are not applied. Thus, compared to the case in which the common syntax structure is applied between the first mode and the second mode, the coding amount of the information which is other than the frequency transform coefficient information and to which the different syntax structure is to be applied may be reduced in at least one of the first mode and the second mode.

In addition, although the common syntax structure is applied to the prediction parameter information between the first mode and the second mode in the example of FIG. 13, it is to be noted that different syntax structures may be applied to some of prediction parameters included in the prediction parameter information between the first mode and the second mode. For example, (i) the common syntax structure may be applied to any or all of information related to coding modes; information related to prediction directions in intra prediction; information related to reference pictures in inter prediction; and information related to motion vectors in inter prediction, and (ii) the different syntax structures between the first mode and the second mode may be applied to the parameters other than the prediction parameters to which the common syntax structure is applied between the first mode and the second mode. In this case, compared to the case in which the common syntax structure is applied to the entirety of the prediction parameter information between the first mode and the second mode, the coding amount of the prediction parameter information may be reduced in at least one of the first mode and the second mode.

[A Basic Block]

Binarizer 132 of encoder 100 binarizes a frequency transform block in units of a basic block. For example, binarizer 132 divides the frequency transform block into a plurality of basic blocks, and binarizes each of the basic blocks. The frequency transform block is a block including a plurality of frequency transform coefficients obtainable through frequency transform of a transform unit. In other words, the frequency transform block corresponds to a transform unit on which frequency transform has been performed, and can be represented as a frequency transform coefficient block.

For example, when the transform unit is a block composed of 16×16 pixel values, a frequency transform block of 16×16 frequency transform coefficients is obtained through the frequency transform of the transform unit. Subsequently, for example, binarizer 132 divides the frequency transform block having a 16×16 size into a plurality of basic blocks each having a 4×4 size. Subsequently, binarizer 132 binarizes the frequency transform block having the 16×16 size in units of a basic block having the 4×4 size.

In addition, more specifically, binarizer 132 binarizes, for each of one or more basic blocks which constitute the frequency transform block, the plurality of frequency transform coefficients included in the frequency transform block, according to a predetermined scan order defined in a descending order of frequencies of the one or more basic blocks.

In addition, binarizer 132 binarizes position information indicating the position of a specific basic block in the frequency transform block in the second mode. The specific basic block is a basic block including a non-zero coefficient first in the scan order in the one or more basic blocks which constitute the frequency transform block. The non-zero coefficient is a frequency transform coefficient whose absolute value is not zero.

Further in the second mode, binarizer 132 binarizes only block information of each of the specific basic block and the following basic block(s) in the above-described scan order out of the one or more basic blocks which constitute the frequency transform block. The block information indicates the plurality of frequency transform coefficients which constitute the basic blocks. It is to be noted that the specific basic block and the following basic block(s) in the scan order include the specific basic block and one or more basic blocks which follow the specific basic block in the scan order.

In this way, encoder 100 is capable of binarizing the position information and the block information as the frequency transform coefficient information in the second mode. Since encoder 100 binarizes the block information of each of the specific basic block and the basic block(s) in the scan order, encoder 100 is capable of assisting reduction in the length of the binary data string of the frequency transform coefficient information. Encoder 100 is capable of outputting a bitstream including the binary data string of the frequency transform coefficient information.

In addition, for example, in the first mode, binarizer 132 may binarize all of the one or more basic blocks which constitute the frequency transform block instead of binarizing the position information of the specific basic block. In this way, binarizer 132 is capable of binarizing the frequency transform coefficient information in different modes which are the first mode and the second mode.

Likewise, inverse binarizer 244 of decoder 200 inverse binarizes the binary data string of the frequency transform block in units of a basic block. More specifically, inverse binarizer 244 of decoder 200 inverse binarizes the binary data string of the plurality of frequency transform coefficients included in the frequency transform block in units of a basic block according to the above-described scan order.

In addition, for example, in the second mode, inverse binarizer 244 of decoder 200 may inverse binarize the binary data string of the position information indicating the position of the specific basic block in the frequency transform block. Further in the second mode, inverse binarizer 244 then inverse binarizes only the binary data string of the block information indicating the plurality of frequency transform coefficients which constitute each of the specific basic block and the following basic block(s) in the above-described scan order out of the one or more basic blocks.

In this way, decoder 200 is capable of inverse binarizing the binary data string of the position information and the block information as the binary data string of the frequency transform coefficient information in the second mode. Since decoder 200 inverse binarizes the binary data string of the block information of each of the specific basic block and the basic block(s) in the scan order, decoder 200 is capable of assisting reduction in the length of the binary data string of the frequency transform coefficient information.

In addition, for example, in the first mode, inverse binarizer 244 may inverse binarize the binary data string of all of the one or more basic blocks which constitute the frequency transform block instead of inverse binarizing the binary data string of the position information of the specific basic block. In this way, inverse binarizer 244 is capable of inverse binarizing the binary data string of the frequency transform coefficient information in the different modes between the first mode and the second mode.

FIGS. 14A to 14I are each a conceptual diagram indicating one of one or more basic blocks in a frequency transform block according to Embodiment 1. Here, the sizes of the frequency transform blocks range from 4×4 to 16×16, and the size of the basic block is 4×4. The sizes and shapes of frequency transform blocks depend on the sizes and shapes of transform units. The shape of the frequency transform block may be a square having equal horizontal and vertical lengths, or may be a rectangle having unequal horizontal and vertical lengths.

Figure 14A:
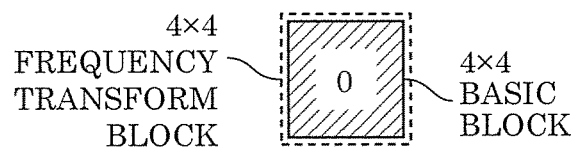
FIG. 14A is a conceptual diagram of a basic block in a 4×4 frequency transform block according to Embodiment 1.
Figure 14B:
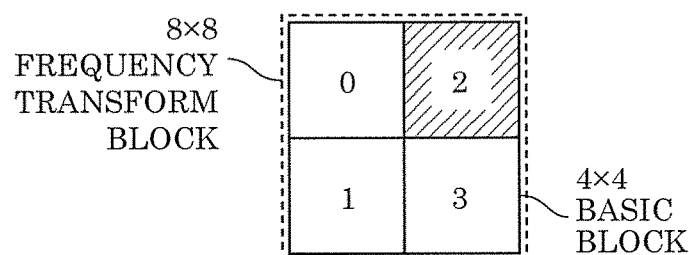
FIG. 14B is a conceptual diagram of basic blocks in an 8×8 frequency transform block according to Embodiment 1.
Figure 14C:
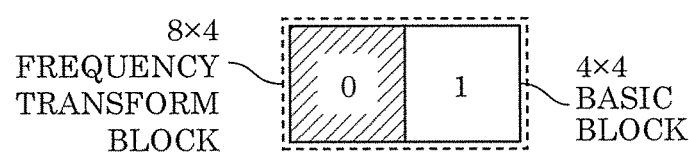
FIG. 14C is a conceptual diagram of basic blocks in an 8×4 frequency transform block according to Embodiment 1.
Figure 14D:
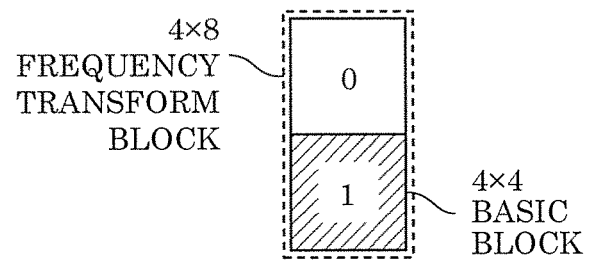
FIG. 14D is a conceptual diagram of basic blocks in a 4×8 frequency transform block according to Embodiment 1.
Figure 14E:
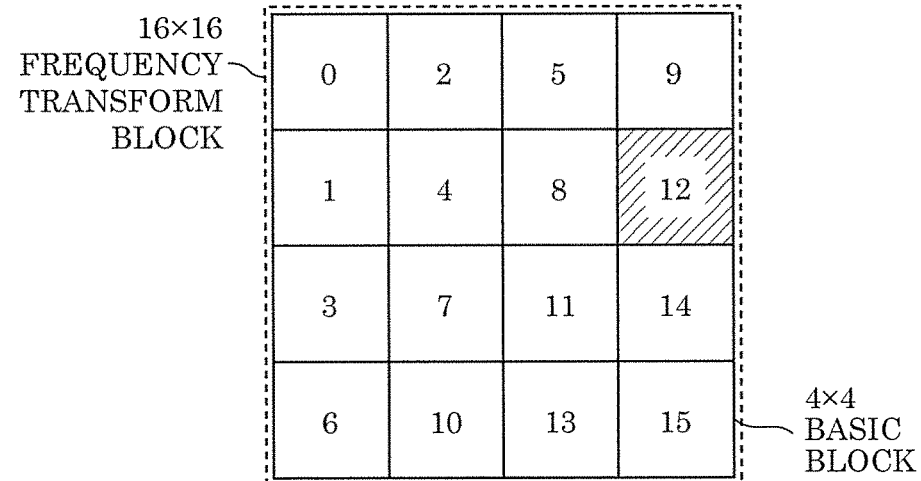
FIG. 14E is a conceptual diagram of basic blocks in a 16×16 frequency transform block according to Embodiment 1.

More specifically, FIG. 14A illustrates a single basic block in a 4×4 frequency transform block. FIG. 14B illustrates four basic blocks in an 8×8 frequency transform block. FIG. 14C illustrates two basic blocks in an 8×4 frequency transform block. FIG. 14D illustrates two basic blocks in an 4×8 frequency transform block. FIG. 14E illustrates sixteen basic blocks in a 16×16 frequency transform block.

Figure 14F:
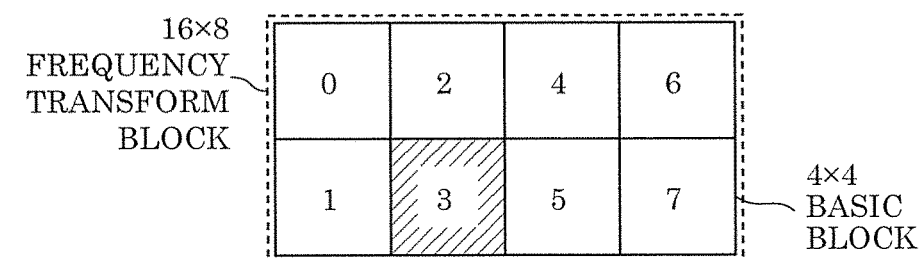
FIG. 14F is a conceptual diagram of basic blocks in a 16×8 frequency transform block according to Embodiment 1.
Figure 14G:
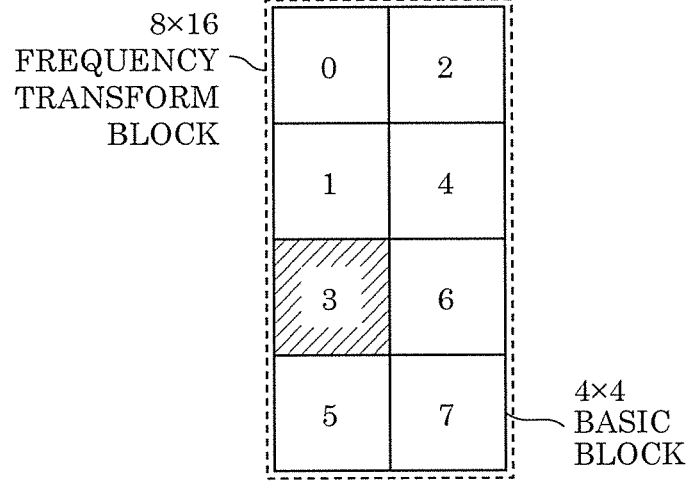
FIG. 14G is a conceptual diagram of basic blocks in an 8×16 frequency transform block according to Embodiment 1.
Figure 14H:
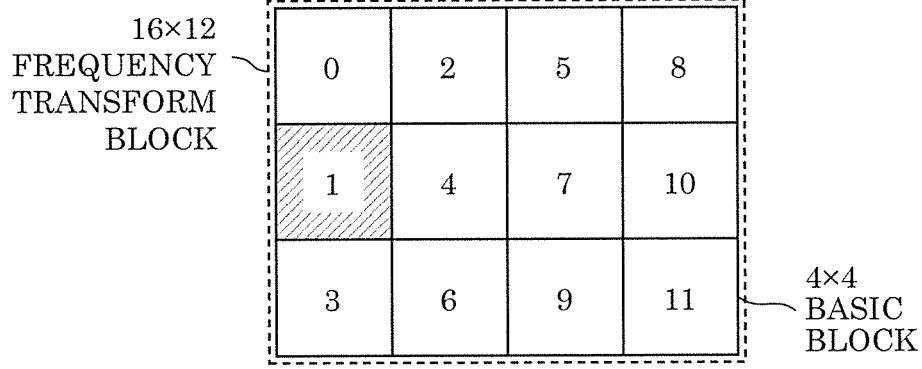
FIG. 14H is a conceptual diagram of basic blocks in a 16×12 frequency transform block according to Embodiment 1.
Figure 14I:
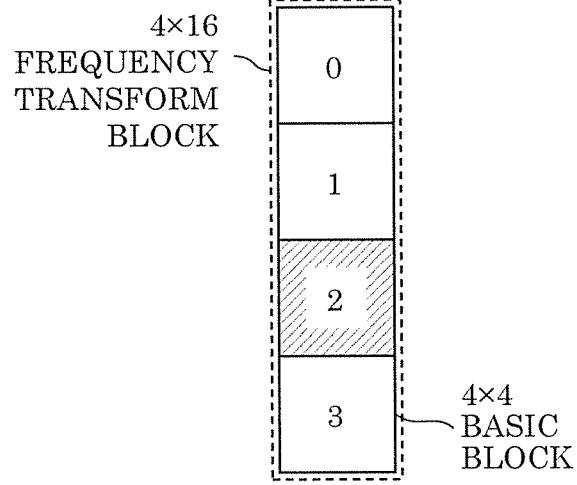
FIG. 14I is a conceptual diagram of basic blocks in a 4×16 frequency transform block according to Embodiment 1.

FIG. 14F illustrates eight basic blocks in a 16×8 frequency transform block. FIG. 14G illustrates eight basic blocks in an 8×16 frequency transform block. FIG. 14H illustrates twelve basic blocks in a 16×12 frequency transform block. FIG. 14I illustrates four basic blocks in an 4×16 frequency transform block.

The number indicated in each of the one or more basic blocks in each of FIGS. 14A to 14I indicates the position of the basic block(s) in the frequency transform block. In this example, the numbers indicating the positions of the basic blocks in the frequency transform block are defined in an ascending order of frequencies. In other words, the numbers indicating the positions of the basic blocks are defined to be smaller as the frequencies of the basic blocks are lower.

It is to be noted that, in the frequency transform block, the part closer to the upper left corner indicates lower frequencies and the part closer to the lower right corner indicates higher frequencies. In addition, in the frequency transform block, the part closer to the lower left corner indicates frequencies which are lower in the horizontal direction and higher in the vertical direction, and the part closer to the upper right corner indicates frequencies which are higher in the horizontal direction and lower in the vertical direction.

In short, the frequency transform coefficients which constitute the two-dimensional frequency transform block indicate frequency component values which are higher in the horizontal direction as they are closer to the right end. In other words, the frequency transform coefficients which constitute the two-dimensional frequency transform block indicate frequency component values which are higher in the vertical direction as they are closer to the lower end.

The frequency levels of a plurality of basic blocks arranged in the direction toward the lower left end or the upper right end are regarded to be the same. Here, the numbers indicating the positions of the plurality of basic blocks whose frequency levels are the same are defined in an ascending order of frequencies in the horizontal direction.

The scan order is defined according to the descending order of frequencies. For example, the scan order is defined according to the descending order of the numbers indicating the positions of the basic blocks. The basic block whose position is indicated by the largest position number is assigned at the starting position of the scan order, and the basic block whose position is indicated by the smallest position number is assigned at the ending position of the scan order. In this example, the scan order of the plurality of basic blocks whose frequency levels are the same are defined according to the descending order of frequencies in the horizontal direction.

In each of FIGS. 14A to 14I, the specific basic block is indicated by diagonal hatching. The specific basic block is a basic block including a non-zero coefficient first in the scan order in the one or more basic blocks which constitute the frequency transform block.

In the second mode, binarizer 132 of encoder 100 binarizes the position information of the specific basic block. In this example, binarizer 132 binarizes the number indicating the position of the specific basic block.

Binarizer 132 then binarizes only block information of each of the specific basic block and the following basic block(s) in the scan order out of the one or more basic blocks which constitute the frequency transform block. In this example, binarizer 132 binarizes the block information of the specific basic block, and binarizes the block information of the basic block whose number is smaller than that of the specific basic block.

In addition, in the second mode, inverse binarizer 244 of decoder 200 inverse binarizes the binary data string of the position information of the specific block diagram. In this example, inverse binarizer 244 inverse binarizes the binary data string of the number indicating the position of the specific basic block.

Inverse binarizer 244 then inverse binarizes only block information of each of the specific basic block and the following basic block(s) in the scan order out of the one or more basic blocks which constitute the frequency transform block. In this example, inverse binarizer 244 inverse binarizes the binary data string of the block information of the specific basic block, and inverse binarizes the binary data string of the block information of each of at least one basic block which is included in the one or more basic blocks and whose number is smaller than that of the specific basic block.

In this way, encoder 100 and decoder 200 are capable of shortening the binary data string of the frequency transform coefficient information in the second mode. Accordingly, encoder 100 and decoder 200 are capable of preventing increase in the coding amount in the second mode in which arithmetic encoding and arithmetic decoding are not applied.

It is to be noted that binarizer 132 may binarize the position information of the specific basic block in the first mode in addition to the second mode. In the first mode, binarizer 132 may binarize only the block information of each of the specific basic block and the following basic block(s) in the scan order out of the one or more basic blocks which constitute the frequency transform block.

Likewise, inverse binarizer 244 may inverse binarize the binary data string of the position information of the specific basic block in the first mode in addition to the second mode. In the first mode, inverse binarizer 244 then inverse binarizes only the binary data string of the block information of each of the specific basic block and the following basic block(s) in the scan order out of the one or more basic blocks which constitute the frequency transform block.

In this way, encoder 100 and decoder 200 are capable of shortening the binary data string of the frequency transform coefficient information also in the first mode. Accordingly, in this way, the coding amount may be reduced in the first mode in which arithmetic encoding and arithmetic decoding are applied. In this case, it is to be noted that the same syntax structure may be applied to the frequency transform coefficient information between the first mode and the second mode. Alternatively, different syntax structures may be applied to the frequency transform coefficient information between the first mode and the second mode according to another method.

In addition, the sizes of frequency transform blocks are not limited to the examples indicated in FIGS. 14A to 14I, and other sizes are possible. A plurality of sizes may be used as the sizes of a plurality of frequency transform blocks in a single picture. In addition, the sizes of the basic block is not limited to 4×4, and other sizes are possible. One or more sizes may be used as the sizes of the plurality of basic blocks in the single picture.

FIGS. 14A to 14I each shows the number indicating the position of the basic block as position information indicating the position of the basic block. The numbers shown in FIGS. 14A to 14I are examples, and other numbers based on another standard may be used as the numbers indicating the positions of the basic blocks. Alternatively other information different from the numbers may be used as the numbers indicating the positions of the basic blocks.

In addition, when the size of the frequency transform block and the size of the basic block are the same, frequency transform coefficient information does not always need to include the position information of the specific basic block. In other words, when the number of basic blocks included in the frequency transform block is 1, the frequency transform coefficient information does not always need to include the position information of the specific basic block. When the number of basic blocks included in the frequency transform block is 2, the frequency transform coefficient information may include the position information of the specific basic block.

In the case of a frequency transform block which does not include any non-zero coefficient, the frequency transform coefficient information does not always need to include the position information of the specific basic block in the frequency transform block. In this case, the frequency transform coefficient information does not always need to include the block information indicating a plurality of frequency transform coefficients which constitute each of the specific basic block and the following basic block(s). The frequency transform coefficient information of the frequency transform block which does not include non-zero coefficient does not always need to be binarized or encoded.

In addition, binarizer 132 does not always need to binarize the frequency transform block in units of a basic block in the first mode. In other words, binarizer 132 may binarize the plurality of frequency transform coefficients included in the frequency transform block in the first mode regardless of the basic block.

Likewise, inverse binarizer 244 does not always need to inverse binarize the binary data string of the frequency transform block in units of a basic block in the first mode. In other words, inverse binarizer 244 may inverse binarize the binary data string of the plurality of frequency transform coefficients included in the frequency transform block in the first mode regardless of the basic block.

[The Use of a Table in which 0 is not Included as the Number of Non-Zero Coefficients]

Binarizer 132 of encoder 100 binarizes a data value indicating the number of non-zero coefficients included in a basic block as a part of frequency transform coefficient information in the second mode. Also in the second mode, inverse binarizer 244 of decoder 200 inverse binarizes the binary data string obtained by binarizing the data value indicating the number of non-zero coefficients included in the basic block as the part of the frequency transform coefficient information. In this way, the plurality of frequency transform coefficients which constitute the basic block may be represented efficiently.

Binarizer 132 uses a conversion table in which a plurality of data values and a plurality of binary values are associated with each other in the binarization of the data value indicating the number of non-zero coefficients. Likewise, inverse binarizer 244 uses a conversion table in which the plurality of data values and the plurality of binary values are associated with each other in the inverse binarization of the data value indicating the number of non-zero coefficients. This conversion table may be represented also as a variable length coding table.

For example, the conversion table may be selected from a plurality of tables which are a table which includes association of a data value indicating 0 as the number of non-zero coefficients and a table which does not include association of a data value indicating 0 as the number of non-zero coefficients. In this way, the coding amount of the frequency transform coefficient information may be reduced.

Figure 15:
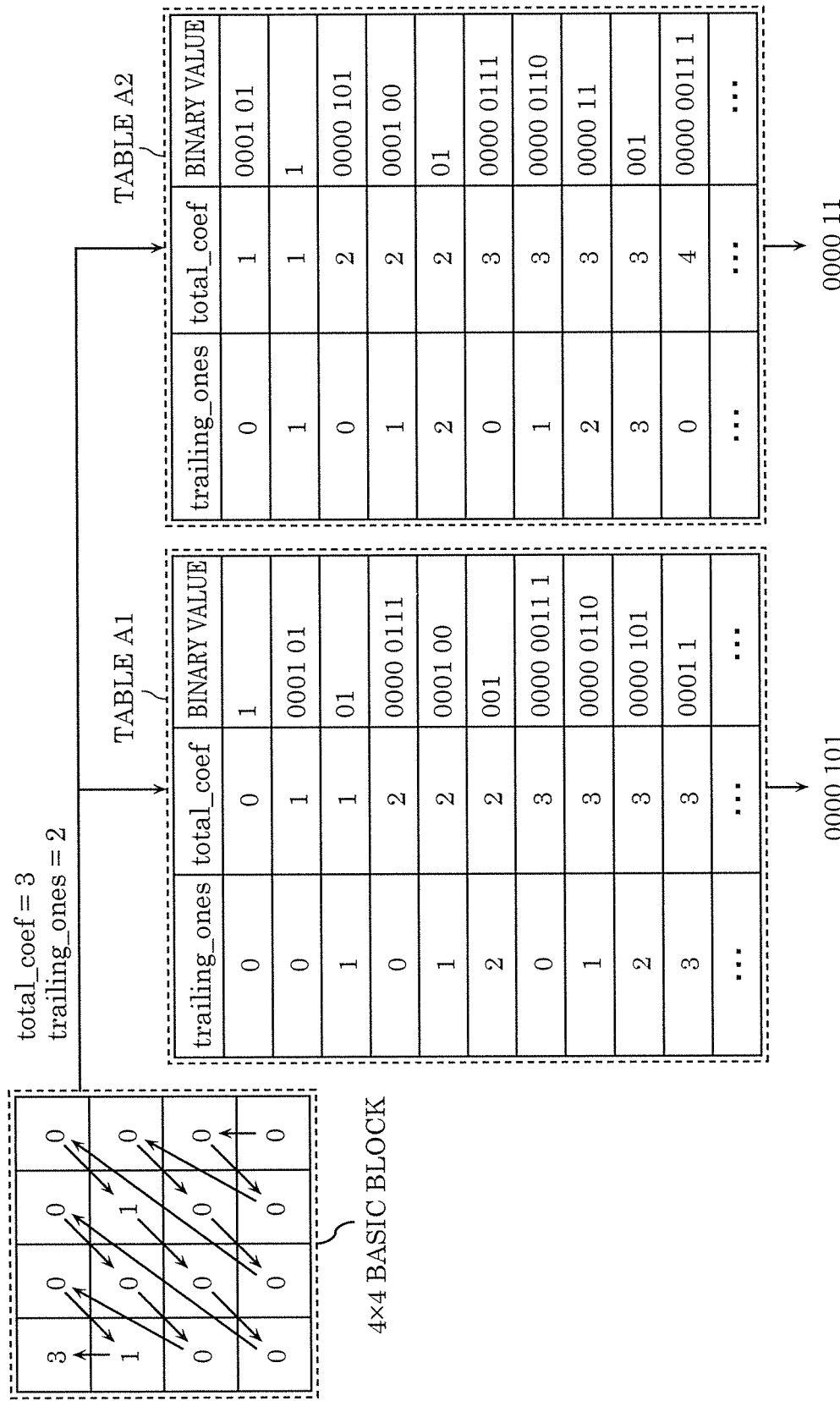
FIG. 15 is a conceptual diagram indicating two kinds of tables according to Embodiment 1.

FIG. 15 is a conceptual diagram indicating two kinds of tables A1 and A2 according to Embodiment 1. In each of the two kinds of tables A1 and A2, a plurality of data values and a plurality of binary values are associated with each other. Each of the plurality of data values corresponds to one of a value of trailing_ones and a value of total_coef included in a combination.

Parameter trailing_ones indicates the number of non-zero coefficients whose absolute value is 1 and which continue first in the scan order according to a descending order of frequencies other than the frequency transform coefficients whose absolute value is 0 in the plurality of frequency transform coefficients included in the basic block. Parameter total_coef indicates the number of non-zero coefficients in the plurality of frequency transform coefficients included in the basic block. The combination of trailing_ones and total_coef is an example of data values each indicating the number of non-zero coefficients.

Table A1 includes association between the data value indicating 0 as the number of non-zero coefficients and a binary value. In other words, table A1 includes the data value in which trailing_ones indicates 0 and total_coef indicates 0. Table A2 does not include association between the data value indicating 0 as the number of non-zero coefficients and a binary value. In other words, table A2 does not include data values indicating that trailing_ones is 0 and that total_coef is 0.

In this way, the binary value associated with the data value in table A2 is defined using a bit length shorter than the bit length of the binary value associated with the same data value in table A1.

In the example of FIG. 15, total_coef is 3, and trailing_ones is 2. In table A1, "0000101" which is a 7-bit binary value is associated with these data values, and in table A2, "000011" which is a 6-bit binary value is associated therewith.

For example, binarizer 132 binarizes the data values each indicating the number of non-zero coefficients of the basic block having a possibility that the number of non-zero coefficients is 0, according to table A1. For example, binarizer 132 binarizes the data values each indicating the number of non-zero coefficients of the basic block having no possibility that the number of non-zero coefficients is 0, according to table A2.

Likewise, inverse binarizer 244 inverse binarizes the binary values obtained by binarizing the data value indicating the number of non-zero coefficients of the basic block having a possibility that the number of non-zero coefficients is 0, according to table A1. Likewise, inverse binarizer 244 inverse binarizes the binary values obtained by binarizing the data values each indicating the number of non-zero coefficients of the basic block having no possibility that the number of non-zero coefficients is 0, according to table A2.

In this way, encoder 100 and decoder 200 are capable of reducing increase in the coding amount.

Although the basic block having a 4×4 size is illustrated in FIG. 15, it is to be noted that the size of a basic block may be a size different from 4×4. In addition, the size of a basic block may be the same as the size of a frequency transform block, or may be smaller than the size of a frequency transform block. In addition, although a combination of trailing_ones and total_coef is used as data values each indicating the number of non-zero coefficients in this example, it is to be noted that data values each indicating the number of non-zero coefficients may be other information.

Figure 16:
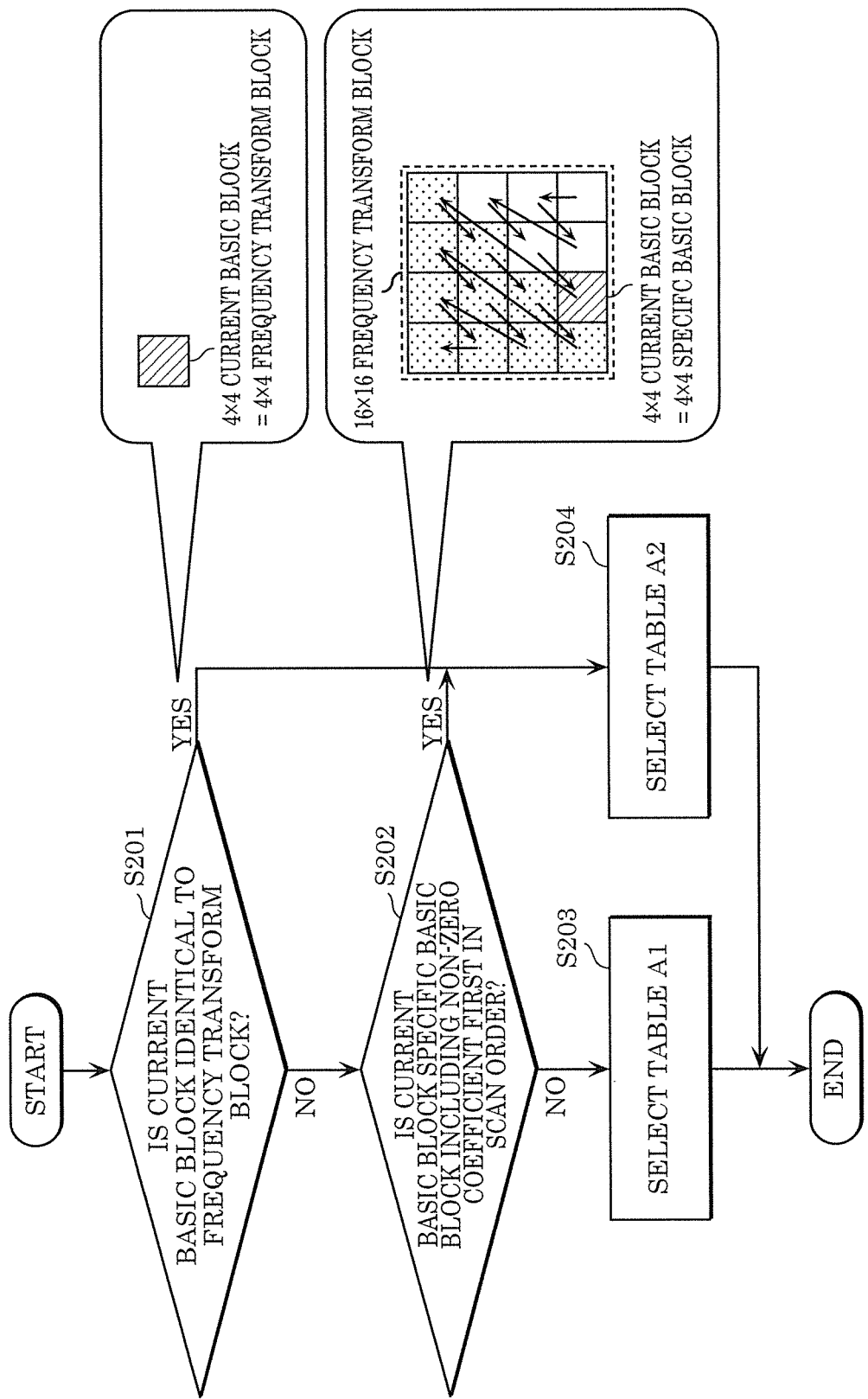
FIG. 16 is a flowchart indicating selection of a table according to Embodiment 1.

FIG. 16 is a flowchart indicating selection of a table according to Embodiment 1. More specifically, FIG. 16 is a flowchart for selecting a conversion table from table A1 and table A2 illustrated in FIG. 15.

For example, binarizer 132 selects a conversion table from table A1 and table A2 in units of a basic block, and binarizes the data values each indicating the number of non-zero coefficients included in the basic block according to the selected transform block. For example, inverse binarizer 244 selects a conversion table from table A1 and table A2 in units of a basic block, and inverse binarizes the binary values of the data values each indicating the number of non-zero coefficients included in the basic block according to the selected transform block.

Here, the basic block which is a current processing target when binarization or inverse binarization is performed in units of a basic block is referred to as a current basic block.

As a precondition, binarizer 132 binarizes the data values each indicating the number of non-zero coefficients of each of the specific basic block and the following basic block(s) in the scan order only when the specific basic block is included in the frequency transform block. Inverse binarizer 244 then binarizes the data values each indicating the number of non-zero coefficients of each of the specific basic block and the following basic block(s) in the scan order only when the specific basic block is included in the frequency transform block. The specific basic block is a basic block including the non-zero coefficient first in the scan order.

In other words, encoder 100 encodes the frequency transform block when the frequency transform block includes a non-zero coefficient, and does not encode the frequency transform block when the frequency transform block does not include any non-zero coefficient. Accordingly, decoder 200 decodes the frequency transform block when the frequency transform block includes a non-zero coefficient, and does not decode the frequency transform block when the frequency transform block does not include any non-zero coefficient.

Under the precondition, when the current basic block is not identical to the frequency transform block (No in S201) and the current basic block is not a specific basic block (No in S202), table A1 which includes association with a data value indicating 0 as the number of non-zero coefficients is selected (S203). When the current basic block is identical to the frequency transform block (Yes in S201) or when the current basic block is the specific basic block (Yes in S202), table A2 which does not include any association with a data value indicating 0 as the number of non-zero coefficients is selected (S204).

When the current basic block is identical to the frequency block, whether the data value of the current basic block is binarized is determined according to whether the current basic block includes a non-zero coefficient. In this case, the data value of the current basic block is binarized when the current basic block includes a non-zero coefficient, and the data value of the current basic block is binarized when the current basic block does not include any non-zero coefficient.

Accordingly, in this case, the current basic block includes a non-zero coefficient when the data values of the current basic block are binarized. For this reason, when the current basic block is identical to the frequency transform block, table A2 which does not include any association with a data value indicating 0 as the number of non-zero coefficients is selected.

In addition, the specific basic block includes a non-zero coefficient. Accordingly when the current basic block is the specific basic block, A2 which does not include any association with a data value indicating 0 as the number of non-zero coefficients is selected.

It is to be noted that whether the current basic block is identical to the frequency transform block corresponds to whether the size of the transform block and the size of the current basic block are the same. For example, when each of basic blocks has a 4×4 size, whether the frequency transform block has a 4×4 size may be determined instead of whether the current basic block is identical to the frequency transform block.

In addition, the above-described selecting method is an example, and other selecting methods may be used. Alternatively, only one of the two cases in the above-described selecting methods may be used. Alternatively, although a conversion table is selected from the two tables of A1 and A2 in the above example, a conversion table is selected among three of more tables including these tables A1 and A2.

Also in the first mode as in the second mode, binarizer 132 may binarize a data value indicating the number of non-zero coefficients according to a conversion table selected from table A2, etc. each of which does not include any association with a data value indicating 0 as the number of non-zero coefficients. Alternatively, in the first mode, binarizer 132 may binarize a data value indicating the number of non-zero coefficients using table A1, etc. each of which includes association with a data value indicating 0 as the number of non-zero coefficients, without using table A2, etc. each of which does not include any association with a data value indicating 0 as the number of non-zero coefficients.

Alternatively, binarizer 132 does not always need to binarize a data value indicating the number of non-zero coefficients in the first mode. For example, binarizer 132 may binarize each of a plurality of frequency transform coefficients in the first mode regardless of the number of non-zero coefficients. In the first mode, reduction in the increase in the coding amount is assisted by application of arithmetic encoding even when the number of non-zero coefficients is not used.

Also in the first mode as in the second mode, inverse binarizer 244 may inverse binarize a data value indicating the number of non-zero coefficients according to a conversion table selected from table A2, etc. each of which does not include any association with a data value indicating 0 as the number of non-zero coefficients. Alternatively, in the first mode, inverse binarizer 244 may inverse binarize a data value indicating the number of non-zero coefficients using table A, etc. each of which includes association with a data value indicating 0 as the number of non-zero coefficients, without using table A2, etc. each of which does not include any association with a data value indicating 0 as the number of non-zero coefficients.

Alternatively, inverse binarizer 244 does not always need to inverse binarize a binary value of the data value indicating the number of non-zero coefficients in the first mode. For example, inverse binarizer 244 may inverse binarize each of the plurality of frequency transform coefficients in the first mode regardless of the number of non-zero coefficients. In the first mode, reduction in the increase in the coding amount is assisted by application of arithmetic decoding even when the number of non-zero coefficients is not used.

[Table Selection Based on the Position of a Basic Block]

A conversion table for binarization and inverse binarization may be selected from a plurality of tables including two or more tables which are differ from each other in difference between a longest bit length and a shortest bit length of a plurality of binary values associated with a plurality of data values.

In this way, the coding amount of the frequency transform coefficient information may be reduced.

Figure 17:
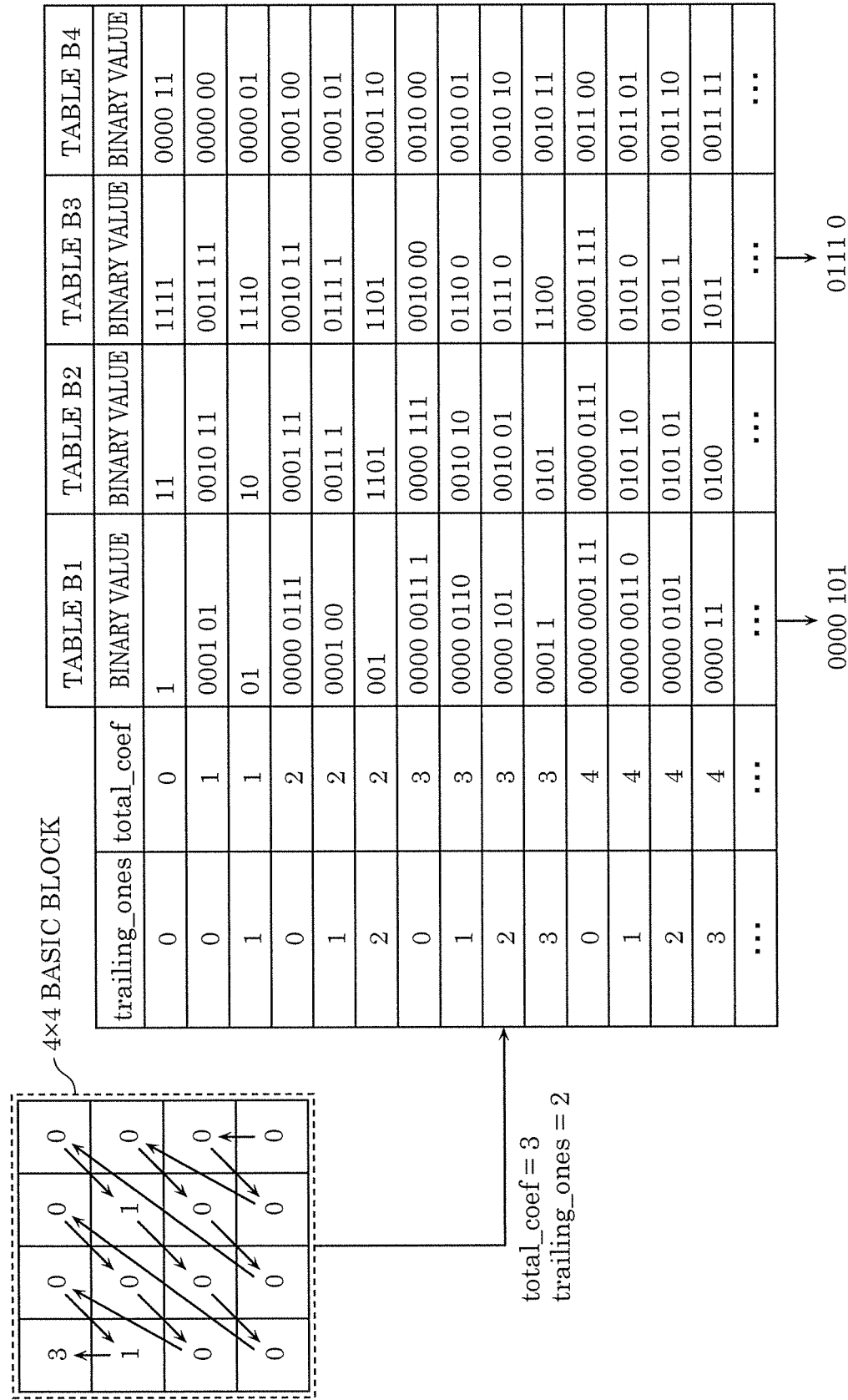
FIG. 17 is a conceptual diagram indicating four kinds of tables according to Embodiment 1.

FIG. 17 is a conceptual diagram indicating four kinds of tables B1 to B4 according to Embodiment 1. In each of the four kinds of tables B1 to B4, a plurality of data values and a plurality of binary values are associated with each other. Each of the plurality of data values corresponds to one of a value of trailing_ones and a value of total_coef in a combination. It is to be noted that table B1 in FIG. 17 is identical to table A1 in FIG. 15.

Specifically, in the example of FIG. 17, total_coef is 3, and trailing_ones is 2. In table B1, "0000101" which is a 7-bit binary value is associated with these data values, and in table B3, "01110" which is a 5-bit binary value is associated therewith.

Binarizer 132 of encoder 100 selects a conversion table from among tables B1 to B4, and binarizer 132 binarizes data values according to the selected conversion table. Likewise, inverse binarizer 244 of decoder 200 selects a conversion table from among tables B1 to B4, and inverse binarizes a binary value of the data value indicating the number of non-zero coefficients according to the conversion table selected.

It is to be noted that inverse binarizer 244 of decoder 200 selects the same conversion table as the table selected by binarizer 132 of encoder 100 from among tables B1 to B4 according to the same selection standard as that of binarizer 132 of encoder 100.

In addition, in each of tables B1 to B3, the bit length of the binary value associated with a data value indicating the number of non-zero coefficients is defined to be shorter as the number of non-zero coefficients is smaller. This tendency is most noticeable in table B1 among tables B1 to B3, and least noticeable in table B3. In other words, the bit lengths of a plurality of binary values are most variable in table B1 among tables B1 to B3, and the bit lengths of a plurality of binary values are least variable in table B3.

In table B4, the bit lengths of binary values associated with the data values each indicating the number of non-zero coefficients are constant regardless of the number of non-zero coefficients. In other words, in table B4, the plurality of binary values associated with the plurality of data values are defined to have the same bit length. Accordingly, the difference between the longest bit length and the shortest bit length is largest in table B1, second largest in table B2, third largest in table B3, and smallest in table B4.

For example, as the number estimated as the number of non-zero coefficients is smaller, a table having a larger difference between the longest bit length and the shortest bit length is selected from among tables B1 to B4. This increases the possibility that a binary value having a shorter bit length is assigned to a data value indicating the number of non-zero coefficients.

In contrast, as the number estimated as the number of non-zero coefficients is larger, a table having a smaller difference between the longest bit length and the shortest bit length is selected from among tables B1 to B4. This decreases the possibility that a binary value having a longer bit length is assigned to a data value indicating the number of non-zero coefficient.

In addition, it is estimated that the number of non-zero coefficients in a current basic block is affected by the position of the current basic block in a frequency transform block. In view of this, for example, binarizer 132 of encoder 100 may select a conversion table from among tables B1 to B4 according to the position of the current basic block in the frequency transform block. Binarizer 132 may binarize the data value indicating the number of non-zero coefficients according to the selected conversion table.

In view of this, for example, inverse binarizer 244 of decoder 200 may select a conversion table from among tables B1 to B4 according to the position of the current basic block in the frequency transform block. Inverse binarizer 244 may binarize the binary value of the data value indicating the number of non-zero coefficients according to the selected conversion table. In this way, encoder 100 and decoder 200 are capable of reducing increase in the coding amount.

It is to be noted that, in each of tables B1 to B3, the bit length of the binary value is defined to be shorter as trailing_ones is larger. This tendency is most noticeable in table B1 among tables B1 to B3, and least noticeable in table B3. This tendency is not found in table B4.

There is a correlation between the smallness in the absolute value of each frequency transform coefficient in the basic block and the largeness of trailing_ones. In view of this, as the value estimated as the absolute value of the frequency transform coefficient is smaller, the table having the most noticeable tendency may be selected from among tables B1 to B4. This increases the possibility that a binary value having a shorter bit length is assigned to the combination of trailing_ones and total_coef.

In addition, although FIG. 17 illustrates four kinds of tables B1 to B4, two kinds of tables which are different in longest bit length and shortest bit length may be used, three kinds of tables may be used, or five kinds of tables may be used.

In addition, the plurality of tables from which a conversion table is selected may include two or more kinds of tables which are the same in difference between the longest bit length and the shortest bit length, in addition to the two or more kinds of tables which are different in difference between the longest bit length and the shortest bit length. In addition, the plurality of tables from which a conversion table is selected may include the two or more kinds of tables which are different in difference between the longest bit length and the shortest bit length and the two or more kinds of tables which are the same in difference between the longest bit length and the shortest bit length.

In addition, tables A1 and A2 illustrated in FIG. 15 and tables B1 to B4 illustrated in FIG. 17 may be combined. For example, a conversion table may be selected from among the plurality of tables B1 to B4 and A2. Furthermore, the plurality of tables from which a conversion table is selected may include new tables obtained by deleting association with a data value indicating 0 as the number of non-zero coefficients from tables B2 to B4.

In addition, encoder 100 and decoder 200 may select a conversion table from among tables B1 to B4 according to the position of a basic block in a frequency transform block. At that time, encoder 100 and decoder 200 may use hierarchical layers of the basic block.

FIGS. 18A to 18I are each a conceptual diagram indicating a corresponding one of hierarchical layers of one of one or more basic blocks in a frequency transform block according to Embodiment 1.

The number indicated in each of the one or more basic blocks in each of FIGS. 18A to 18I indicates the position of the basic block in the frequency transform block. In this example, the numbers indicating the positions of the basic blocks in the frequency transform block are defined in an ascending order of frequencies. In other words, the numbers indicating the hierarchical layers of the basic block are defined to be smaller as the frequency levels corresponding to the basic block is lower. In short, the hierarchical layers correspond to the frequency levels.

The frequency levels of the plurality of basic blocks arranged in the direction toward the lower left end or the upper right end are regarded to be the same. Here, the numbers indicating the hierarchical layers of the plurality of basic blocks whose frequency levels are the same are defined to be the same value.

Figure 18A:
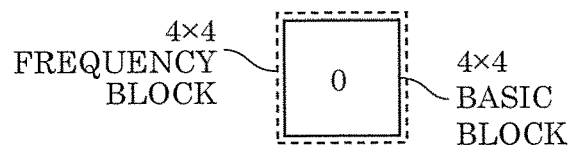
FIG. 18A is a conceptual diagram of a basic block layer in a 4×4 frequency transform block according to Embodiment 1.
Figure 18B:
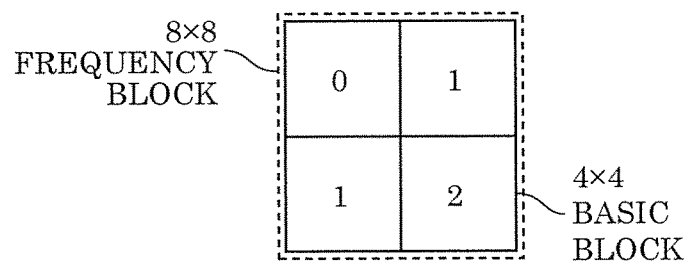
FIG. 18B is a conceptual diagram of a basic block layer in an 8×8 frequency transform block according to Embodiment 1.
Figure 18C:
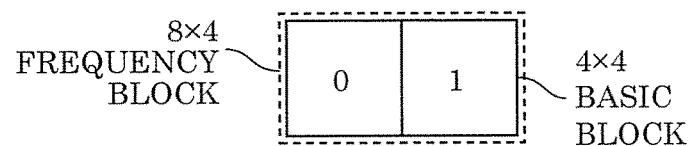
FIG. 18C is a conceptual diagram of a basic block layer in an 8×4 frequency transform block according to Embodiment 1.
Figure 18D:
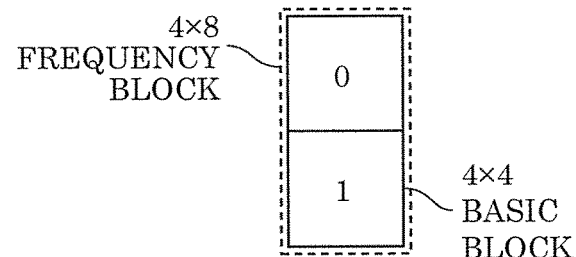
FIG. 18D is a conceptual diagram of a basic block layer in a 4×8 frequency transform block according to Embodiment 1.
Figure 18E:
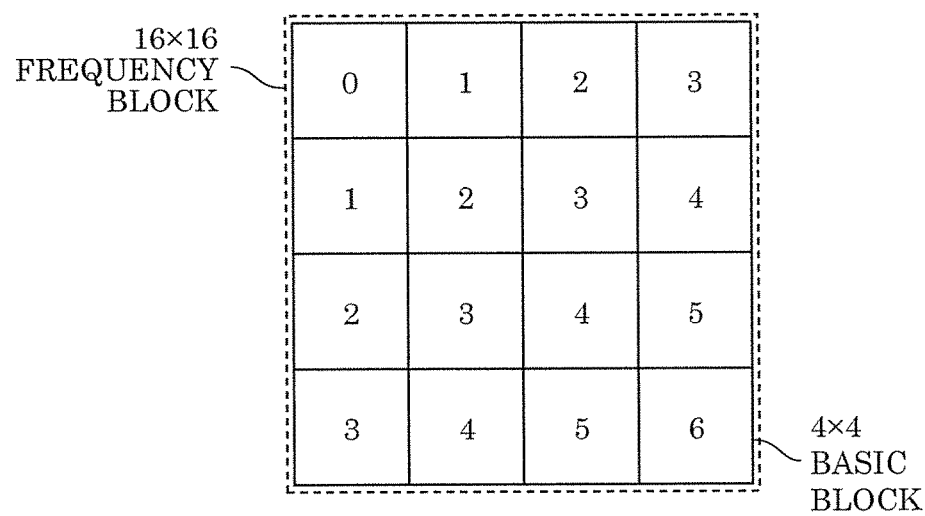
FIG. 18E is a conceptual diagram of basic blocks in a 16×16 frequency transform block according to Embodiment 1.

More specifically, FIG. 18A illustrates a single basic block in a 4×4 frequency transform block. FIG. 18B illustrates the hierarchical layers of respective four basic blocks in an 8×8 frequency transform block. FIG. 18C illustrates the hierarchical layers of respective two basic blocks in an 8×4 frequency transform block. FIG. 18D illustrates the hierarchical layers of respective two basic blocks in a 4×8 frequency transform block. FIG. 18E illustrates the hierarchical layers of respective sixteen basic blocks in a 16×16 frequency transform block.

Figure 18F:
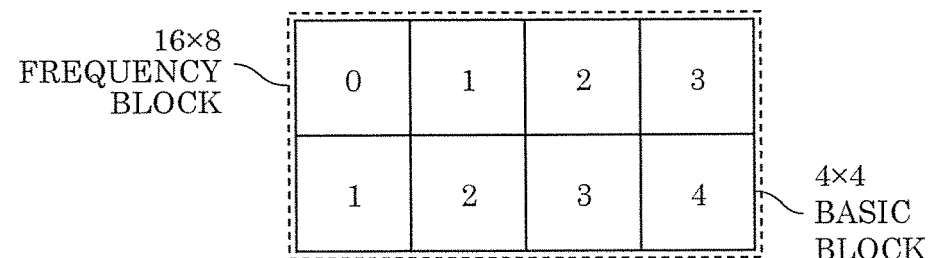
FIG. 18F is a conceptual diagram of basic blocks in a 16×8 frequency transform block according to Embodiment 1.
Figure 18G:
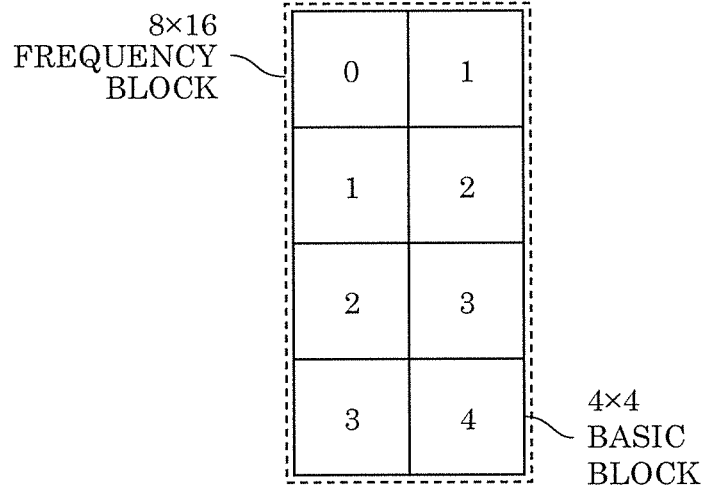
FIG. 18G is a conceptual diagram of basic blocks in an 8×16 frequency transform block according to Embodiment 1.
Figure 18H:
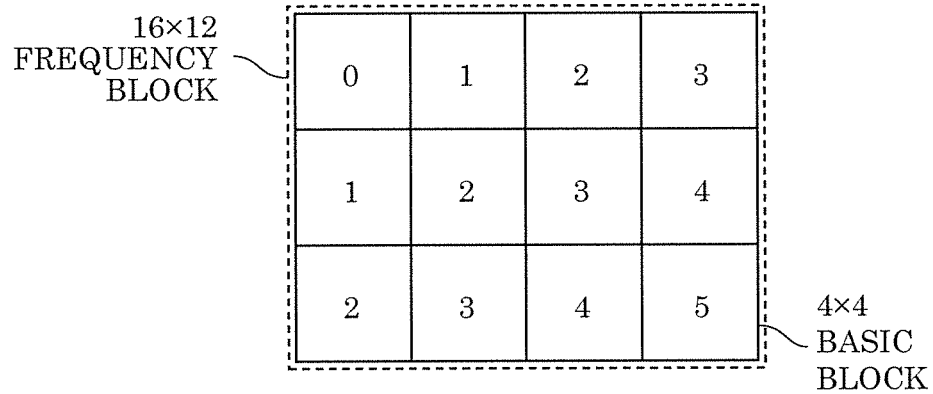
FIG. 18H is a conceptual diagram of basic blocks in a 16×12 frequency transform block according to Embodiment 1.
Figure 18I:
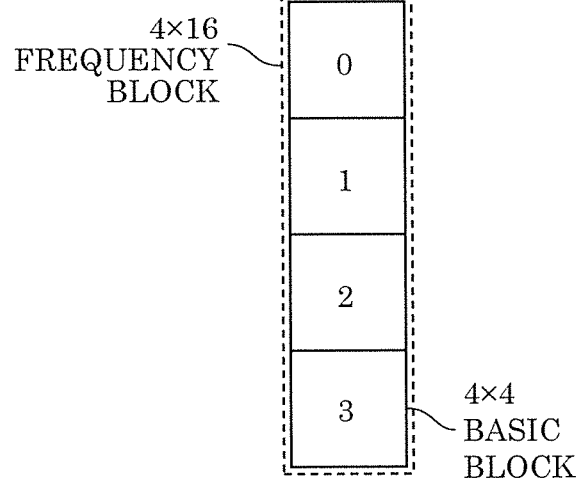
FIG. 18I is a conceptual diagram of basic blocks in a 4×16 frequency transform block according to Embodiment 1.

FIG. 18F illustrates the hierarchical layers of respective eight basic blocks in a 16×8 frequency transform block. FIG. 18G illustrates the hierarchical layers of respective eight basic blocks in an 8×16 frequency transform block. FIG. 18H illustrates the hierarchical layers of respective twelve basic blocks in a 16×12 frequency transform block. FIG. 18I illustrates the hierarchical layers of respective four basic blocks in a 4×16 frequency transform block.

In addition, the numbers shown in FIGS. 18A to 18I are examples, and other numbers may be used as the numbers indicating the hierarchical layers of the basic blocks. Alternatively, other information which is different in format from the numbers may be used as information indicating the hierarchical layers of the basic blocks.

Figure 19:
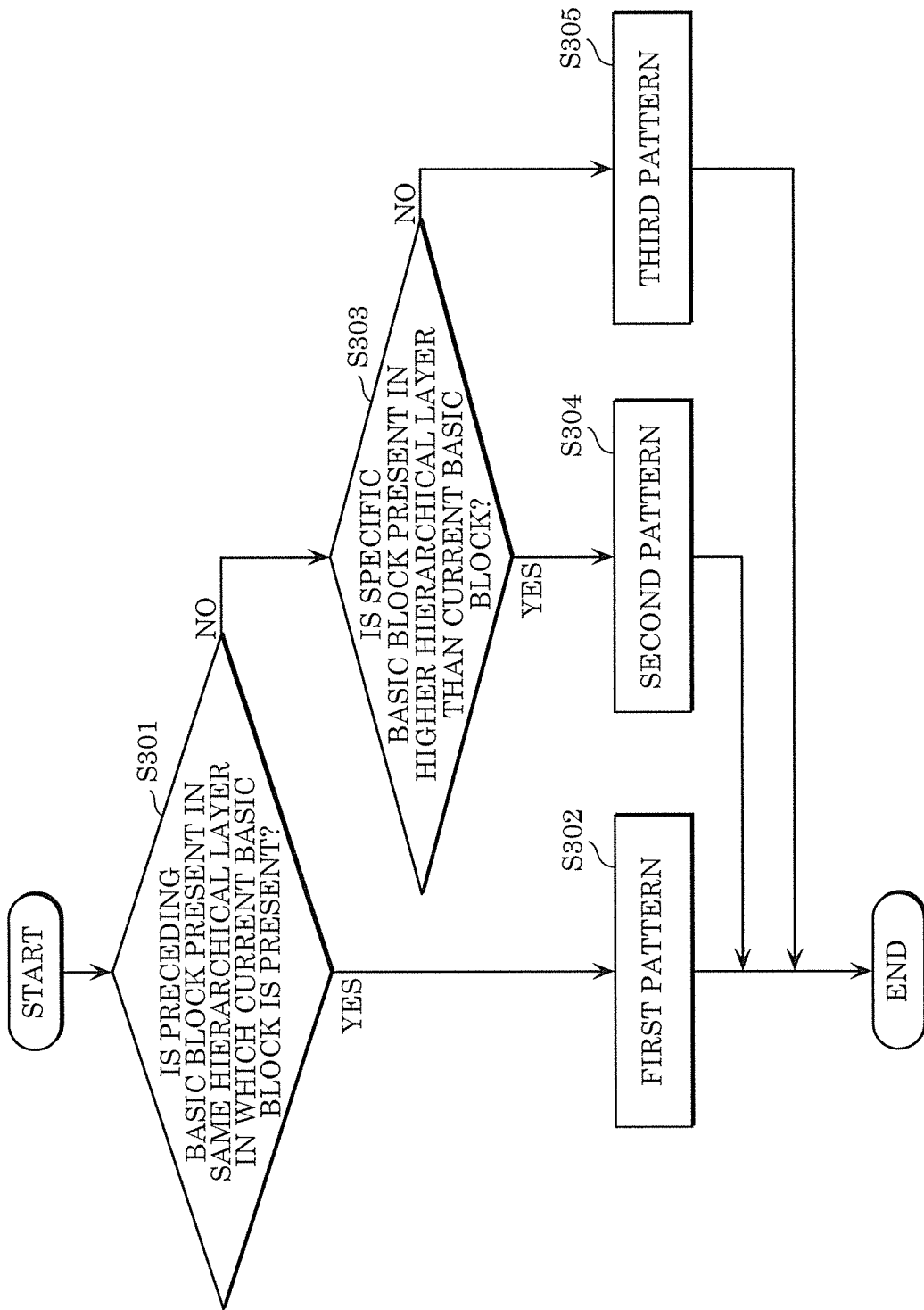
FIG. 19 is a flowchart indicating a pattern determination processing according to Embodiment 1.

FIG. 19 is a flowchart indicating a pattern determination processing according to Embodiment 1. For example, binarizer 132 of encoder 100 determines a pattern according to the position of a current basic block in a frequency transform block, and selects a conversion table according to the determined pattern. This pattern corresponds to the position of the current basic block in the frequency transform block, and corresponds to the method for selecting the conversion table.

For this reason, binarizer 132 of encoder 100 determines whether a preceding basic block is present in the same hierarchical layer in which the current basic block is present (S301). Here, the preceding basic block is a basic block that precedes the current basic block in a scan order. When determining that the preceding basic block is present in the same hierarchical layer in which the current basic block is present (Yes in S301), binarizer 132 determines a current pattern to be a first pattern (S302).

When determining that the preceding basic block is not present in the same hierarchical layer in which the current basic block is present (No in S301), binarizer 132 determines whether a specific basic block is present in a higher hierarchical layer than the current basic block (S303). Here, the specific basic block is a basic block including a non-zero coefficient first in the scan order in the one or more basic blocks which constitute the frequency transform block.

When determining that a specific basic block is present in a higher hierarchical layer than the current basic block (Yes in S303), binarizer 132 determines a current pattern as a second pattern (S304). When determining that no specific basic block is present in a higher hierarchical layer than the current basic block (No in S303), binarizer 132 determines a current pattern as a third pattern (S305).

It is to be noted that the first pattern, the second pattern, and the third pattern are examples of patterns. Only some of the first pattern, the second pattern, and the third pattern may be used, or other patterns may be used.

In the same manner as binarizer 132 of encoder 100, inverse binarizer 244 of decoder 200 determines a pattern and selects a conversion table. Accordingly as for the determination of the pattern and selection of the conversion table, the operations performed by binarizer 132 of encoder 100 may be replaced with the operations performed by inverse binarizer 244 of decoder 200. The same applies to the following descriptions.

Figure 20A:
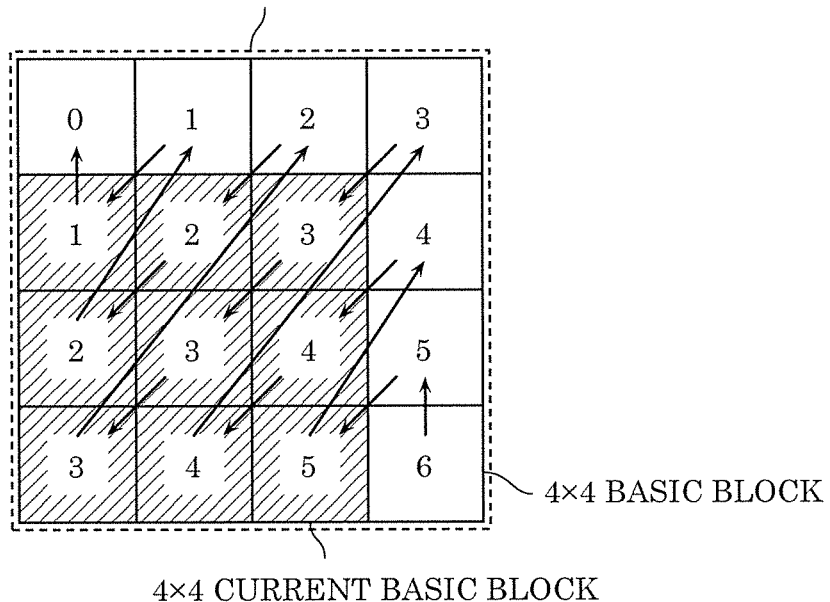
FIG. 20A is a conceptual diagram illustrating a current basic block having a first pattern according to Embodiment 1.

FIG. 20A is a conceptual diagram illustrating a current basic block having a first pattern according to Embodiment 1. When a preceding basic block is present in the same hierarchical layer in which the current basic block is present, the pattern corresponding to the position of the current basic block is determined as the first pattern.

In other words, when the current basic block is located at the position in the same hierarchical layer in which the preceding basic block is present, the current pattern is determined to be the first pattern. For example, when the current basic block is located in any of the diagonally hatched parts in FIG. 20A, the pattern corresponding to the position of the current basic block is determined to be the first pattern.

Figure 20B:
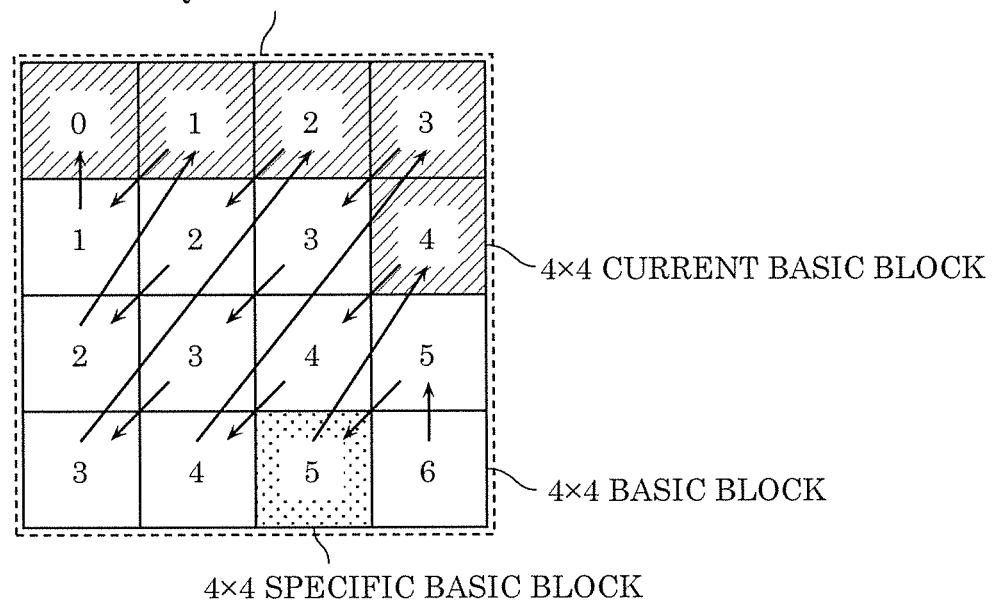
FIG. 20B is a conceptual diagram illustrating a current basic block having a second pattern according to Embodiment 1.

FIG. 20B is a conceptual diagram illustrating a current basic block having a second pattern according to Embodiment 1. When a preceding basic block is present in the same hierarchical layer in which the current basic block is present and a specific basic block is present in a higher hierarchical layer than the current basic block, the pattern corresponding to the position of the current basic block is determined as the second pattern.

In other words, when the current basic block is not located at the position in the same hierarchical layer in which the preceding basic block is present and the specific basic block is present in a higher hierarchical layer than the current basic block, the current pattern is determined to be the second pattern. For example, when the current basic block is located at any of the diagonally hatched parts in FIG. 20B, the pattern corresponding to the position of the current basic block is determined to be the second pattern.

Figures 20C, 21, 22:
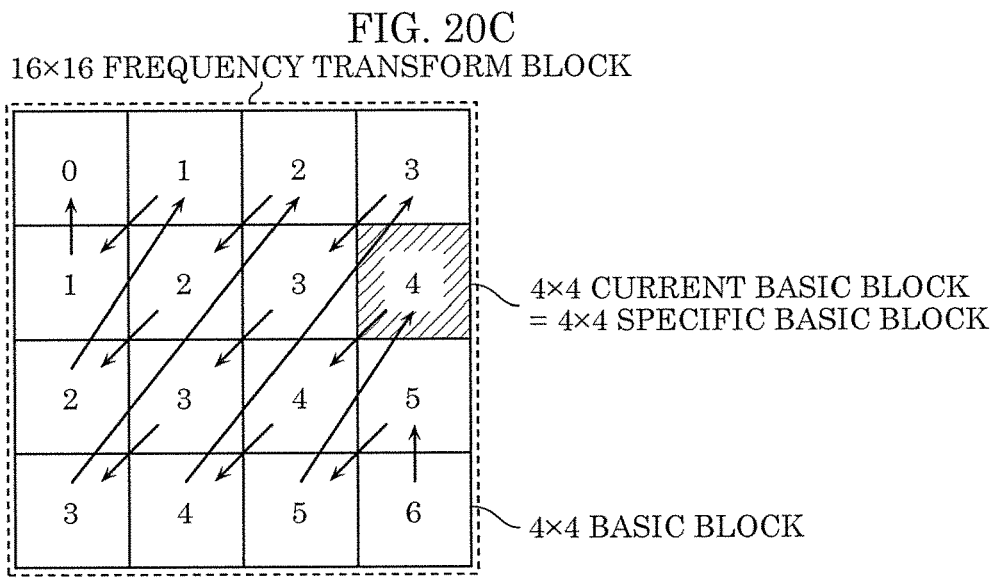
FIG. 20C is a conceptual diagram illustrating a current basic block having a third pattern according to Embodiment 1.
FIG. 21 is a relationship diagram indicating tables to be selected in the first pattern according to Embodiment 1.
FIG. 22 is a relationship diagram indicating tables to be selected in the second pattern according to Embodiment 1.

FIG. 20C is a conceptual diagram illustrating a current basic block having a third pattern according to Embodiment 1. When no preceding basic block is present in the same hierarchical layer in which the current basic block is present and no specific basic block is present in a higher hierarchical layer than the current basic block, the pattern corresponding to the position of the current basic block is determined as the third pattern.

In other words, when the current basic block is not located at the position in the same hierarchical layer in which the preceding basic block is present and no specific basic block is present in a higher hierarchical layer than the current basic block, the current pattern is determined to be the third pattern. For example, when the current basic block is located at any of the diagonally hatched parts in FIG. 20C, the pattern corresponding to the position of the current basic block is determined to be the third pattern.

FIG. 21 is a relationship diagram indicating tables to be selected in the first pattern according to Embodiment 1. For example, binarizer 132 of encoder 100 predicts the number of non-zero coefficients included in the current basic block, and selects a conversion table from among tables B1 to B4 according to the prediction value indicating the number of non-zero coefficients included in the current basic block. This prediction value is also represented as nC.

In the example of FIG. 21, binarizer 132 selects table B1 having the largest difference between the longest bit length and the shortest bit length as a conversion table when the prediction value ranges from 0 to 1.

In addition, when the prediction value ranges from 2 to 3, binarizer 132 selects table B2 having the second largest difference between the longest bit length and the shortest bit length as a conversion table. In addition, when the prediction value ranges from 4 to 7, binarizer 132 selects table B3 having the third largest difference between the longest bit length and the shortest bit length as a conversion table. In addition, when the prediction value ranges from 8 to 16, binarizer 132 selects table B4 having the smallest difference between the longest bit length and the shortest bit length as a conversion table.

In the first pattern, a preceding basic block is present in the same hierarchical layer in which the current basic block is present. Accordingly, binarizer 132 predicts the number of non-zero coefficients included in the current basic block according to the number of non-zero coefficients included in the preceding basic block present in the same hierarchical layer in which the current basic block is present. More specifically, binarizer 132 predicts the number of non-zero coefficients included in the preceding basic block present in the same hierarchical layer in which the current basic block is present, as the number of non-zero coefficients included in the current basic block.

In the first pattern, when the current basic block is a specific basic block which includes a non-zero coefficient first in a scan order, the number of non-zero coefficients included in a preceding basic block is 0. Accordingly, binarizer 132 predicts 0 as the number of non-zero coefficients included in the current basic block.

In addition, when a plurality of preceding basic blocks are present in the same hierarchical layer in which the current basic block is present, binarizer 132 may predict the number of non-zero coefficients included in the current basic block according to the number of non-zero coefficients included in the preceding basic block located immediately before the current basic block in the scan order.

Binarizer 132 then predicts the number of non-zero coefficients in the basic block according to the number of non-zero coefficients in the preceding basic block, and selects a conversion table from among tables B1 to B4 according to the prediction value indicating the number of non-zero coefficients. In other words, binarizer 132 selects a conversion table from among tables B1 to B4 according to the number of non-zero coefficients in the preceding basic block.

It is to be noted that FIG. 21 illustrates examples of prediction value ranges and tables to be selected. Prediction value ranges and tables to be selected are not limited to the examples illustrated in FIG. 21. In addition, binarizer 132 may select a conversion table according to not only the prediction value indicating the number of non-zero coefficients but also a combination of the prediction value indicating the number of non-zero coefficients and other information. This also applies to the other patterns in addition to the first pattern.

FIG. 22 is a relationship diagram indicating tables to be selected in the second pattern according to Embodiment 1.

In the second pattern, no preceding basic block is present in the same hierarchical layer in which a current basic block is present. However, a basic block including a non-zero coefficient is present in a higher hierarchical layer than the layer in which the current basic block is present, that is, at a higher frequency level than the frequency level at the position of the current basic block. In this case, binarizer 132 predicts the number of non-zero coefficients included in the current basic block is large, and increases the prediction value indicating the number of non-zero coefficients included in the current basic block. Binarizer 132 then selects a conversion table according to the increased prediction value.

For example, binarizer 132 determines the prediction value indicating the number of non-zero coefficients included in the current basic block as the largest value of the number of non-zero coefficients. Binarizer 132 then selects a conversion table according to the prediction value determined as the largest value of the number of non-zero coefficients.

For example, binarizer 132 determines the prediction value indicating the number of non-zero coefficients included in the current basic block, to be 16 which is the largest value of the number of non-zero coefficients. Binarizer 132 then selects a conversion table according to the prediction value determined to be 16 as the largest value of the number of non-zero coefficients. In this way binarizer 132 selects table B4 having the smallest difference between the longest bit length and the shortest bit length as a conversion table.

It is to be noted that, in the second pattern, binarizer 132 does not always need to determine the prediction value as the largest value, and may determine a prediction value which is a predetermined value larger than an average value of the numbers of non-zero coefficients. Binarizer 132 may then select a table having a difference between the longest bit length and the shortest bit length smaller than the average difference as a conversion table from among tables B1 to B4.

FIG. 23 is a relationship diagram indicating tables to be selected for a frequency transform around a current frequency transform block in the third pattern according to Embodiment 1. In this example, binarizer 132 of encoder 100 selects a conversion table according to the number of non-zero coefficients included in the frequency transform around the current frequency transform block in the third pattern.

In the third pattern, a preceding basic block is present in the same hierarchical layer in which the current basic block is present. In addition, no specific basic block is present in any hierarchical layer higher than the hierarchical layer in which the current basic block is present. In view of this, binarizer 132 predicts the number of non-zero coefficients included in the current basic block according to the number of non-zero coefficients included in the frequency transform block around the current frequency transform block. Binarizer 132 may predict the number of non-zero coefficients included in the frequency transform block around the current frequency transform block as the number of non-zero coefficients included in the current basic block.

Binarizer 132 then selects a conversion table from among tables B1 to B4 according to the prediction value indicating the number of non-zero coefficients included in the current basic block. In other words, binarizer 132 selects the conversion table from among tables B1 to B4 according to the number of non-zero coefficients which can be included in the frequency transform block around the current frequency transform block.

For example, the frequency transform block around the current frequency transform block is a frequency transform block which is spatially close to the frequency transform block including the current basic block, and which has been encoded successfully. Hereinafter, a transform block including the current basic block is referred to as a current frequency transform block, and a frequency transform block around the current frequency transform block is referred to as a neighboring frequency transform block. The neighboring frequency transform block may be a frequency transform block spatially located in a predetermined range from the current frequency transform block.

In addition, the neighboring frequency transform block may be a frequency transform block adjacent to the left of or above the current frequency transform block. In this way, binarizer 132 is capable of predicting the number of non-zero coefficients at high accuracy according to the number of non-zero coefficients included in the frequency transform block close to the current frequency transform block.

In addition, the neighboring frequency transform block may be a frequency transform block which is encoded immediately before in coding order. This enables simple prediction of the number of non-zero coefficients and reduction in memory capacity for storing information related to the number of non-zero coefficients.

In addition, the neighboring frequency transform block may be a frequency transform block which is in a predetermined range from the current frequency transform block and whose coding mode is the same as that of the current frequency transform block. In this way, binarizer 132 is capable of predicting the number of non-zero coefficients at high accuracy according to the frequency transform block whose tendency of occurrence of non-zero coefficients is estimated to be similar to that of the current frequency transform block. It is to be noted that the predetermined range may be a range of a coding tree unit including the current frequency transform block.

The following number is used as the number of non-zero coefficients included in the neighboring frequency transform block: the number of non-zero coefficients included in a basic block whose position relative to the neighboring frequency transform block is equivalent to the position of the current basic block relative to the current frequency transform block. In this way, binarizer 132 is capable of predicting the number of non-zero coefficients at high accuracy according to the basic block having a strong correlation with the current basic block in terms of the number of non-zero coefficients.

The number of non-zero coefficients of the entirety of the neighboring frequency transform block may be used as the number of non-zero coefficients included in the neighboring frequency transform block. In this way, the information is integrated regardless of the size of frequency transform block. This enables simple prediction of the number of non-zero coefficients and reduction in memory capacity for storing information related to the number of non-zero coefficients.

In addition, binarizer 132 may derive the number of non-zero coefficients per basic block according to the number of non-zero coefficients of the entirety of the neighboring frequency transform block, and predict the number of non-zero coefficients included in the current basic block according to the number of non-zero coefficients per basic block. In this way, binarizer 132 is capable of appropriately predicting the number of non-zero coefficients regardless of difference in size of a frequency transform block. Binarizer 132 is capable of selecting a conversion table according to the appropriate prediction value.

FIG. 24 is a relationship diagram indicating tables to be selected according to the coding mode in the third pattern according to Embodiment 1. In this example, binarizer 132 selects a conversion table according to the coding mode which is either an inter prediction mode or an intra prediction mode instead of the number of non-zero coefficients included in the neighboring frequency transform block in the third pattern. This coding mode corresponds to one of the inter prediction and intra prediction which is used for encoding and decoding of the current basic block.

For example, when the coding mode for the current block is an inter prediction mode, it is estimated that the prediction accuracy is high and the number of non-zero coefficients is small compared to those in intra prediction. Accordingly, binarizer 132 selects table B1 having a large difference between the longest bit length and the shortest bit length. When the coding mode for the current block is an intra prediction mode, it is estimated that the prediction accuracy is low and the number of non-zero coefficients is large compared to those in inter prediction. Accordingly binarizer 132 selects table B2 having a smaller difference between the longest bit length and the shortest bit length than table B1.

It is to be noted that FIG. 24 illustrates examples of tables to be selected. The tables to be selected are not limited to the examples illustrated in FIG. 24. In addition, binarizer 132 may select a conversion table according to not only the coding mode but also a combination of the coding mode and other information.

FIG. 25 is a relationship diagram indicating tables to be selected according to quantization parameters in the third pattern according to Embodiment 1. In this example, binarizer 132 selects, in the third pattern, a conversion table according to a quantization parameter (QP) value instead of the number of non-zero coefficients included in the neighboring frequency transform block and the coding mode which is either an inter prediction mode or an intra prediction mode. This QP value is a value of a quantization parameter which is used for encoding and decoding of the current basic block. The quantization width is larger when the QP value is larger.

For example, as the QP value is larger, it is estimated that the value of a frequency transform coefficient is likely to be quantized to 0, and that the number of non-zero coefficients which are generated through quantization is small. Accordingly, binarizer 132 selects a table having a larger difference between the longest bit length and the shortest bit length from among tables B1 to B4 as the QP value is larger.

In contrast, as the QP value is small, it is estimated that the value of a frequency transform coefficient is unlikely to be quantized to 0, and that the number of non-zero coefficients which are generated through quantization is large.

Accordingly, binarizer 132 selects a table having a small difference between the longest bit length and the shortest bit length from among tables B1 to B4 as the QP value is small.

In addition, when the QP value ranges from 0 to 21, binarizer 132 selects table B4 having the smallest difference between the longest bit length and the shortest bit length as a conversion table.

In addition, when the QP value ranges from 22 to 31, binarizer 132 selects table B3 having the second smallest difference between the longest bit length and the shortest bit length as a conversion table. In addition, when the QP value ranges from 32 to 41, binarizer 132 selects table B2 having the third smallest difference between the longest bit length and the shortest bit length as a conversion table. In addition, when the QP value ranges from 42 to 51, binarizer 132 selects table B1 having the largest difference between the longest bit length and the shortest bit length as a conversion table.

It is to be noted that FIG. 25 illustrates examples of QP value ranges and tables to be selected. QP value ranges and tables to be selected are not limited to the examples illustrated in FIG. 25. In addition, binarizer 132 may select a conversion table according to not only the QP value but also a combination of the QP value and other information.

In addition, in the above-described example, binarizer 132 determines a table selecting method according to the position of the current basic block, and selects a conversion table according to the determined table selecting method. In this way, binarizer 132 selects the conversion table according to the position of the current basic block.

When the position of the current basic block is closer to the upper left corner of the frequency transform block, it is estimated that the number of non-zero coefficients included in the current basic block is larger. Accordingly, binarizer 132 may select, as a conversion table, a table having a smaller difference between the longest bit length and the shortest bit length from among tables B1 to B4, etc. as the position of the current basic block is closer to the upper left corner of the frequency transform block. In this way binarizer 132 selects the conversion table according to the position of the current basic block.

In the above description, the term "prediction" is used to explain that the number of non-zero coefficients is predicted, but the term "estimation" may be used instead of "prediction" in order to distinguish from image prediction such as intra prediction, inter prediction, etc.

[A Syntax Structure of Frequency Transform Coefficient Information]

FIG. 26 is a data diagram indicating a syntax structure according to Embodiment 1. Binarizer 132 of encoder 100 binarizes frequency transform coefficient information according to the syntax structure indicated in FIG. 26. Inverse binarizer 244 of decoder 200 inverse binarizes a binary data string of the frequency transform coefficient information according to the syntax structure indicated in FIG. 26.

The example of FIG. 26 is an example in the case of a basic block having a 4×4 size, but the size of the basic block is not limited to 4×4. In addition, the size of a basic block may be the same as the size of a frequency transform block, or may be smaller than the size of a frequency transform block. In addition, the parameters indicated in bold in FIG. 26 are parameters described in a binary data string.

Parameter last_sub_block_pos is information indicating the position of a specific basic block. The specific basic block is a basic block including a non-zero coefficient first in a scan order of the one or more basic blocks which constitute a frequency transform block. The scan order is defined in a descending order of frequencies of the one or more basic blocks. The last_sub_block_pos may be information indicating, as a number, the position of the specific basic block, for example, as indicated in FIGS. 14A to 14I. The binary data string includes at most one last_sub_block_pos for each frequency transform block.

Parameter coef_token is information indicating the number of non-zero coefficients included in a basic block. Specifically, coef_token corresponds to both total_coef and trailing_ones. More specifically, coef_token may be a binary value corresponding to the data value obtained by combining total_coef and trailing_ones, for example, as indicated in FIG. 15 and FIG. 17. The binary data string includes at most one coef_token for each basic block.

Parameter total_zeros is information indicating a total number of zero coefficients which appear after the non-zero coefficient appeared first in the scan order defined in the descending order of frequencies of a plurality of frequency transform coefficients included in the one or more basic blocks. Here, the non-zero coefficient is a frequency transform coefficient whose value is zero. The binary data string includes at most one total_zeros for each basic block.

Parameter run_before is information indicating the number of zero coefficients which appeared in sequence after each of non-zero coefficients which appeared in the scan order defined in the descending order of frequencies indicated by the plurality of frequency transform coefficients included in the one or more basic blocks. The binary data string includes a certain number of parameters run_before. The certain number is at most the number obtained by subtracting 1 from the number of non-zero coefficients.

Parameter coeff_sign_flag is information indicating whether the value of each non-zero coefficient included in the basic block is positive or negative. The binary data string includes a certain number of parameters coeff_sign_flag. The certain number is at most the same number as the number of non-zero coefficients.

Parameter coeff_abs_level_remaining is information indicating the absolute value of each non-zero coefficient included in the basic block. The binary data string includes a certain number of parameters coeff_abs_level_remaining. The certain number is at most the same number as the number of non-zero coefficients.

The syntax structure indicated in FIG. 26 is an example. Another syntax structure which is different from the syntax structure indicated in FIG. 26 but indicates information similar to the information indicated by the syntax structure in FIG. 26 may be used.

[A Mounting Example of the Encoder]

Figure 27:
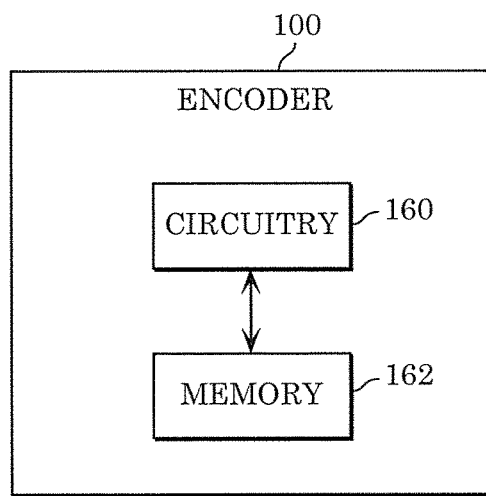
FIG. 27 is a block diagram illustrating a mounting example of the encoder according to Embodiment 1.

FIG. 27 is a block diagram illustrating a mounting example of encoder 100 according to Embodiment 1. Encoder 100 includes circuitry 160 and memory 162. For example, a plurality of constituent elements of encoder 100 illustrated in FIG. 1 and FIG. 11 are mounted as circuitry 160 and memory 162 illustrated in FIG. 27.

Circuitry 160 is circuitry for performing information processing and accessible to memory 162. For example, circuitry 160 is an exclusive or general electronic circuit for encoding image information. Circuitry 160 may be a processor such as a CPU. Alternatively, circuitry 160 may be an assembly of a plurality of electronic circuits. In addition, for example, circuitry 160 may take the roles of two or more of the constituent elements other than the constituent elements for storing information among the plurality of constituent elements of encoder 100 illustrated in FIG. 1 and FIG. 11.

Memory 162 is general memory or exclusive memory in which information used by circuitry 160 to encode image information is stored. Memory 162 may be an electronic circuit, or may be connected to circuitry 160. Alternatively memory 162 may be an assembly of a plurality of electronic circuits. In addition, memory 162 may be a magnetic disc, an optical disc, or the like, or may be represented as storage, a recording medium, or the like. In addition, memory 162 may be non-volatile memory, or volatile memory.

For example, in memory 162, image information to be encoded may be stored or a bitstream corresponding to encoded image information may be stored. In addition, a program that is executed by circuitry 160 to encode image information may be stored in memory 162.

In addition, for example, circuitry 160 may take the roles of the constituent elements for storing information among the plurality of constituent elements of encoder 100 illustrated in FIG. 1 and FIG. 11. Specifically, memory 162 may take the roles of block memory 118 and frame memory 122 illustrated in FIG. 1, or the role of intermediate buffer 136 illustrated in FIG. 11.

It is to be noted that, in encoder 100, not all the plurality of constituent elements illustrated in FIG. 1 and FIG. 11, etc. may be mounted, or not all the plurality of processes described above may be performed. Part of the plurality of constituent elements illustrated in FIG. 1 and FIG. 11, etc. may be included in one or more other devices, and part of the plurality of processes described above may be performed by the one or more other devices.

In encoder 100, part of the plurality of constituent elements illustrated in FIG. 1 and FIG. 11, etc. may be mounted, and the frequency transform coefficient information may be encoded appropriately by means of part of the above-described processes being executed.

[An Example of a First Encoding Operation Performed by the Encoder]

Figure 28:
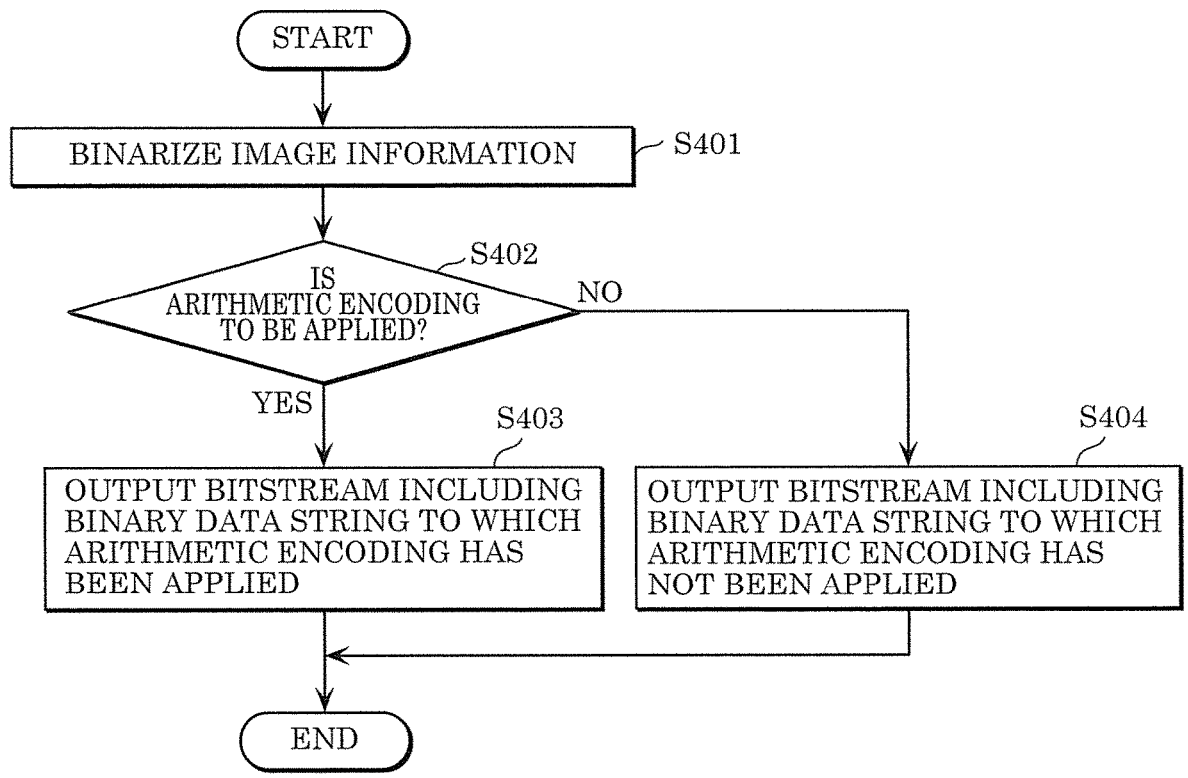
FIG. 28 is a flowchart indicating an example of a first encoding operation performed by the encoder according to Embodiment 1.

FIG. 28 is a flowchart indicating an example of a first encoding operation performed by encoder 100 according to Embodiment 1. For example, circuitry 160 of encoder 100 illustrated in FIG. 27 encodes image information and outputs a bitstream in which the image information is encoded, by performing the operation indicated in FIG. 28.

Specifically, circuitry 160 binarizes the image information first (S401). For example, the image information includes frequency transform coefficient information related to the frequency components of the image, prediction parameter information related to prediction methods for the image, and so on. Circuitry 160 switches whether or not to apply arithmetic encoding to the binary data string in which the image information has been binarized (S402).

When arithmetic encoding is applied to the binary data string (Yes in S402), circuitry 160 applies arithmetic encoding to the binary data string, and outputs a bitstream including the binary data string to which arithmetic encoding has been applied (S403).

When arithmetic encoding is not applied to the binary data string (No in S402), circuitry 160 skips applying arithmetic encoding to the binary data string, and outputs a bitstream including the binary data string to which arithmetic encoding has not been applied (S404).

In this way, encoder 100 is capable of skipping arithmetic encoding. Accordingly, encoder 100 is capable of supporting reduction in processing delay generated by the arithmetic encoding.

Figure 29:
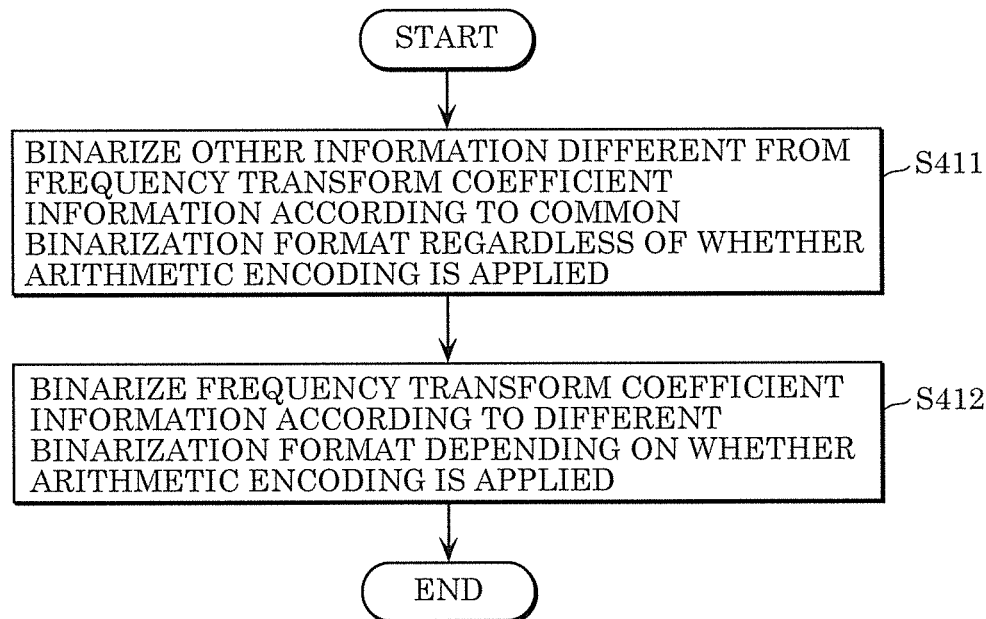
FIG. 29 is a flowchart indicating binarization processing in the example of the first encoding operation performed by the encoder according to Embodiment 1.

FIG. 29 is a flowchart indicating an example of a first encoding operation performed by encoder 100 according to Embodiment 1. In other words, FIG. 29 indicates a specific example of binarization processing (S401) in FIG. 28.

Circuitry 160 binarizes other information different from the frequency transform coefficient information included in the image information, according to the binarization format which is common between when arithmetic encoding is applied to the binary data string and when arithmetic encoding is not applied to the binary data string (S411). The other information includes, for example, a part or the entirety of prediction parameter information.

In addition, circuitry 160 binarizes the frequency transform coefficient information included in the image information, according to binarization formats which are different between when arithmetic encoding is applied to the binary data string and when arithmetic encoding is not applied to the binary data string (S412). More specifically, circuitry 160 may binarize the frequency transform coefficient information included in the image information, according to binarization formats which are different between when arithmetic encoding is applied to the binary data string and when arithmetic encoding is not applied to the binary data string.

In this way, encoder 100 is capable of appropriately binarizing the frequency transform coefficient information which largely affects the total coding amount, according to whether or not arithmetic encoding is applied. Accordingly, encoder 100 is capable of appropriately encoding the frequency transform coefficient information, thereby being able to reduce increase in the total coding amount.

It is to be noted that the processing order of the binarization of the other information (S411) and the binarization of the frequency transform coefficient information (S412) may be inversed.

In addition, for example, the prediction parameter information includes: information related to encoding modes information related to prediction directions in intra prediction; information related to reference pictures in inter prediction; and information related to motion vectors in inter prediction.

Circuitry 160 may binarize these kinds of information included in the prediction parameter information, according to the binarization format which is common between when arithmetic encoding is applied to the binary data string and when arithmetic encoding is not applied to the binary data string. Alternatively, circuitry 160 may binarize at least one of these kinds of information, according to the binarization format which is common between when arithmetic encoding is applied to the binary data string and when arithmetic encoding is not applied to the binary data string.

In addition, circuitry 160 may binarize only the frequency transform coefficient information included in the image information, according to the binarization formats which are different depending on whether arithmetic encoding is applied. Circuitry 160 may binarizes all the information other than the frequency transform coefficient information included in the image information, according to the binarization format which is common regardless of whether arithmetic encoding is applied.

In this way, encoder 100 is capable of binarizing all the information other than the frequency transform coefficient information, according to the common binarization format. Accordingly, the processing is simplified.

Figure 30:
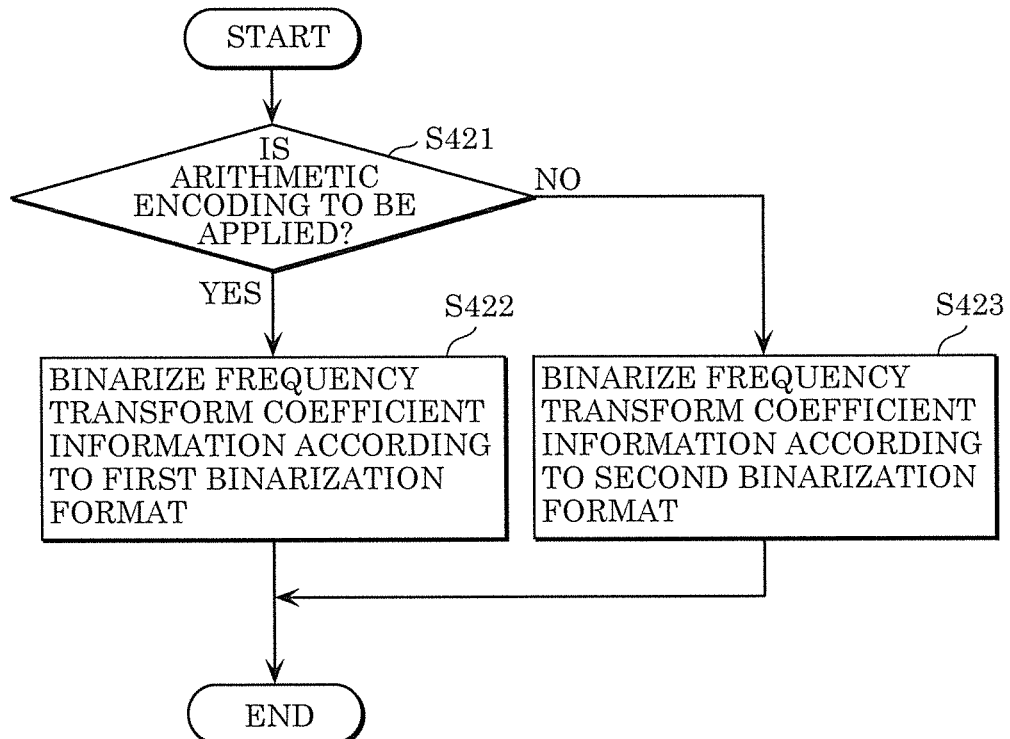
FIG. 30 is a flowchart indicating binarization processing of frequency transform coefficient information in the example of the first encoding operation performed by the encoder according to Embodiment 1.

FIG. 30 is a flowchart indicating binarization processing of frequency transform coefficient information in an example of a first encoding operation performed by encoder 100 according to Embodiment 1. In other words, FIG. 30 indicates a specific example of binarization processing (S412) of frequency transform coefficient information in FIG. 29.

When arithmetic encoding is applied to a binary data string (Yes in S421), circuitry 160 binarizes frequency transform coefficient information according to a first binarization format (S422). When arithmetic encoding is not applied to a binary data string (No in S421), circuitry 160 binarizes frequency transform coefficient information according to a second binarization format (S423). When arithmetic encoding is not applied to the binary data string, circuitry 160 binarizes the frequency transform coefficient information according to a binarization format which generates a smaller number of bits when arithmetic encoding is not applied to the binary data string than when arithmetic encoding is applied to the binary data string.

In this way, encoder 100 is capable of assisting reduction in coding amount of the frequency transform coefficient information when arithmetic encoding is not applied.

[An Example of a Second Encoding Operation Performed by the Encoder]

Figure 31:
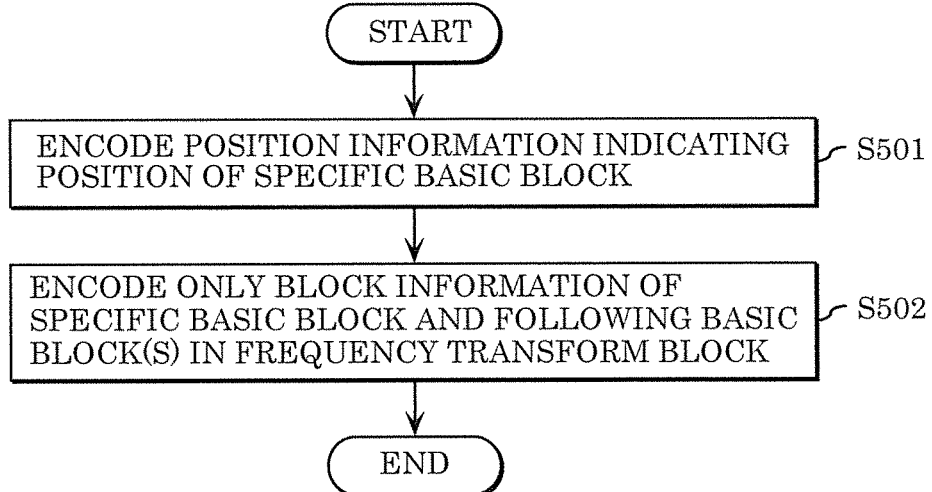
FIG. 31 is a flowchart indicating an example of a second encoding operation performed by the encoder according to Embodiment 1.

FIG. 31 is a flowchart indicating an example of a second encoding operation performed by encoder 100 according to Embodiment 1. For example, circuitry 160 of encoder 100 illustrated in FIG. 27 encodes image information by performing the operation indicated in FIG. 31.

Specifically, circuitry 160 encodes position information indicating the position of the specific basic block (S501). The specific basic block is a basic block including, as one of a plurality of frequency transform coefficients, a non-zero coefficient first in the scan order in the one or more basic blocks which constitute the frequency transform block including the plurality of frequency transform coefficients.

Circuitry 160 encodes only block information indicating the plurality of frequency transform coefficients which constitute each of the specific basic block and the following basic block(s) in the predetermined scan order out of the one or more basic blocks which constitute the frequency transform block (S502).

In this way, encoder 100 is capable of binarizing the position information and the block information as the frequency transform coefficient information. Since encoder 100 encodes the block information of each of the specific basic block and the following basic block(s) in the predetermined scan order, encoder 100 is capable of assisting reduction in the coding amount of the frequency transform coefficient information.

It is to be noted that circuitry 160 may encode position information only when the number of one or more basic blocks which constitute a frequency transform block is two or more. In this way, when, for example, the size of the frequency transform block and the size of each basic block are the same, encoder 100 is capable of assisting further reduction in coding amount of the frequency transform coefficient information.

In addition, circuitry 160 may encode position information and block information only when a specific basic block is present in a frequency transform block. In this way, when, for example, the size of the frequency transform block and the size of each basic block are the same, encoder 100 is capable of assisting further reduction in coding amount of the frequency transform coefficient information.

In addition, circuitry 160 may encode image information and output a bitstream in which the image information has been encoded, in the same manner as in the example of a first encoding operation. For example, circuitry 160 binarizes image information as in FIG. 28 (S401). Circuitry 160 then switches whether or not to apply arithmetic encoding to the binary data string in which the image information has been binarized (S402).

When arithmetic encoding is applied to the binary data string (Yes in S402), circuitry 160 applies arithmetic encoding to the binary data string, and outputs a bitstream including the binary data string to which arithmetic encoding has been applied (S403). When arithmetic encoding is not applied to the binary data string (No in S402), circuitry 160 skips applying arithmetic encoding to the binary data string, and outputs a bitstream including the binary data string to which arithmetic encoding has not been applied (S404).

In addition, as indicated in FIG. 29, circuitry 160 binarizes other information included in the image information, according to the binarization format which is common between when arithmetic encoding is applied to the binary data string and when arithmetic encoding is not applied to the binary data string (S411). The other information includes, for example, apart or the entirety of prediction parameter information.

In addition, circuitry 160 then binarizes the frequency transform coefficient information included in the image information, according to binarization formats different between when arithmetic encoding is applied to the binary data string and when arithmetic encoding is not applied to the binary data string (S412).

In addition, when arithmetic encoding is not applied to the binary data string, circuitry 160 binarizes the frequency transform coefficient information including the position information and the block information, to encode the position information and the block information. Here, the block information which is encoded is the block information of the specific basic block and the following basic block(s) in the predetermined scan order. In this way, encoder 100 is capable of assisting reduction in coding amount of the frequency transform coefficient information when arithmetic encoding is not applied.

[An Example of a Third Encoding Operation Performed by the Encoder]

Figure 32:
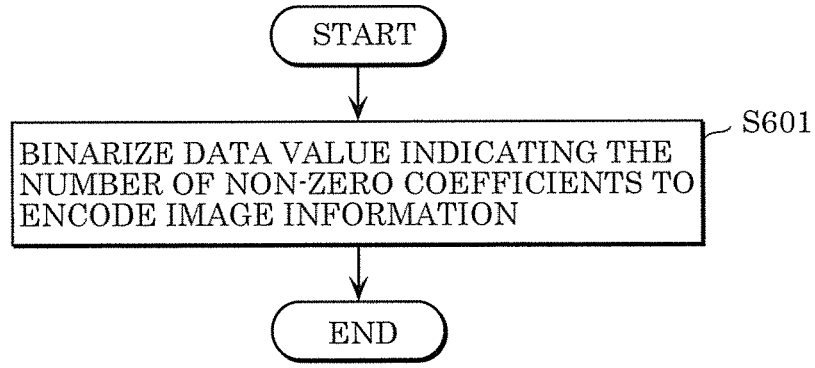
FIG. 32 is a flowchart indicating an example of a third encoding operation performed by the encoder according to Embodiment 1.

FIG. 32 is a flowchart indicating an example of a third encoding operation performed by encoder 100 according to Embodiment 1. For example, circuitry 160 of encoder 100 illustrated in FIG. 27 encodes image information by performing the operation indicated in FIG. 32.

Specifically, circuitry 160 binarizes a data value indicating the number of non-zero coefficients included in a current basic block according to a conversion table in which a plurality of data values and a plurality of binary values are associated with each other, to encode the image information including the data value (S601). Here, the current basic block is one of the one or more basic blocks which constitute the frequency transform block including the plurality of frequency transform coefficients.

In this way, encoder 100 is capable of appropriately encoding significant information which is used for efficient representation of the plurality of frequency transform coefficients which constitute the basic block.

Figure 33:
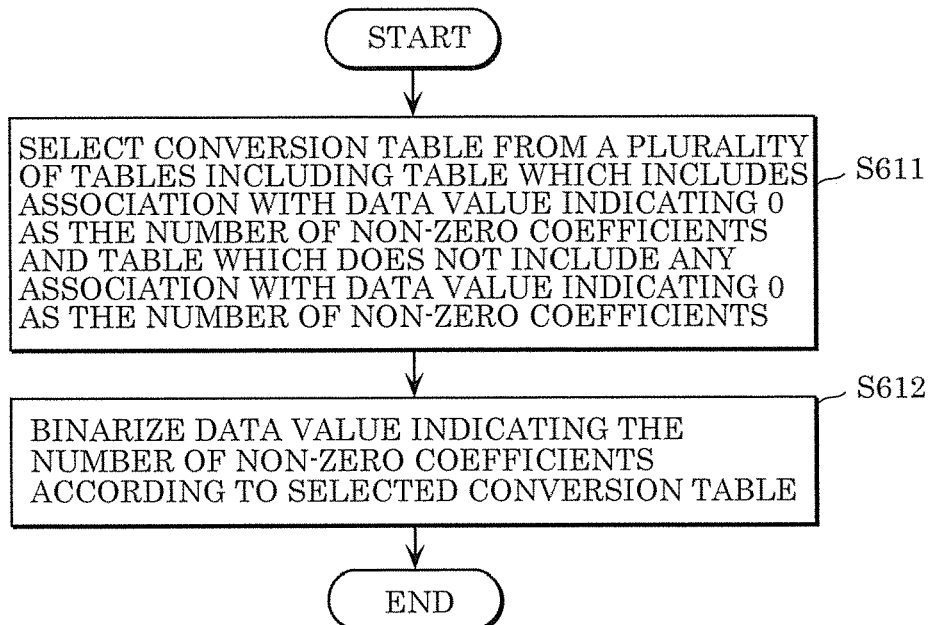
FIG. 33 is a flowchart indicating binarization processing in the example of the third encoding operation performed by the encoder according to Embodiment 1.

FIG. 33 is a flowchart indicating binarization processing in an example of a third encoding operation performed by encoder 100 according to Embodiment 1. In other words, FIG. 33 indicates a specific example of binarization processing in FIG. 32.

Circuitry 160 selects a conversion table from a plurality of tables including a first table which includes association with a data value indicating 0 as the number of non-zero coefficients and a second table which does not include any association with a data value indicating 0 as the number of non-zero coefficients (S611). Circuitry 160 then binarizes the data value according to the selected conversion table (S612).

In this way, encoder 100 is capable of using the table having a reduced information amount as the conversion table for binarization. In this way, encoder 100 is capable of assisting reduction in coding amount of the frequency transform coefficient information.

Circuitry 160 may binarize only the data value indicating the number of non-zero coefficients included in each of the specific basic block and the following basic block(s) in the predetermined scan order among the one or more basic blocks which constitute the frequency transform block. In other words, circuitry 160 may binarize the data value indicating the number of non-zero coefficients of each of the specific basic block and the following basic block(s) in the predetermined scan order, as the data value indicating the number of non-zero coefficients of a current basic block.

In this way, encoder 100 is capable of assisting reduction in coding amount of the frequency transform coefficient information. It is to be noted that the specific basic block is a basic block including a non-zero coefficient first in the scan order which is defined in a descending order of frequencies in the one or more basic blocks which constitute the frequency transform block including a plurality of frequency transform coefficients, as one of the plurality of frequency transform coefficients.

In addition, circuitry 160 may binarize the data value indicating the number of non-zero coefficients of the current basic block only when a specific basic block is included in the one or more basic blocks which constitute the frequency transform block. When the frequency transform block and the current basic block are the same, circuitry 160 may then select, as the conversion table, the second table which does not include any association with a data value indicating 0 as the number of non-zero coefficients.

In this way, when, for example, the size of the frequency transform block and the size of each basic block are the same, encoder 100 is capable of assisting further reduction in coding amount of the frequency transform coefficient information, using the second table which does not include any association with a data value indicating 0 as the number of non-zero coefficient.

In addition, when the current basic block is a specific basic block, circuitry 160 may select, as the conversion table, the second table which does not include any association with a data value indicating 0 as the number of non-zero coefficients.

In this way, when, for example, the current basic block is a specific basic block, encoder 100 is capable of assisting further reduction in coding amount of the frequency transform coefficient information, using the second table which does not include any association with a data value indicating 0 as the number of non-zero coefficients.

In addition, circuitry 160 may encode image information and output a bitstream in which the image information has been encoded, in the same manner as in the example of a first encoding operation. For example, circuitry 160 binarizes image information as in FIG. 28 (S401). Circuitry 160 then switches whether or not to apply arithmetic encoding to the binary data string in which the image information has been binarized (S402).

When arithmetic encoding is applied to the binary data string (Yes in S402), circuitry 160 applies arithmetic encoding to the binary data string, and outputs a bitstream including the binary data string to which arithmetic encoding has been applied (S403). When arithmetic encoding is not applied to the binary data string (No in S402), circuitry 160 skips applying arithmetic encoding to the binary data string, and outputs a bitstream including the binary data string to which arithmetic encoding has not been applied (S404).

In addition, as indicated in FIG. 29, circuitry 160 binarizes other information included in the image information, according to the binarization format which is common between when arithmetic encoding is applied to the binary data string and when arithmetic encoding is not applied to the binary data string (S411). The other information includes, for example, a part or the entirety of prediction parameter information.

In addition, circuitry 160 then binarizes the frequency transform coefficient information included in the image information, according to binarization formats different between when arithmetic encoding is applied to the binary data string and when arithmetic encoding is not applied to the binary data string (S412).

In addition, when arithmetic encoding is not applied to the binary data string, circuitry 160 binarizes the data value included in the frequency transform coefficient information according to the conversion table selected from the plurality of tables including the first table and the second table. Here, the first table includes association with a data value indicating 0 as the number of non-zero coefficients, and the second table does not include any association with a data value indicating 0 as the number of non-zero coefficients.

In this way, when arithmetic encoding is not applied, encoder 100 is capable of assisting reduction in coding amount of the frequency transform coefficient information, using the conversion table selected from the plurality of tables including the second table which does not include any association with a data value indicating 0 as the number of non-zero coefficients.

[An Example of a Fourth Encoding Operation Performed by the Encoder]

In the example of a fourth encoding operation, a data value indicating the number of non-zero coefficients is binarized in the same manner as in the example of the third encoding operation illustrated in FIG. 32. Specifically, circuitry 160 binarizes the data value indicating the number of non-zero coefficients included in a current basic block according to a conversion table in which a plurality of data values and a plurality of binary values are associated with each other, to encode image information including the data value (S601).

Figure 34:
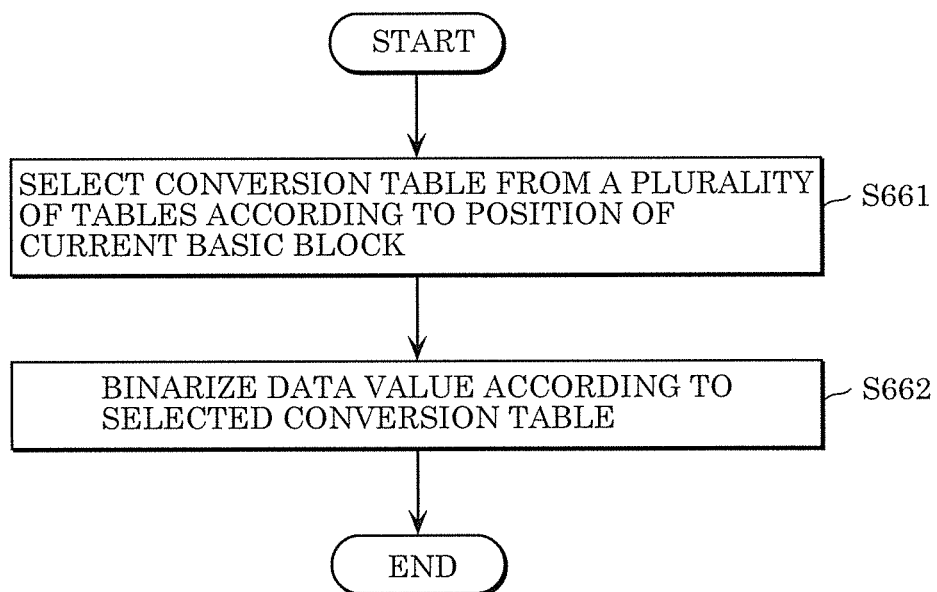
FIG. 34 is a flowchart indicating binarization processing in an example of a fourth encoding operation performed by the encoder according to Embodiment 1.

FIG. 34 is a flowchart indicating binarization processing in an example of a fourth encoding operation performed by encoder 100 according to Embodiment 1. In other words, FIG. 34 indicates a specific example of binarization processing in FIG. 32.

Circuitry 160 selects a conversion table from a plurality of tables according to the position of a current basic block in a current frequency transform block (S661). The current frequency transform block is a frequency transform block including the current basic block. The plurality of tables include two or more tables which differ from each other in difference between a longest bit length and a shortest bit length of a plurality of binary values associated with a plurality of data values. Circuitry 160 then binarizes the data value according to the selected conversion table (S662).

In this way, encoder 100 is capable of selecting the conversion table for binarizing the data value indicating the number of non-zero coefficients, according to the position of the current basic block. The characteristics of the number of non-zero coefficients differ depending on the position of the current basic block. Accordingly, encoder 100 is capable of reflecting the characteristics of the number of non-zero coefficients in the selection of the conversion table, using the position of the current basic block.

Accordingly, encoder 100 is capable of appropriately selecting the conversion table, and assists reduction in coding amount of the frequency transform coefficient information.

When a preceding basic block is present at the same frequency level as the frequency level at the position of the current basic block, circuitry 160 may select the conversion table, according to the position of the current basic block and the number of non-zero coefficients included in the preceding basic block.

Here, the preceding basic block is a basic block located before the current basic block in the predetermined scan order defined in a descending order of frequencies in the one or more basic blocks which constitute the current frequency transform block. In addition, the frequency level at the position of the current basic block is a frequency level corresponding to the position of the current basic block.

In this way, encoder 100 is capable of selecting the conversion table according to the non-zero coefficients of the preceding basic block which is estimated to have a similar number of non-zero coefficients with respect to the number of non-zero coefficients of the current basic block.

In addition, when the preceding basic block has the same frequency level as the frequency level at the position of the current basic block and the number of non-zero coefficients included in the preceding basic block is a first number, circuitry 160 may select the first table as the conversion table. When the preceding basic block has the same frequency level as the frequency level at the position of the current basic block and the number of non-zero coefficients included in the preceding basic block is a second number, circuitry 160 may select the second table as the conversion table.

Here, the second number is larger than the first number. In addition, the difference between the longest bit length and the shortest bit length of a plurality of binary values in the second table is smaller than the difference between the longest bit length and the shortest bit length of a plurality of binary values in the first table. In other words, when the number of non-zero coefficients included in the preceding basic block is large, circuitry 160 may select, as the conversion table, the table in which the difference between the longest bit length and the shortest bit length of a plurality of binary values is small.

In this way, when the number of non-zero coefficients of the current basic block is estimated to be large according to the number of non-zero coefficients of the preceding basic block, encoder 100 is capable of selecting the table in which the difference in bit length is small as the conversion table, and assisting reduction in increase in coding amount.

In addition, for example, no preceding basic block may be present at the same frequency level as the frequency level at the position of the current basic block, and a specific basic block may be present at a frequency level higher than the frequency level at the position of the current basic block. Here, the specific basic block is a basic block including the non-zero coefficient first in the predetermined scan order. In this case, circuitry 160 may select, as the conversion table, the table in which the difference between the longest bit length and the shortest bit length is smaller than a predetermined difference, from the plurality of tables.

In this way when the number of non-zero coefficients is estimated to be large according to the relationship between the current basic block and the specific basic block, encoder 100 is capable of selecting the table in which the difference in bit length is small as the conversion table, and assisting reduction in increase in coding amount. The predetermined difference is not limited to a fixed value, and may be determined relatively, for example, similarly to the difference between the longest bit length and the shortest bit length in the table having the second smallest difference in bit length among the plurality of tables.

Specifically, in the above case, circuitry 160 may select, as the conversion table, the table in which the difference between the longest bit length and the shortest bit length is the smallest in the plurality of tables. In this way, when the number of non-zero coefficients is estimated to be large according to the relationship between the current basic block and the specific basic block, encoder 100 is capable of selecting the table in which the difference in bit length is small as the conversion table, and assisting reduction in increase in coding amount.

In addition, for example, no preceding basic block may be present at the same frequency level as the frequency level at the position of the current basic block, and no specific basic block may be present at a frequency level higher than the frequency level at the position of the current basic block. In this case, circuitry 160 may select the conversion table according to the number of non-zero coefficients estimated to be the number of non-zero coefficients, based on a neighboring frequency transform block which is a frequency transform block located around the current frequency transform block.

In this way, encoder 100 is capable of selecting the conversion table using the neighboring frequency transform block which is estimated to have a similar number of non-zero coefficients with respect to the number of non-zero coefficients of the current basic block.

In addition, in the above case, circuitry 160 may select the first table when the number of non-zero coefficients estimated based on the neighboring frequency transform block is the first number, and the second table when the number of non-zero coefficients estimated based on the neighboring frequency transform block is the second number. Here, the second number is larger than the first number. In addition, the difference between the longest bit length and the shortest bit length of a plurality of binary values in the second table is smaller than the difference between the longest bit length and the shortest bit length of a plurality of binary values in the first table.

In other words, when the number of non-zero coefficients estimated based on the neighboring frequency transform block is large, circuitry 160 may select, as the conversion table, the table in which the difference between the longest bit length and the shortest bit length of a plurality of binary values is small. In this way, when the number of non-zero coefficients of the current basic block is estimated to be large according to the neighboring frequency transform block, encoder 100 is capable of selecting the table in which the difference in bit length is small as the conversion table, and assisting reduction in increase in coding amount.

In addition, the neighboring frequency transform block may be a frequency transform block adjacent to the left of or above the current frequency transform block. In this way, encoder 100 is capable of predicting the number of non-zero coefficients at high accuracy according to the number of non-zero coefficients included in the frequency transform block close to the current frequency transform block.

Alternatively, the neighboring frequency transform block may be a frequency transform block which has been encoded immediately before the current frequency transform block. This enables simple prediction of the number of non-zero coefficients and reduction in memory capacity for storing information related to the number of non-zero coefficients.

Alternatively, the neighboring frequency transform block may be a frequency transform block which is located within a predetermined range from the current frequency transform block and whose coding mode which is one of an inter prediction mode and an intra prediction mode is the same as that of the current frequency transform block. In this way, encoder 100 is capable of predicting the number of non-zero coefficients at high accuracy according to the frequency transform block whose tendency of occurrence of non-zero coefficients is estimated to be similar to that of the current frequency transform block.

In addition, the number of non-zero coefficients included in the current basic block may be estimated based on the number of non-zero coefficients included in one of the one or more basic blocks included in the neighboring frequency transform block. The one basic block is a basic block whose position relative to the neighboring frequency transform block is equivalent to the position of the current basic block relative to the current frequency transform block.

In this way, encoder 100 is capable of selecting a conversion table according to the basic block included in the one or more basic blocks and estimated to have approximately the same number of non-zero coefficients as the number of non-zero coefficients of the current basic block.

Alternatively, the number of non-zero coefficients estimated based on the neighboring frequency transform block may be estimated based on the number of non-zero coefficients included in the entirety of the neighboring frequency transform block. In this way, the information is integrated regardless of the sizes of frequency transform blocks. This enables simple prediction of the number of non-zero coefficients and reduction in memory capacity for storing information related to the number of non-zero coefficients.

In addition, for example, no preceding basic block may be present at the same frequency level as the frequency level at the position of the current basic block, and no specific basic block may be present at a frequency level higher than the frequency level at the position of the current basic block. In this case, circuitry 160 may select a conversion table according to whether the coding mode of the current basic block is the inter prediction mode or the intra prediction mode.

In this way, encoder 100 is capable of selecting the conversion table according to the coding mode which is the inter prediction mode or the intra prediction mode. The characteristics of the number of non-zero coefficients are estimated to be different depending on the coding mode. Accordingly, encoder 100 is capable of reflecting the characteristics of the number of non-zero coefficients in the selection of the conversion table, using the coding mode. Accordingly, encoder 100 is capable of appropriately selecting the conversion table, and assisting reduction in coding amount of the frequency transform coefficient information.

In addition, in the above case, circuitry 160 may select the first table when the coding mode is the inter prediction mode, and select the second table when the coding mode is the intra prediction mode. Here, the difference between the longest bit length and the shortest bit length of a plurality of binary values in the second table is smaller than the difference between the longest bit length and the shortest bit length of a plurality of binary values in the first table.

In other words, when the coding mode is the intra prediction mode, circuitry 160 may select, as the conversion table, the table having the small difference between the longest bit length and the shortest bit length of the plurality of binary values. In this way, encoder 100 is capable of selecting the table having the small difference in bit length as the conversion table when the coding mode is the intra prediction mode in which the prediction accuracy is low and the number of non-zero coefficients is large, thereby being capable of assisting reduction in increase in coding amount.

As described above, for example, no preceding basic block may be present at the same frequency level as the frequency level at the position of the current basic block, and no specific basic block may be present at a frequency level higher than the frequency level at the position of the current basic block. In this case, circuitry 160 may select a conversion table according to a quantization parameter which is used to encode a current basic block.

In this way, encoder 100 is capable of selecting the conversion table according to the quantization parameter which is used to encode the current basic block. The characteristics of the number of non-zero coefficients are estimated to be different depending on the quantization parameter. Accordingly, encoder 100 is capable of reflecting the characteristics of the number of non-zero coefficients in the selection of the conversion table, using the quantization parameter. Accordingly, encoder 100 is capable of appropriately selecting the conversion table, and assisting reduction in coding amount of the frequency transform coefficient information.

In addition, in the above case, circuitry 160 may select the first table when the quantization parameter is a first value, and select the second table when the quantization parameter is a second value. Here, the second value is smaller than the first value. In addition, the difference between the longest bit length and the shortest bit length of a plurality of binary values in the second table is smaller than the difference between the longest bit length and the shortest bit length of a plurality of binary values in the first table.

In other words, when the quantization parameter is small, circuitry 160 may select, as the conversion table, the table having the small difference between the longest bit length and the shortest bit length of the plurality of binary values. In this way, encoder 100 is capable of selecting the table having the small difference in bit length as the conversion table when the quantization parameter is small and thus the number of non-zero coefficients is large, thereby being capable of assisting reduction in increase in coding amount.

In addition, circuitry 160 may encode image information and output a bitstream in which the image information has been encoded, in the same manner as in the example of a first encoding operation. For example, circuitry 160 binarizes image information as in FIG. 28 (S401). Circuitry 160 then switches whether or not to apply arithmetic encoding to the binary data string in which the image information has been binarized (S402).

When arithmetic encoding is applied to the binary data string (Yes in S402), circuitry 160 applies arithmetic encoding to the binary data string, and outputs a bitstream including the binary data string to which arithmetic encoding has been applied (S403). When arithmetic encoding is not applied to the binary data string (No in S402), circuitry 160 skips applying arithmetic encoding to the binary data string, and outputs a bitstream including the binary data string to which arithmetic encoding has not been applied (S404).

In addition, as indicated in FIG. 29, circuitry 160 binarizes other information included in the image information, according to the binarization format which is common between when arithmetic encoding is applied to the binary data string and when arithmetic encoding is not applied to the binary data string (S411). The other information includes, for example, apart or the entirety of prediction parameter information.

In addition, circuitry 160 then binarizes the frequency transform coefficient information included in the image information, according to binarization formats different between when arithmetic encoding is applied to the binary data string and when arithmetic encoding is not applied to the binary data string (S412).

In addition, when arithmetic encoding is not applied to the binary data string, circuitry 160 binarizes the data value included in the frequency transform coefficient information according to the conversion table selected from the plurality of tables, according to the position of the current basic block. In this way, when arithmetic encoding is not applied, encoder 100 is capable of assisting reduction in coding amount of frequency transform coefficient information, using the conversion table which is selected from the plurality of tables using the position of the current basic block.

It is to be noted that the difference between a longest bit length and a shortest bit length more corresponds to the ratio of the bit length of the binary value associated with the data values each indicating the number of non-zero coefficients of a current basic block, as the number of non-zero coefficients of the current basic block increases. Accordingly, the difference between the longest bit length and the shortest bit length may be replaced with the ratio of the bit length of the binary value associated with the data values each indicating the number of non-zero coefficients of the current basic block, as the number of non-zero coefficients of the current basic block increases.

For example, the ratio is 0 or larger. In the table having the ratio of 0, the bit length of the binary value associated with the data values each indicating the number of non-zero coefficients of the current block does not increase even when the number of non-zero coefficients of the current basic block increases. Accordingly the difference between a longest bit length and a shortest bit length may be replaced with the ratio of the bit length of binary value associated with the data values each indicating the number of non-zero coefficients of a current block, as the number of non-zero coefficients of the current basic block increases.

[A Mounting Example of the Decoder]

Figure 35:
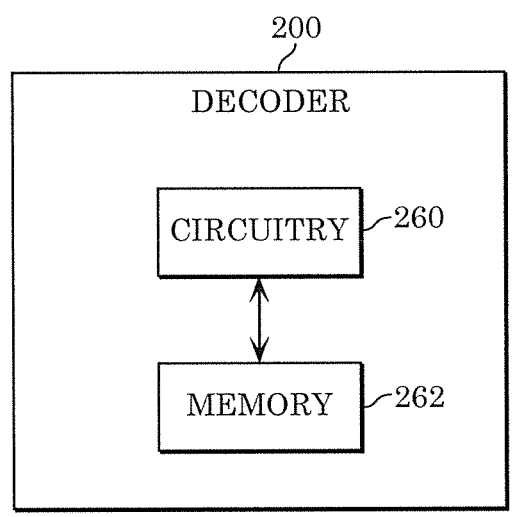
FIG. 35 is a block diagram illustrating a mounting example of the decoder according to Embodiment 1.

FIG. 35 is a block diagram illustrating a mounting example of decoder 200 according to Embodiment 1. Decoder 200 includes circuitry 260 and memory 262. For example, a plurality of constituent elements of decoder 200 illustrated in FIGS. 10 and 12 are mounted as circuitry 260 and memory 262 illustrated in FIG. 35.

Circuitry 260 is circuitry for performing information processing and accessible to memory 262. For example, circuitry 260 is an exclusive or general electronic circuit for decoding image information. Circuitry 260 may be a processor such as a CPU. Alternatively, circuitry 260 may be an assembly of a plurality of electronic circuits. In addition, for example, circuitry 260 may take the roles of two or more of the constituent elements other than the constituent elements for storing information among the plurality of constituent elements of decoder 200 illustrated in FIGS. 10 and 12.

Memory 262 is a general or exclusive memory for storing information for decoding image information by circuitry 260. Memory 262 may be an electronic circuit, or may be connected to circuitry 260. Alternatively memory 262 may be an assembly of a plurality of electronic circuits. In addition, memory 262 may be a magnetic disc, an optical disc, or the like, or may be represented as storage, a recording medium, or the like. In addition, memory 262 may be non-volatile memory, or volatile memory.

For example, a bitstream corresponding to encoded image information or image information corresponding to a decoded bitstream may be stored in memory 262. In addition, a program that is executed by circuitry 260 to decode image information may be stored in memory 262.

In addition, for example, circuitry 260 may take the roles of two or more of the constituent elements other than the constituent elements for storing information among the plurality of constituent elements of decoder 200 illustrated in FIGS. 10 and 12. Specifically, memory 262 may take the roles of block memory 210 and frame memory 214 illustrated in FIG. 10, or the role of intermediate buffer 240 illustrated in FIG. 12.

It is to be noted that, in decoder 200, not all the plurality of constituent elements illustrated in FIGS. 10, 12, etc. may be mounted, or not all the plurality of processes described above may be performed. Part of the plurality of constituent elements illustrated in FIGS. 10, 12, etc. may be included in one or more other devices, and part of the plurality of processes described above may be performed by the one or more other devices.

In decoder 200, part of the plurality of constituent elements illustrated in FIG. 10 and FIG. 12, etc. may be mounted, and the frequency transform coefficient information may be encoded appropriately by means of part of the above-described processes being executed.

[An Example of a First Decoding Operation Performed by the Decoder]

Figure 36:
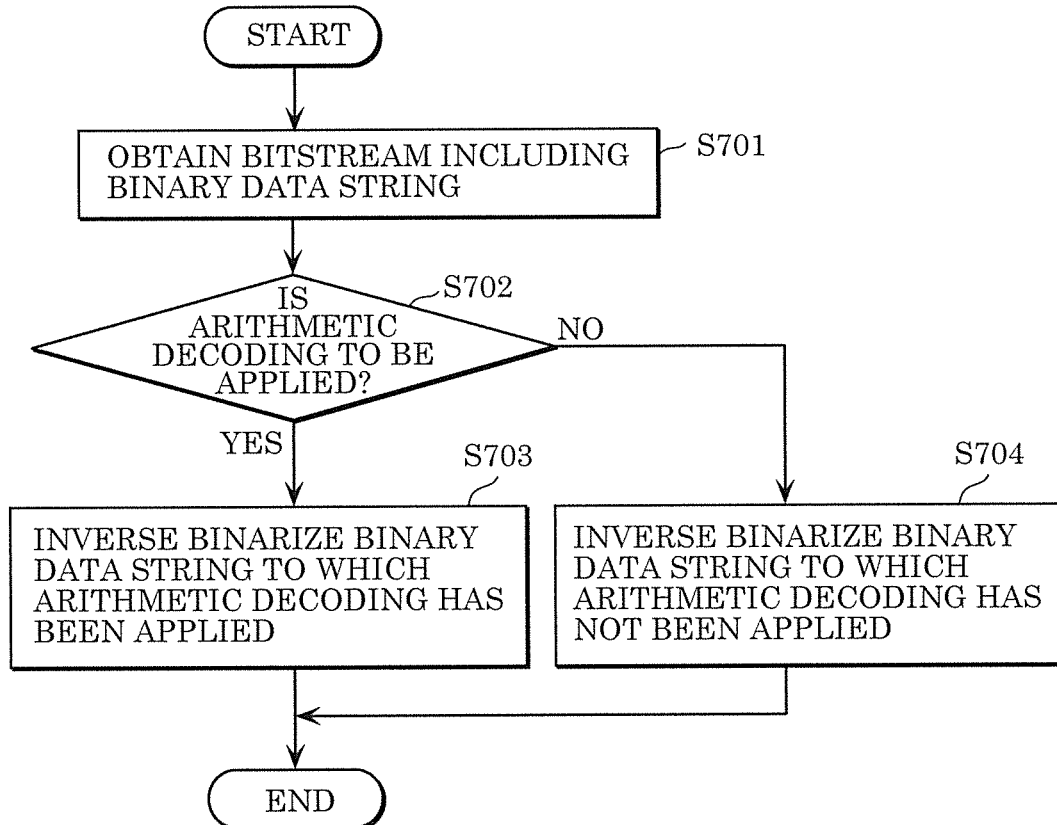
FIG. 36 is a flowchart indicating an example of a first decoding operation performed by the decoder according to Embodiment 1.

FIG. 36 is a flowchart indicating an example of a first decoding operation performed by decoder 200 according to Embodiment 1. For example, circuitry 260 of decoder 200 illustrated in FIG. 35 obtains a bitstream in which image information has been encoded and decodes the image information, by performing the operation indicated in FIG. 36.

Specifically, circuitry 260 obtains the bitstream including the binary data string in which the image information has been binarized (S701). For example, the image information includes frequency transform coefficient information related to the frequency components of the image, prediction parameter information related to prediction methods for the image, and so on. Circuitry 260 then switches whether or not to apply arithmetic decoding to the binary data string included in the bitstream (S702).

When arithmetic decoding is applied to the binary data string (Yes in S702), circuitry 260 decodes the image information by applying arithmetic decoding to the binary data string and inverse binarizing the binary data to which arithmetic decoding has been applied (S703).

When arithmetic decoding is applied to the binary data string (No in S702), circuitry 260 decodes the image information by skipping applying arithmetic decoding to the binary data sting and inverse binarizing the binary data string to which arithmetic decoding has not been applied (S704).

In this way, decoder 200 is capable of skipping arithmetic decoding. Accordingly, decoder 200 is capable of supporting reduction in processing delay generated by the arithmetic decoding.

Figure 37:
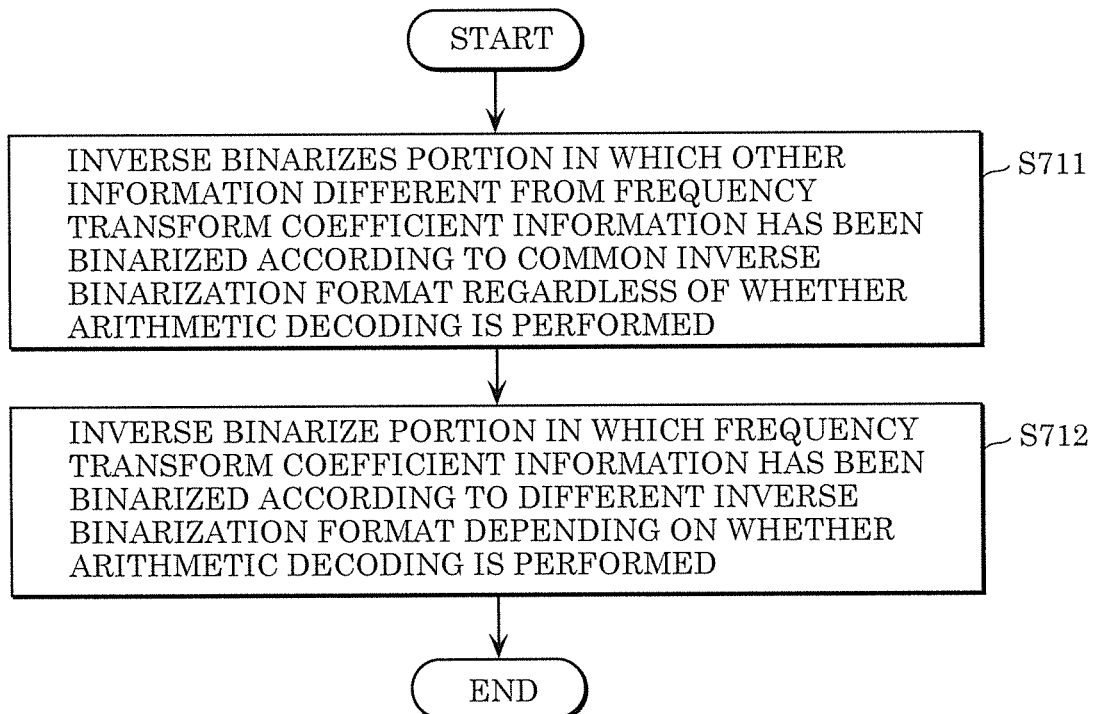
FIG. 37 is a flowchart indicating inverse binarization processing in the example of the first decoding operation performed by the decoder according to Embodiment 1.

FIG. 37 is a flowchart indicating inverse binarization processing in the first decoding operation performed by decoder 200 according to Embodiment 1. In other words, FIG. 37 indicates a specific example of inverse binarization processing (S703 and S704) in FIG. 36.

Circuitry 260 inverse binarizes a second portion of the binary data string according to an inverse binarization format which is common between when arithmetic decoding is applied to the binary data string and when arithmetic decoding is not applied to the binary data string (S711). The second portion is different from a later-described first portion of the binary data string. The second portion of the binary data string is a portion in which the other information different from frequency transform coefficient information has been binarized. The other information includes, for example, a part or the entirety of prediction parameter information.

In addition, circuitry 260 inverse binarizes the first portion according to inverse binarization formats which are different between when arithmetic decoding is applied to the binary data string and when arithmetic decoding is not applied to the binary data string (S712). The first portion of the binary data string is a portion in which the frequency transform coefficient information has been binarized. More specifically, the first portion of the binary data string may be a portion in which information including the frequency transform coefficient information has been binarized.

In this way, decoder 200 is capable of appropriately inverse binarizing the first portion corresponding to the frequency transform coefficient information which significantly affects the total coding amount, according to whether or not to apply arithmetic decoding to the binary data string. Accordingly, decoder 200 is capable of appropriately decoding the frequency transform coefficient information, thereby being able to reduce increase in the total coding amount.

It is to be noted that the processing order of the inverse binarization of the second portion in which the other information has been binarized (S711) and the inverse binarization of the first portion in which the frequency transform coefficient information has been binarized (S712) may be inversed.

In addition, for example, the prediction parameter information includes: information related to encoding modes; information related to prediction directions in intra prediction; information related to reference pictures in inter prediction; and information related to motion vectors in inter prediction.

Circuitry 260 may inverse binarizes the second portion in which these kinds of information included in the prediction parameter information have been binarized, according to the inverse binarization format which is common between when arithmetic decoding is applied to the binary data string and when arithmetic decoding is not applied to the binary data string. Alternatively, circuitry 260 may binarize at least one of these kinds of information, according to the binarization format which is common between when arithmetic encoding is applied to the binary data string and when arithmetic encoding is not applied to the binary data string.

In addition, circuitry 260 may inverse binarize only the first portion which is included in the binary data string and in which the frequency transform coefficient information has been binarized, according to the inverse binarization formats different depending on whether or not to apply arithmetic decoding to the binary data string. Circuitry 260 may then inverse binarize all the portion other than the first portion in which the frequency transform coefficient information in the binary data string has been binarized in the binary data string, regardless of whether or not to apply arithmetic decoding to the binary data string.

In this way, decoder 200 is capable of inverse binarizing all the portion other than the first portion corresponding to the frequency transform coefficient information, according to the common inverse binarization format. Accordingly, the processing is simplified.

Figure 38:
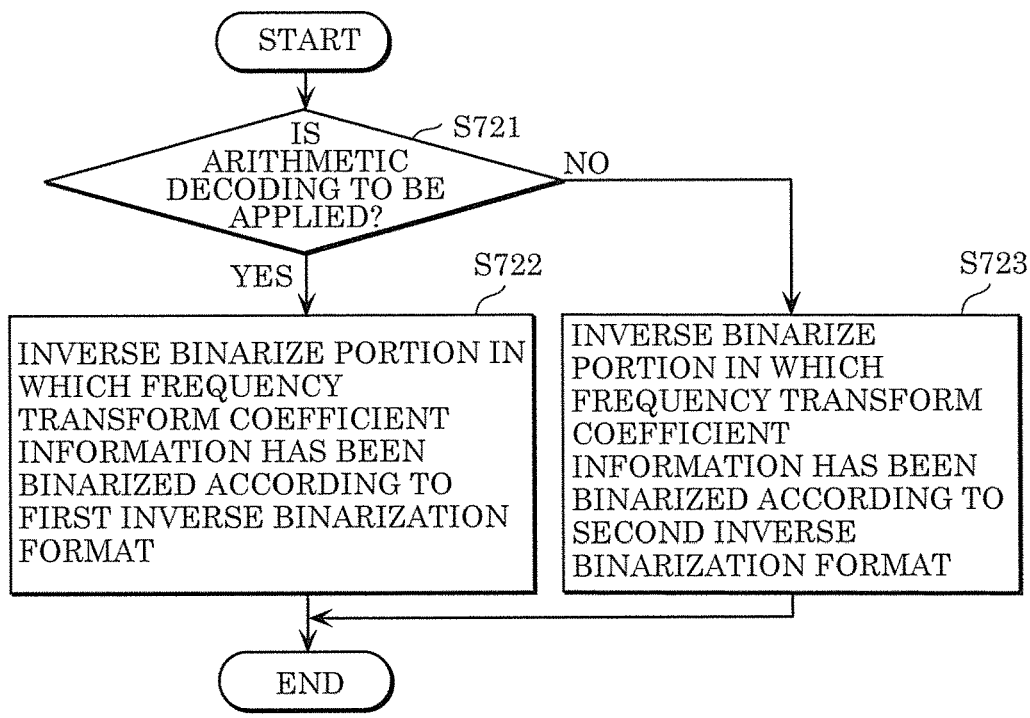
FIG. 38 is a flowchart indicating inverse binarization processing of a binary data string of frequency transform coefficient information in the example of the first decoding operation performed by the decoder according to Embodiment 1.

FIG. 38 is a flowchart indicating inverse binarization processing of the first portion corresponding to the frequency transform coefficient information in the first decoding operation performed by decoder 200 according to Embodiment 1. In other words, FIG. 38 indicates a specific example of inverse binarization processing of the first portion corresponding to the frequency transform coefficient information (S712) in FIG. 37.

When arithmetic decoding is applied to a binary data string (Yes in S721), circuitry 260 inverse binarizes the first portion in which frequency transform coefficient information has been binarized, according to a first inverse binarization format (S722). When arithmetic decoding is not applied to a binary data string (No in S721), circuitry 260 inverse binarizes the first portion in which frequency transform coefficient information has been binarized, according to a second inverse binarization format (S723).

Circuitry 260 then inverse binarizes the first portion in which frequency transform coefficient information has been binarized according to an inverse binarization format which generates a smaller number of bits when arithmetic decoding is not applied to the binary data string than when arithmetic decoding is applied to the binary data string. In this way, decoder 200 is capable of assisting reduction in coding amount of the frequency transform coefficient information when arithmetic decoding is not applied.

[An Example of a Second Decoding Operation Performed by the Decoder]

Figure 39:
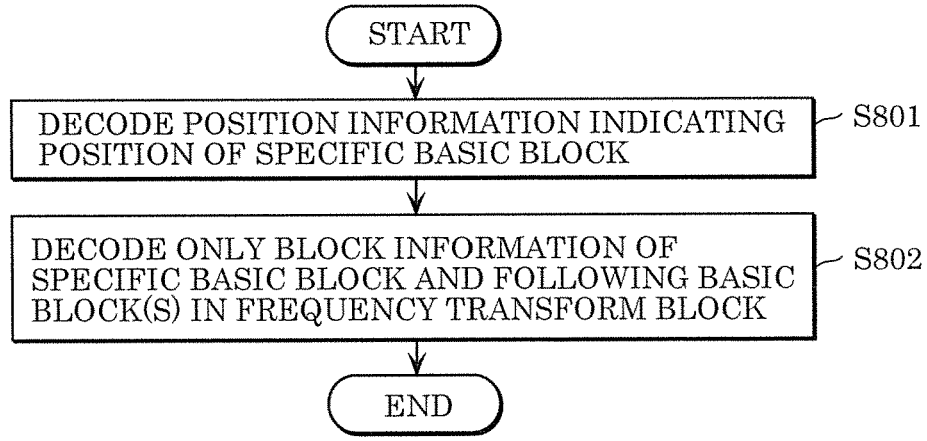
FIG. 39 is a flowchart indicating an example of a second decoding operation performed by the decoder according to Embodiment 1.

FIG. 39 is a flowchart indicating an example of a second decoding operation performed by decoder 200 according to Embodiment 1. For example, circuitry 260 of decoder 200 illustrated in FIG. 35 decodes image information by performing the operation indicated in FIG. 39.

Specifically, circuitry 260 decodes position information indicating the position of a specific basic block (S801). The specific basic block is a basic block including a non-zero coefficient first in the scan order in the one or more basic blocks which constitute the frequency transform block including a plurality of frequency transform coefficients, as one of the plurality of frequency transform coefficients.

Circuitry 260 decodes only block information indicating the plurality of frequency transform coefficients which constitute each of basic blocks which are the specific basic block and the following basic block(s) in the predetermined scan order out of the one or more basic blocks which constitute the frequency transform block (S802).

In this way, decoder 200 is capable of decoding the position information and the block information as the frequency transform coefficient information. Since decoder 200 decodes the block information of each of the specific basic block and the following basic block(s) in the predetermined scan order, decoder 200 is capable of assisting reduction in the coding amount of the frequency transform coefficient information.

It is to be noted that circuitry 260 may decode the position information only when the number of the one or more basic blocks which constitute a frequency transform block is two or more. In this way, when, for example, the size of the frequency transform block and the size of each basic block is the same, decoder 200 is capable of assisting further reduction in coding amount of the frequency transform coefficient information.

In addition, circuitry 260 may decode position information and block information only when a specific basic block is present in a frequency transform block. In this way, when, for example, the frequency transform block does not include any non-zero coefficient, decoder 200 is capable of assisting further reduction in coding amount of the frequency transform coefficient information.

In addition, circuitry 260 may obtain a bitstream in which image information has been encoded and decode the image information, in the same manner as in the example of the first encoding operation. For example, as in FIG. 36, circuitry 260 obtains the bitstream including the binary data string in which the image information has been binarized (S701). Circuitry 260 then switches whether or not to apply arithmetic decoding to the binary data string included in the bitstream (S702).

When arithmetic decoding is applied to the binary data string (Yes in S702), circuitry 260 decodes the image information by applying arithmetic decoding to the binary data string and inverse binarizing the binary data string to which arithmetic decoding has been applied (S703). When arithmetic decoding is not applied to the binary data string (No in S702), circuitry 260 decodes the image information by skipping applying arithmetic decoding to the binary data sting and inverse binarizing the binary data string to which arithmetic decoding has not been applied (S704).

In addition, as in FIG. 37, circuitry 260 inverse binarizes a second portion according to an inverse binarization format which is common between when arithmetic decoding is applied to the binary data string and when arithmetic decoding is not applied to the binary data string (S711). The second portion of the binary data string is a portion in which the information other than the frequency transform coefficient information has been binarized. The other information includes, for example, a part or the entirety of prediction parameter information.

In addition, circuitry 260 inverse binarizes the first portion according to inverse binarization formats which are different between when arithmetic decoding is applied to the binary data string and when arithmetic decoding is not applied to the binary data string (S712). The first portion of the binary data string is a portion in which the frequency transform coefficient information has been binarized.

In addition, when arithmetic decoding is not applied to the binary data string, circuitry 260 decodes the position information and the block information by inverse binarizing the first portion in which the frequency transform coefficient information including the position information and the block information. Here, the block information which is decoded is the block information of the specific basic block and the following basic block(s) in the predetermined scan order. In this way, decoder 200 is capable of assisting reduction in coding amount of the frequency transform coefficient information when arithmetic decoding is not applied.

[An Example of a Third Decoding Operation Performed by the Decoder]

Figure 40:
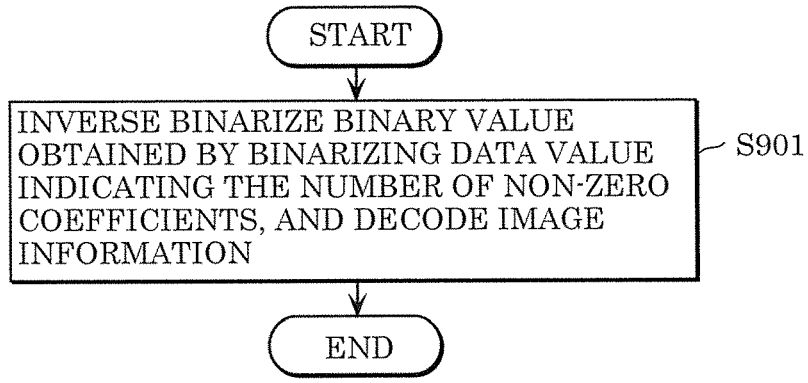
FIG. 40 is a flowchart indicating an example of a third decoding operation performed by the decoder according to Embodiment 1.
Figure 43:
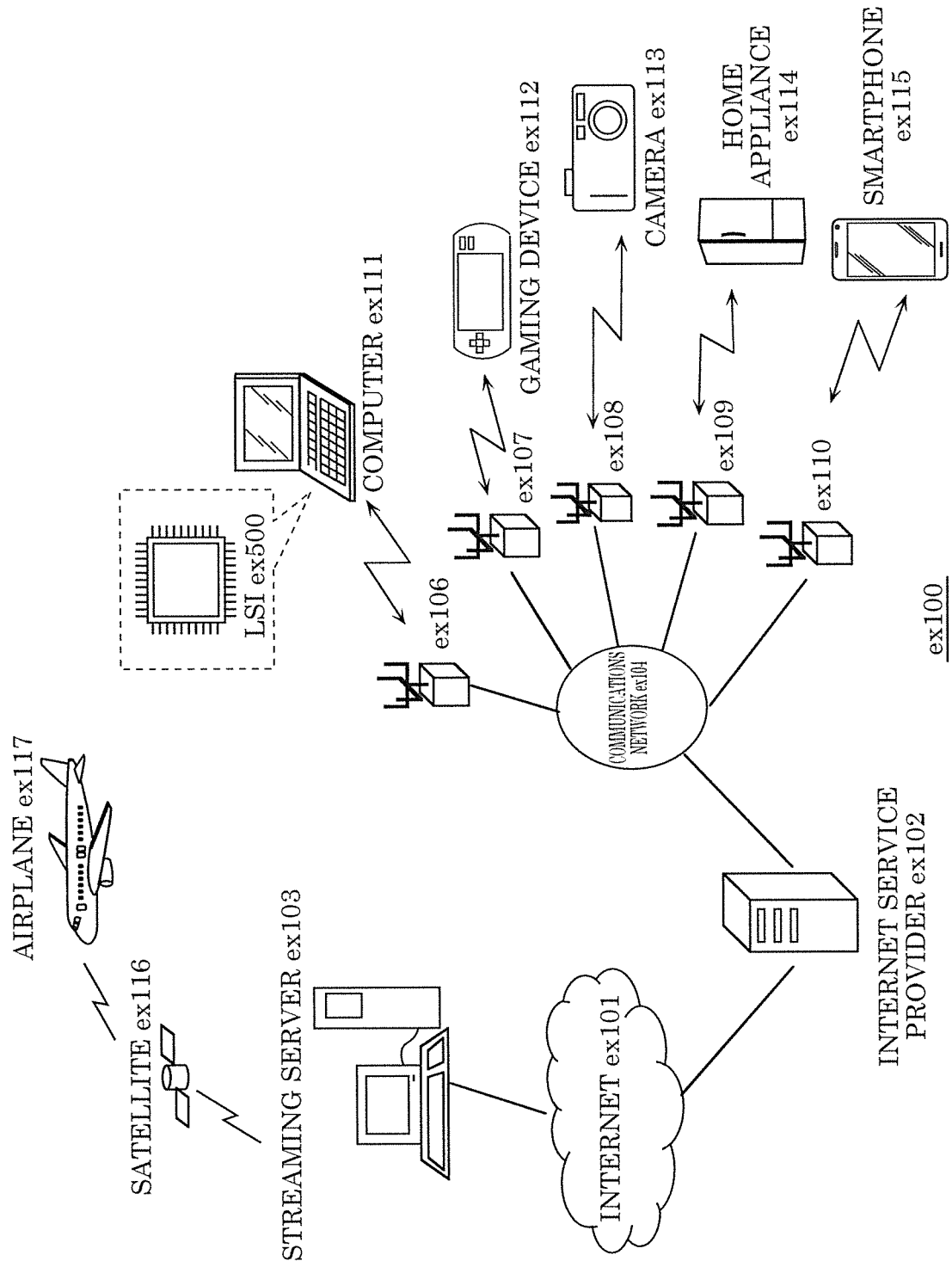
FIG. 43 illustrates an overall configuration of a content providing system for implementing a content distribution service.

FIG. 40 is a flowchart indicating an example of a third decoding operation performed by decoder 200 according to Embodiment 1. For example, circuitry 260 of decoder 200 illustrated in FIG. 35 decodes image information by performing the operation indicated in FIG. 40.

Specifically, circuitry 260 inverse binarizes the binary values obtained by binarizing a plurality of data values each indicating the number of non-zero coefficients included in the current basic block, according to a conversion table in which the plurality of data values and a plurality of binary values are associated with each other. Circuitry 260 then decodes the image information including the data values (S901). Here, the current basic block is one of the one or more basic blocks which constitute the frequency transform block including the plurality of frequency transform coefficients.

In this way, decoder 200 is capable of appropriately decoding significant information which is used for efficient representation of the plurality of frequency transform coefficients which constitute the basic block.

FIG. 41 is a flowchart indicating inverse binarization processing in the example of the third decoding operation performed by decoder 200 according to Embodiment 1. In other words, FIG. 41 indicates a specific example of inverse binarization processing in FIG. 40.

Circuitry 260 selects a conversion table from a plurality of tables including a first table which includes association with a data value indicating 0 as the number of non-zero coefficients and a second table which does not include any association with a data value indicating 0 as the number of non-zero coefficients (S911). Circuitry 260 then binarizes the binary values according to the selected conversion table (S912).

In this way decoder 200 is capable of using the table having a reduced information amount as the conversion table for inverse binarization. In this way decoder 200 is capable of assisting reduction in coding amount of the frequency transform coefficient information.

Circuitry 260 may inverse binarize only the binary values obtained by binarizing the data values each indicating the number of non-zero coefficients included in each of the specific basic block and the following basic block(s) in the predetermined scan order out of the one or more basic blocks which constitute the frequency transform block. In other words, circuitry 260 may inverse binarize the binary values obtained by binarizing the data values each indicating the number of non-zero coefficients of each of the specific basic block and the following basic block(s) in the predetermined scan order, as the binary values obtained by binarizing the data values each indicating the number of non-zero coefficients of a current basic block.

In this way, decoder 200 is capable of assisting reduction in coding amount of the frequency transform coefficient information. It is to be noted that the specific basic block is a basic block including a non-zero coefficient first in the scan order which is defined in a descending order of frequencies in the one or more basic blocks which constitute the frequency transform block including a plurality of frequency transform coefficients, as one of the plurality of frequency transform coefficients.

In addition, circuitry 260 may inverse binarize the binary values obtained by binarizing the data values each indicating the number of non-zero coefficients of the current basic block only when a specific basic block is included in the one or more basic blocks which constitute the frequency transform block. When the frequency transform block and the current basic block are the same, circuitry 260 may then select, as the conversion table, the second table which does not include any association with a data value indicating 0 as the number of non-zero coefficients.

In this way, when, for example, the size of the frequency transform block and the size of each basic block are the same, decoder 200 is capable of assisting further reduction in coding amount of the frequency transform coefficient information, using the second table which does not include any association with a data value indicating 0 as the number of non-zero coefficients.

In addition, when the current basic block is a specific basic block, circuitry 260 may select the second table which does not include any association with a data value indicating 0 as the number of non-zero coefficients, as the conversion table.

In this way, when, for example, the current basic block is a specific basic block, decoder 200 is capable of assisting further reduction in coding amount of the frequency transform coefficient information, using the second table which does not include any association with a data value indicating 0 as the number of non-zero coefficients.

In addition, circuitry 260 may obtain a bitstream in which image information has been encoded and decode the image information, in the same manner as in the example of the first encoding operation. For example, as in FIG. 36, circuitry 260 obtains the bitstream including the binary data string in which the image information has been binarized (S701). Circuitry 260 then switches whether or not to apply arithmetic decoding to the binary data string included in the bitstream (S702).

When arithmetic decoding is applied to the binary data string (Yes in S702), circuitry 260 decodes the image information by applying arithmetic decoding to the binary data string and inverse binarizing the binary data string to which arithmetic decoding has been applied (S703). When arithmetic decoding is not applied to the binary data string (No in S702), circuitry 260 decodes the image information by skipping applying arithmetic decoding to the binary data sting and inverse binarizing the binary data string to which arithmetic decoding has not been applied (S704).

In addition, as in FIG. 37, circuitry 260 inverse binarizes a second portion according to an inverse binarization format which is common between when arithmetic decoding is applied to the binary data string and when arithmetic decoding is not applied to the binary data string (S711). The second portion of the binary data string is a portion in which the information other than the frequency transform coefficient information has been binarized. The other information includes, for example, a part or the entirety of prediction parameter information.

In addition, circuitry 260 inverse binarizes the first portion according to inverse binarization formats which are different between when arithmetic decoding is applied to the binary data string and when arithmetic decoding is not applied to the binary data string (S712). The first portion of the binary data string is a portion in which the frequency transform coefficient information has been binarized.

In addition, when arithmetic decoding is not applied to the binary data string, circuitry 260 inverse binarizes the binary values included in the first portion in which frequency transform coefficient information has been binarized, according to the conversion table selected from the plurality of tables including the first table and the second table. Here, the first table includes association with a data value indicating 0 as the number of non-zero coefficients, and the second table does not include any association with a data value indicating 0 as the number of non-zero coefficients.

In this way, when arithmetic decoding is not applied, decoder 200 is capable of assisting reduction in coding amount of the frequency transform coefficient information, using the conversion table selected from the plurality of tables including the second table which does not include any association with a data value indicating 0 as the number of non-zero coefficients.

[An Example of a Fourth Decoding Operation Performed by the Decoder]

In the example of the fourth decoding operation, a data value indicating the number of non-zero coefficients is inverse binarized as in the case of the example of the third decoding operation indicated in FIG. 40. Specifically, circuitry 260 inverse binarizes the binary values obtained by binarizing a plurality of data values each indicating the number of non-zero coefficients included in the current basic block, according to a conversion table in which the plurality of data values and a plurality of binary values are associated with each other (S901).

FIG. 42 is a flowchart indicating inverse binarization processing in the example of the fourth decoding operation performed by decoder 200 according to Embodiment 1. In other words, FIG. 42 indicates a specific example of inverse binarization processing in FIG. 40.

Circuitry 260 selects a conversion table from a plurality of tables according to the position of a current basic block in a current frequency transform block (S961). The current frequency transform block is a frequency transform block including the current basic block. The plurality of tables include two or more tables which differ from each other in difference between a longest bit length and a shortest bit length of a plurality of binary values associated with a plurality of data values. Circuitry 260 then inverse binarizes the binary values according to the selected conversion table (S962).

In this way, decoder 200 is capable of selecting the conversion table for inverse binarizing the data value indicating the number of non-zero coefficients, according to the position of the current basic block. The characteristics of the number of non-zero coefficients differ depending on the position of the current basic block. Accordingly, decoder 200 is capable of reflecting the characteristics of the number of non-zero coefficients in the selection of the conversion table, using the position of the current basic block.

Accordingly, decoder 200 is capable of appropriately selecting the conversion table, and assisting reduction in coding amount of the frequency transform coefficient information.

When a preceding basic block has the same frequency level as the frequency level at the position of the current basic block, circuitry 260 may select the conversion table, according to the position of the current basic block and the number of non-zero coefficients included in the preceding basic block.

Here, the preceding basic block is a basic block located before the current basic block in a predetermined scan order defined in a descending order of frequencies in the one or more basic blocks which constitute the current frequency transform block. In addition, the frequency level at the position of the current basic block is a frequency level corresponding to the position of the current basic block.

In this way, decoder 200 is capable of selecting the conversion table according to the non-zero coefficients of the preceding basic block which is estimated to have a similar number of non-zero coefficients with respect to the number of non-zero coefficients of the current basic block.

In addition, when the preceding basic block has the same frequency level as the frequency level at the position of the current basic block and the number of non-zero coefficients included in the preceding basic block is a first number, circuitry 260 may select the first table as the conversion table. When the preceding basic block has the same frequency level as the frequency level at the position of the current basic block and the number of non-zero coefficients included in the preceding basic block is a second number, circuitry 260 may select the second table as the conversion table.

Here, the second number is larger than the first number. In addition, the difference between the longest bit length and the shortest bit length of a plurality of binary values in the second table is smaller than the difference between the longest bit length and the shortest bit length of a plurality of binary values in the first table. In other words, when the number of non-zero coefficients included in the preceding basic block is large, circuitry 260 may select, as the conversion table, the table in which the difference between the longest bit length and the shortest bit length of a plurality of binary values is small.

In this way, when the number of non-zero coefficients of the current basic block is estimated to be large according to the number of non-zero coefficients of the preceding basic block, decoder 200 is capable of selecting the table in which the difference in bit length is small as the conversion table, and assisting reduction in increase in coding amount.

In addition, for example, no preceding basic block may be present at the same frequency level as the frequency level at the position of the current basic block, and a specific basic block may be present at a frequency level higher than the frequency level at the position of the current basic block. Here, the specific basic block is a basic block including the non-zero coefficient first in the predetermined scan order. In this case, circuitry 260 may select, as the conversion table, the table in which the difference between the longest bit length and the shortest bit length is smaller than a predetermined difference from the plurality of tables.

In this way, when the number of non-zero coefficients is estimated to be large according to the relationship between the current basic block and the specific basic block, decoder 200 is capable of selecting the table in which the difference in bit length is small as the conversion table, and assisting reduction in increase in coding amount. The predetermined difference is not limited to a fixed value, and may be determined relatively, for example, similarly to the difference between the longest bit length and the shortest bit length in the table having the second smallest difference in bit length among the plurality of tables.

Specifically, in the above case, circuitry 260 may select, as the conversion table, the table in which the difference between the longest bit length and the shortest bit length is the smallest among the plurality of tables. In this way, when the number of non-zero coefficients is estimated to be large according to the relationship between the current basic block and the specific basic block, decoder 200 is capable of selecting the table in which the difference in bit length is small as the conversion table, and assisting reduction in increase in coding amount.

In addition, for example, no preceding basic block may be present at the same frequency level as the frequency level at the position of the current basic block, and a specific basic block may be present at a frequency level higher than the frequency level at the position of the current basic block. In this case, circuitry 260 may select the conversion table according to the number of non-zero coefficients estimated to be the number of non-zero coefficients based on a neighboring frequency transform block which is a frequency transform block located around the current frequency transform block.

In this way, decoder 200 is capable of selecting the conversion table using the neighboring frequency transform block which is estimated to have a similar number of non-zero coefficients with respect to the number of non-zero coefficients of the current basic block.

In addition, in the above case, circuitry 260 may select the first table when the number of non-zero coefficients estimated based on the neighboring frequency transform block is the first number, and the second table when the number of non-zero coefficients estimated based on the neighboring frequency transform block is the second number. Here, the second number is larger than the first number. In addition, the difference between the longest bit length and the shortest bit length of a plurality of binary values in the second table is smaller than the difference between the longest bit length and the shortest bit length of a plurality of binary values in the first table.

In other words, when the number of non-zero coefficients estimated based on the neighboring frequency transform block is large, circuitry 260 may select, as the conversion table, the table in which the difference between the longest bit length and the shortest bit length of a plurality of binary values is small. In this way, when the number of non-zero coefficients of the current basic block is estimated to be large according to the neighboring frequency transform block, decoder 200 is capable of selecting the table in which the difference in bit length is small as the conversion table, and assisting reduction in increase in coding amount.

In addition, the neighboring frequency transform block may be a frequency transform block adjacent to the left of or above the current frequency transform block. In this way, decoder 200 is capable of predicting the number of non-zero coefficients at high accuracy according to the number of non-zero coefficients included in the frequency transform block close to the current frequency transform block.

Alternatively, the neighboring frequency transform block may be a frequency transform block which has been decoded immediately before the current frequency transform block. This enables simple prediction of the number of non-zero coefficients and reduction in memory capacity for storing information related to the number of non-zero coefficients.

Alternatively, the neighboring frequency transform block may be a frequency transform block which is located within a predetermined range from the current frequency transform block and whose coding mode which is one of an inter prediction mode and an intra prediction mode is the same as that of the current frequency transform block. In this way, decoder 200 is capable of predicting the number of non-zero coefficients at high accuracy according to the frequency transform block whose tendency of occurrence of non-zero coefficients is estimated to be similar to that of the current frequency transform block.

In addition, the number of non-zero coefficients included in the current basic block may be estimated based on the number of non-zero coefficients included in one of the one or more basic blocks included in the neighboring frequency transform block. The one basic block is a basic block whose position relative to the neighboring frequency transform block is equivalent to the position of the current basic block relative to the current frequency transform block.

In this way, decoder 200 is capable of selecting a conversion table according to the basic block estimated to have approximately the same number of non-zero coefficients as that of the current basic block, from the one or more basic blocks of the neighboring frequency transform block.

Alternatively the number of non-zero coefficients estimated based on the neighboring frequency transform block may be estimated based on the number of non-zero coefficients included in the entirety of the neighboring frequency transform block. In this way, the information is integrated regardless of the sizes of frequency transform blocks. This enables simple prediction of the number of non-zero coefficients and reduction in memory capacity for storing information related to the number of non-zero coefficients.

As described above, for example, no preceding basic block may be present at the same frequency level as the frequency level at the position of the current basic block, and no specific basic block may be present at a frequency level higher than the frequency level at the position of the current basic block. In this case, circuitry 260 may select a conversion table according to whether the coding mode of the current basic block is the inter prediction mode or the intra prediction mode.

In this way, decoder 200 is capable of selecting the conversion table according to the coding mode which is the inter prediction mode or the intra prediction mode. The characteristics of the number of non-zero coefficients are estimated to be different depending on the coding mode. Accordingly, decoder 200 is capable of reflecting the characteristics of the number of non-zero coefficients in the selection of the conversion table, using the coding mode. Accordingly, decoder 200 is capable of appropriately selecting the conversion table, and assisting reduction in coding amount of the frequency transform coefficient information.

In addition, in the above case, circuitry 260 may select the first table when the coding mode is the inter prediction mode, and select the second table when the coding mode is the intra prediction mode. Here, the difference between the longest bit length and the shortest bit length of a plurality of binary values in the second table is smaller than the difference between the longest bit length and the shortest bit length of a plurality of binary values in the first table.

In other words, when the coding mode is the intra prediction mode, circuitry 260 may select, as the conversion table, the table having the small difference between the longest bit length and the shortest bit length of the plurality of binary values. In this way decoder 200 is capable of selecting the table having the small difference in bit length as the conversion table when the coding mode is the intra prediction mode in which the prediction accuracy is low and the number of non-zero coefficients is large, thereby assisting reduction in increase in coding amount.

As described above, for example, no preceding basic block may be present at the same frequency level as the frequency level at the position of the current basic block, and no specific basic block may be present at a frequency level higher than the frequency level at the position of the current basic block. In this case, circuitry 260 may select a conversion table according to a quantization parameter which is used to decode a current basic block.

In this way, decoder 200 is capable of selecting the conversion table according to the quantization parameter which is used to decode the current basic block. The characteristics of the number of non-zero coefficients are estimated to be different depending on the quantization parameter. Accordingly decoder 200 is capable of reflecting the characteristic of the number of non-zero coefficients in the selection of the conversion table, using the quantization parameter. Accordingly, decoder 200 is capable of appropriately selecting the conversion table, and assisting reduction in coding amount of the frequency transform coefficient information.

In addition, in the above case, circuitry 260 may select the first table when the quantization parameter is a first value, and select the second table when the quantization parameter is a second value. Here, the second value is smaller than the first value. In addition, the difference between the longest bit length and the shortest bit length of a plurality of binary values in the second table is smaller than the difference between the longest bit length and the shortest bit length of a plurality of binary values in the first table.

In other words, when the quantization parameter is small, circuitry 260 may select, as the conversion table, the table having the small difference between the longest bit length and the shortest bit length of the plurality of binary values. In this way, decoder 200 is capable of selecting the table having the small difference in bit length as the conversion table when the quantization parameter is small and thus the number of non-zero coefficients is large, thereby assisting reduction in increase in coding amount.

In addition, circuitry 260 may obtain a bitstream in which image information has been encoded and decode the image information, in the same manner as in the example of the first decoding operation. For example, as in FIG. 36, circuitry 260 obtains the bitstream including the binary data string in which the image information has been binarized (S701). Circuitry 260 then switches whether or not to apply arithmetic decoding to the binary data string included in the bitstream (S702).

When arithmetic decoding is applied to the binary data string (Yes in S702), circuitry 260 decodes the image information by applying arithmetic decoding to the binary data string and inverse binarizing the binary data string to which arithmetic decoding has been applied (S703). When arithmetic decoding is not applied to the binary data string (No in S702), circuitry 260 decodes the image information by skipping applying arithmetic decoding to the binary data sting and inverse binarizing the binary data string to which arithmetic decoding has not been applied (S704).

In addition, as in FIG. 37, circuitry 260 inverse binarizes a second portion according to an inverse binarization format which is common between when arithmetic decoding is applied to the binary data string and when arithmetic decoding is not applied to the binary data string (S711). The second portion of the binary data string is a portion in which the information other than the frequency transform coefficient information has been binarized. The other information includes, for example, a part or the entirety of prediction parameter information.

In addition, circuitry 260 inverse binarizes the first portion according to inverse binarization formats which are different between when arithmetic decoding is applied to the binary data string and when arithmetic decoding is not applied to the binary data string (S712). The first portion of the binary data string is a portion in which the frequency transform coefficient information included in the binary data string has been binarized.

In addition, when arithmetic decoding is not applied to the binary data string, circuitry 260 inverse binarizes the binary values included in the first portion in which the frequency transform coefficients have been binarized, according to the conversion table selected from the plurality of tables according to the position of the current basic block. In this way, when arithmetic decoding is not applied, decoder 200 is capable of assisting reduction in coding amount of frequency transform coefficient information, using the conversion table which is selected from the plurality of tables according to the position of the current basic block.

It is to be noted that the difference between a longest bit length and a shortest bit length more corresponds to the ratio of the bit length of the binary value associated with the data values each indicating the number of non-zero coefficients of a current basic block, as the number of non-zero coefficients of the current basic block increases. Accordingly, the difference between a longest bit length and a shortest bit length may be replaced with the ratio of the bit length of the binary value associated with the data values each indicating the number of non-zero coefficients of the current basic block, as the number of non-zero coefficients of the current basic block increases.

For example, the ratio is 0 or larger. In the table having the ratio of 0, the bit length of the binary value associated with the data values each indicating the number of non-zero coefficients of the current block does not increase even when the number of non-zero coefficients of the current basic block increases. Accordingly, the difference between a longest bit length and a shortest bit length may be replaced with the ratio of the bit length of binary value associated with the data values each indicating the number of non-zero coefficients of the current basic block, as the number of non-zero coefficients of the current basic block increases.

[Supplements]

Encoder 100 and decoder 200 can be used as an image encoder and an image decoder, respectively. Alternatively, encoder 100 and decoder 200 can be used as an entropy encoder and an entropy decoder, respectively. In other words, encoder 100 and decoder 200 may correspond only to entropy encoder 110 and entropy decoder 202, respectively.

In addition, in each of the above embodiments, each of the constituent elements may be configured as exclusive hardware or may be implemented by executing a software program suitable for the constituent element. Each constituent element may be implemented by means of a program executing unit such as a CPU and a processor reading and executing a software program stored in a recording medium that is a hard disc, a semiconductor memory, or the like.

More specifically, each of encoder 100 and decoder 200 may include processing circuitry and storage which is electrically connected to the processing circuitry and accessible from the processing circuitry. For example, the processing circuitry corresponds to circuitry 160 or 260, and the storage corresponds to memory 162 or 262.

The processing circuitry includes at least one of the exclusive hardware and the program executing unit, and executes the processing using the storage. In addition, when the processing circuitry includes the program executing unit, the storage stores a software program which is executed by the program executing unit.

Here, the software for implementing encoder 100, decoder 200, or the like according to this embodiment includes programs as indicated below.

The program is a program causing a computer to execute an encoding method for encoding image information and outputting a bitstream in which the image information has been encoded, the encoding method including: binarizing the image information; switching whether or not to apply arithmetic encoding to a binary data string in which the image information has been binarized; when arithmetic encoding is applied to the binary data string, applying arithmetic encoding to the binary data string, and outputting the bitstream which includes the binary data string to which arithmetic encoding has been applied; when arithmetic encoding is not applied to the binary data string, skipping applying arithmetic encoding to the binary data string, and outputting the bitstream which includes the binary data string to which arithmetic encoding has not been applied; in the binarizing of the image information, binarizing frequency transform coefficient information which is related to frequency components of an image and included in the image information, according to different binarization formats between when arithmetic encoding is applied to the binary data string and when arithmetic encoding is not applied to the binary data string; and in the binarizing of the image information, binarizing a part or an entirety of prediction parameter information which is related to prediction methods of the image and included in the image information, according to a common binarization format between when arithmetic encoding is applied to the binary data string and when arithmetic encoding is not applied to the binary data string.

Alternatively, the program is a program causing a computer to execute a decoding method for obtaining a bitstream in which image information has been encoded and decoding the image information, the decoding method including: obtaining the bitstream which includes a binary data string in which the image information has been binarized; switching whether or not to apply arithmetic decoding to the binary data string included in the bitstream; when arithmetic decoding is applied to the binary data string, applying arithmetic decoding to the binary data string, and inverse binarizing the binary data string to which arithmetic decoding has been applied, to decode the image information; when arithmetic decoding is not applied to the binary data string, skipping applying arithmetic decoding to the binary data string, and inverse binarizing the binary data string to which arithmetic decoding has not been applied, to decode the image information; in the inverse binarizing of the binary data string, inverse binarizing a first portion which is included in the binary data string and in which frequency transform coefficient information related to frequency components of an image has been binarized, according to different inverse binarization formats between when arithmetic decoding is applied to the binary data string and when arithmetic decoding is not applied to the binary data string; and in the inverse binarizing of the binary data string, inverse binarizing a second portion which is included in the binary data string and in which a part or an entirety of prediction parameter information related to prediction methods of an image has been binarized, according to a common inverse binarization format between when arithmetic decoding is applied to the binary data string and when arithmetic decoding is not applied to the binary data string.

Alternatively, the program is a program causing a computer to execute an encoding method for encoding image information, the encoding method including: encoding position information indicating a position of a specific basic block which is a basic block including a non-zero coefficient first in a predetermined scan order defined in a descending order of frequencies of one or more basic blocks included in a frequency transform block composed of a plurality of frequency transform coefficients; and encoding only block information indicating a plurality of frequency transform coefficients of each of the specific basic block and a following basic block in the predetermined scan order.

Alternatively, the program is a program causing a computer to execute a decoding method for decoding image information, the decoding method including: decoding position information indicating a position of a specific basic block which is a basic block including a non-zero coefficient first in a predetermined scan order defined in a descending order of frequencies of one or more basic blocks included in a frequency transform block composed of a plurality of frequency transform coefficients; and decoding only block information indicating a plurality of frequency transform coefficients of each of the specific basic block and a following basic block in the predetermined scan order.

Alternatively, the program is a program causing a computer to execute an encoding method for encoding image information, the encoding method including: binarizing a data value indicating the number of non-zero coefficients included in a current basic block which is one of one or more basic blocks in a frequency transform block composed of a plurality of frequency transform coefficients, according to a conversion table in which a plurality of data values and a plurality of binary values are associated with each other, to encode the image information which includes the data value; and in the binarizing of the data value, selecting the conversion table from a plurality of tables including a first table which includes association with a data value indicating 0 as the number of non-zero coefficients and a second table which does not include association with a data value indicating 0 as the number of non-zero coefficients, and binarizing the data value according to the conversion table selected.

Alternatively, the program is a program causing a computer to execute a decoding method for decoding image information, the decoding method including: inverse binarizing a binary value which has been obtained by binarizing a data value according to a conversion table in which a plurality of data values and a plurality of binary values are associated with each other, to decode the image information which includes the data value, the data value indicating the number of non-zero coefficients included in a current basic block which is one of one or more basic blocks in a frequency transform block composed of a plurality of frequency transform coefficients; and in the inverse binarizing of the data value, selecting the conversion table from a plurality of tables including a first table which includes association with a data value indicating 0 as the number of non-zero coefficients and a second table which does not include association with a data value indicating 0 as the number of non-zero coefficients, and inverse binarizing the binary value according to the conversion table selected.

Alternatively, the program is a program causing a computer to execute an encoding method for encoding image information, the encoding method including: binarizing a data value indicating the number of non-zero coefficients included in a current basic block which is one of one or more basic blocks in a frequency transform block composed of a plurality of frequency transform coefficients, according to a conversion table in which a plurality of data values and a plurality of binary values are associated with each other, to encode the image information which includes the data value; and in the binarizing of the data value, selecting the conversion table from a plurality of tables including two or more tables which differ from each other in difference between a longest bit length and a shortest bit length of a plurality of binary values associated with the plurality of data values, according to a position of the current basic block in the current frequency transform block which is the frequency transform block including the current basic block, and binarizing the data value.

Alternatively, the program is a program causing a computer to execute a decoding method for decoding image information, the decoding method including: inverse binarizing a binary value which has been obtained by binarizing a data value, according to a conversion table in which a plurality of data values and a plurality of binary values are associated with each other, to decode the image information which includes the data value, the data value indicating the number of non-zero coefficients included in a current basic block which is one of one or more basic blocks in a frequency transform block composed of a plurality of frequency transform coefficients; and in the inverse binarizing of the binary value, selecting the conversion table from a plurality of tables including two or more tables which differ from each other in difference between a longest bit length and a shortest bit length of a plurality of binary values associated with the plurality of data values, according to a position of the current basic block in the current frequency transform block which is the frequency transform block including the current basic block, and inverse binarizing the binary value according to the conversion table selected.

In addition, each of the constituent elements may be the circuitry as described above. The circuitry may be configured as a single circuit as a whole, or as separate circuits. In addition, each constituent element may be implemented as a general processor, or an exclusive processor.

In addition, the processing which is executed by a particular one of the constituent elements may be executed by another one of the constituent elements. In addition, the execution order of the processes may be modified, or two or more of the processes may be executed in parallel. In addition, an encoder and decoder may include encoder 100 and decoder 200.

The ordinal numbers such as first, second, etc. used for explanation may be arbitrarily replaced. In addition, an ordinal number may be newly added to a given one of the constituent elements, or the like, or the ordinal number of a given one of the constituent elements, or the like may be removed.

Encoder 100 and decoder 200 according to one or more aspects have been described above based on the embodiments, the present disclosure is not limited to these embodiments. The one or more aspects of the present disclosure may encompass embodiments obtainable by adding, to the embodiments, various kinds of modifications that a person skilled in the art would arrive at and embodiments configurable by combining constituent elements in different embodiments within the scope of the present disclosure.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoding/decoder that includes both the image encoder and the image decoder. Other configurations included in the system may be modified on a case-by-case basis.

Usage Examples

FIG. 29 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 44:
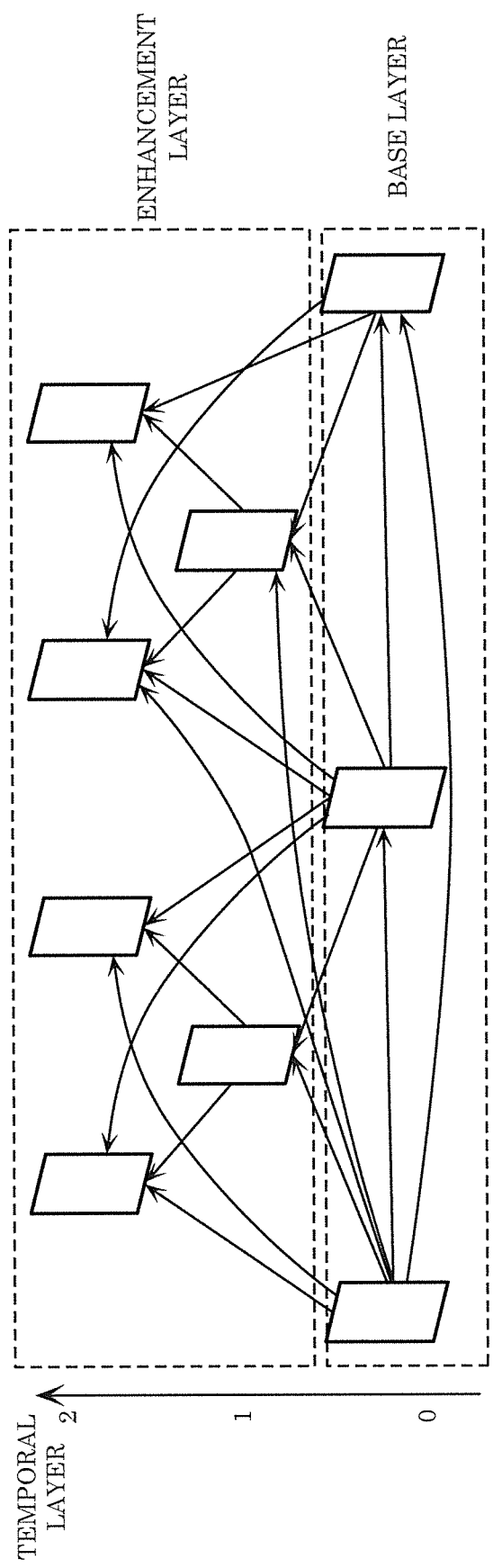
FIG. 44 illustrates one example of an encoding structure in scalable encoding.

The switching of content will be described with reference to a scalable stream, illustrated in FIG. 44, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 44. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 45:
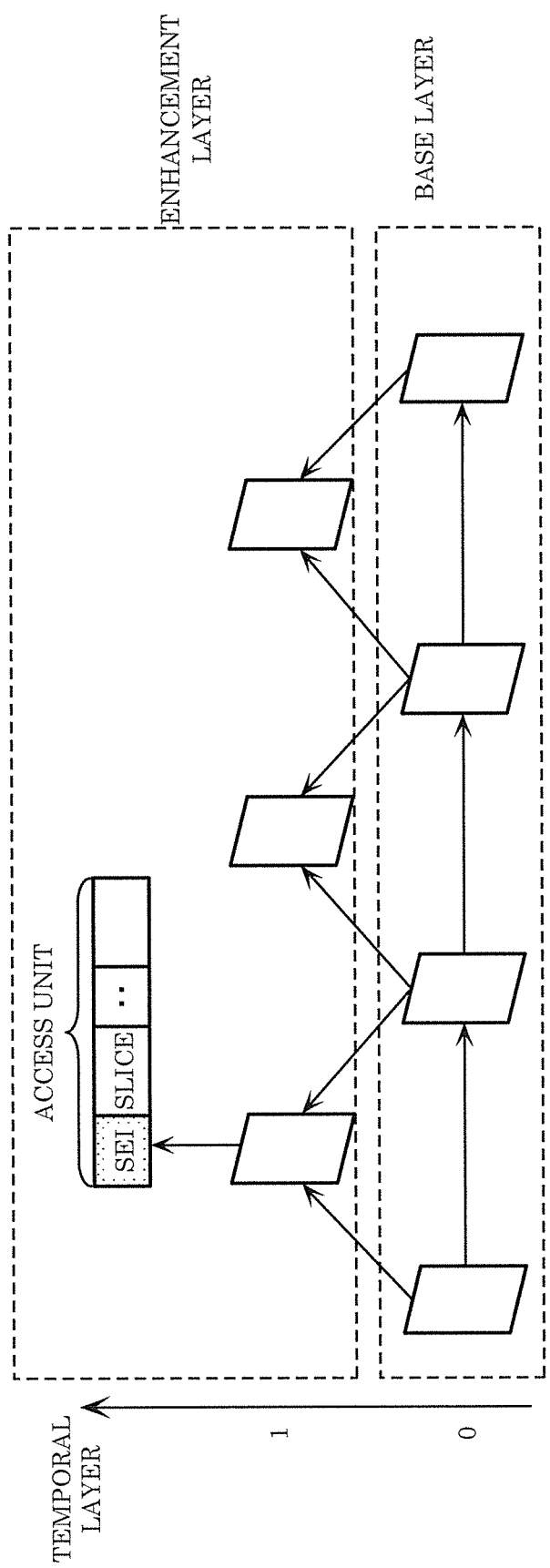
FIG. 45 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 45, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 46:
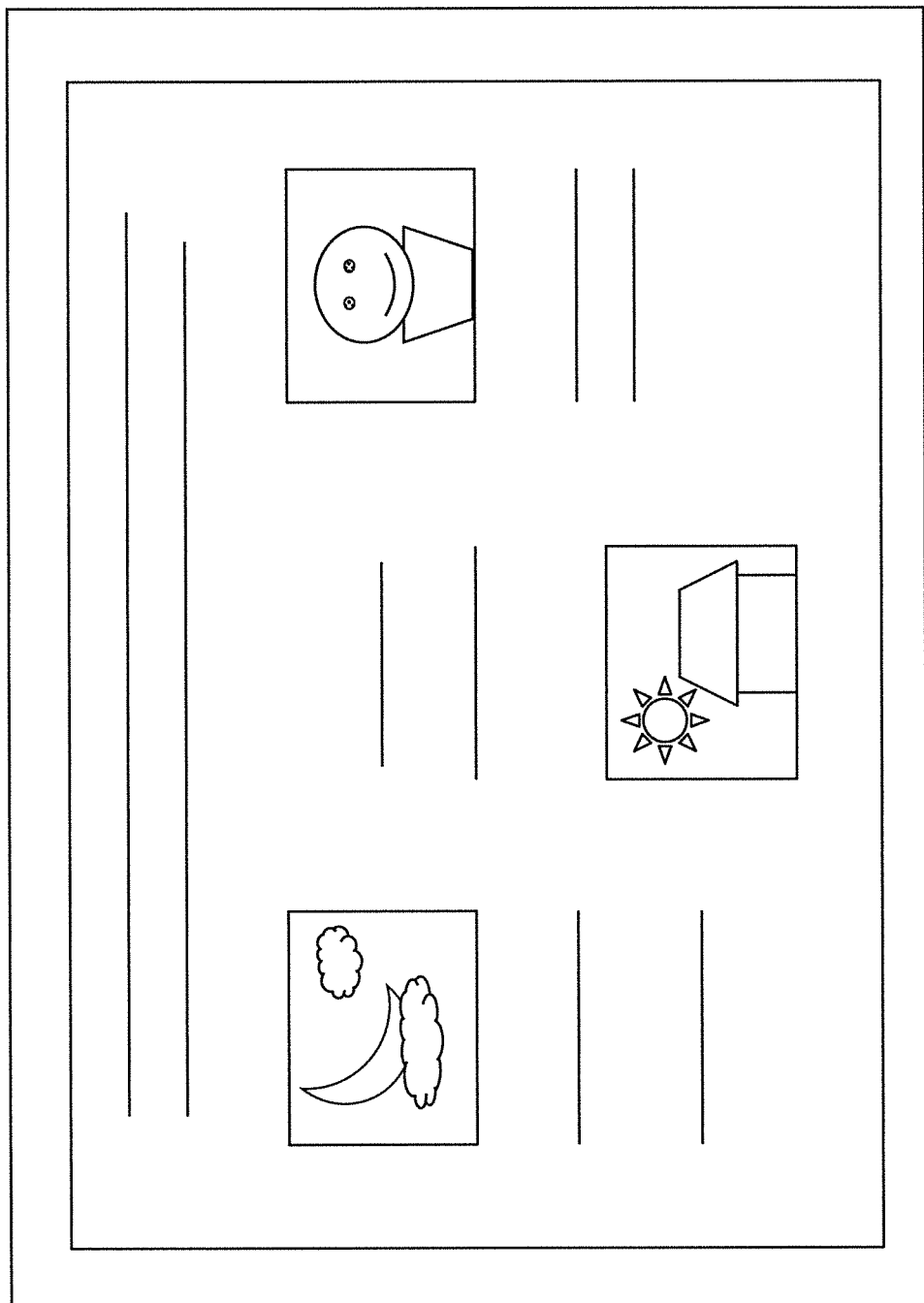
FIG. 46 illustrates an example of a display screen of a web page.
Figure 47:
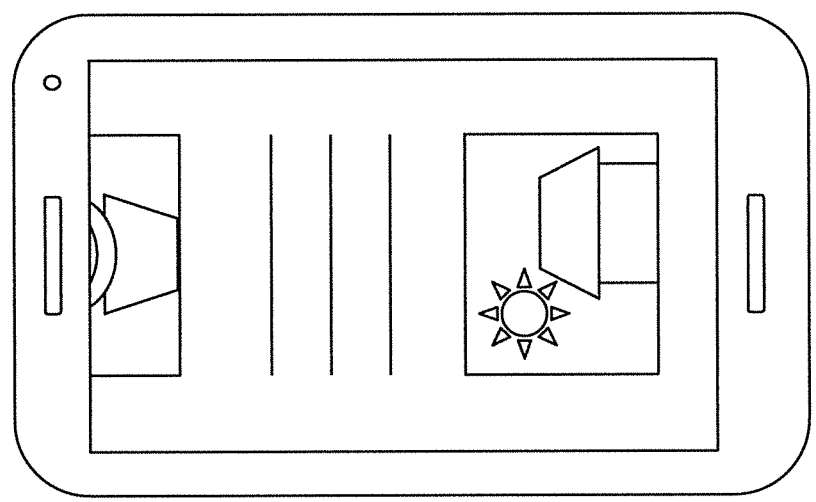
FIG. 47 illustrates an example of a display screen of a web page.

FIG. 46 illustrates an example of a display screen of a web page on, for example, computer ex111. FIG. 47 illustrates an example of a display screen of a web page on, for example, smartphone ex115. As illustrated in FIG. 46 and FIG. 47, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 48:
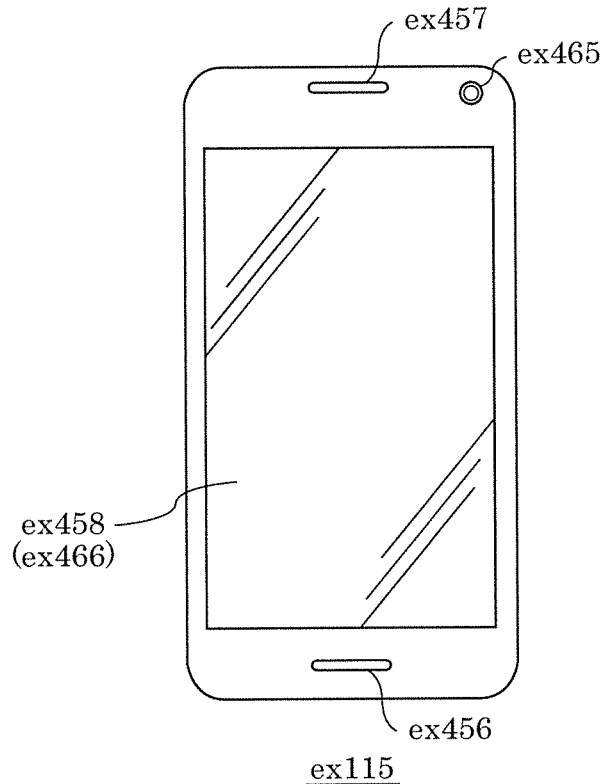
FIG. 48 illustrates one example of a smartphone.
Figure 49:
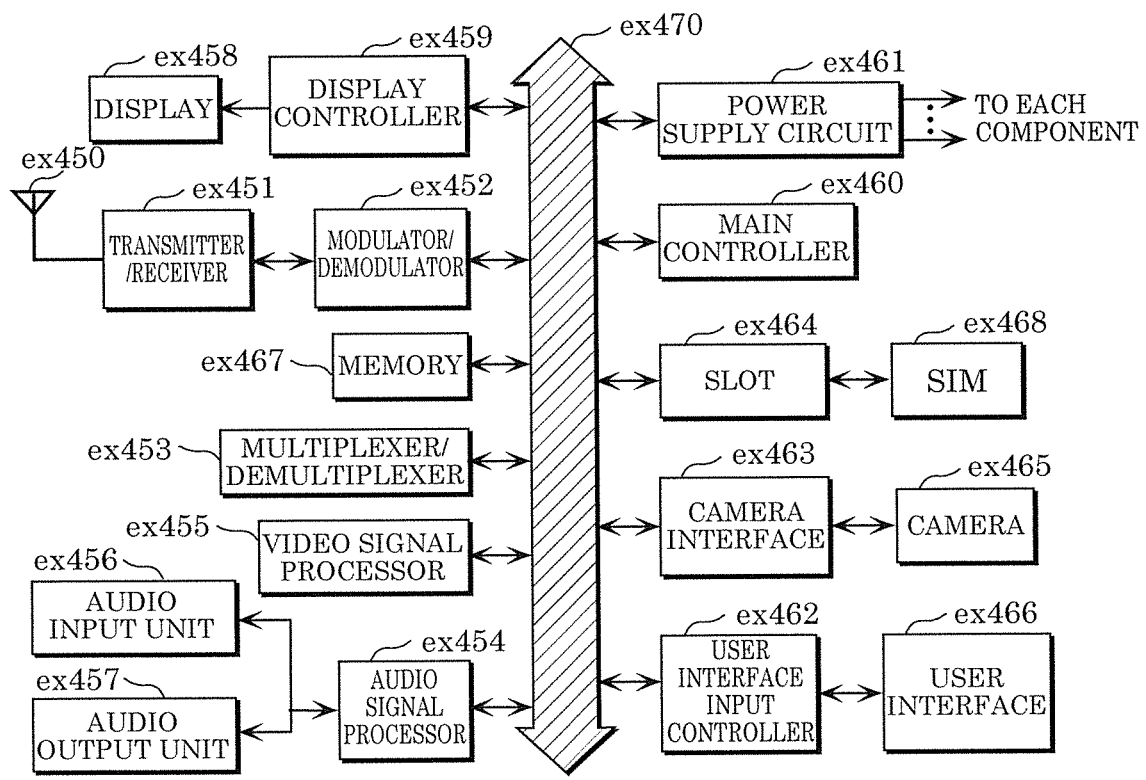
FIG. 49 is a block diagram illustrating a configuration example of a smartphone.

FIG. 48 illustrates smartphone ex115. FIG. 49 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced. i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconference systems, electronic mirrors, etc.

What is claimed is:

1. An encoder which encodes image information and outputs a bitstream in which the image information has been encoded, the encoder comprising:
   memory; and
   circuitry accessible to the memory,
   wherein the circuitry accessible to the memory:
   binarizes the image information;
   switches whether or not to apply arithmetic encoding to a binary data string in which the image information has been binarized;
   when arithmetic encoding is applied to the binary data string, applies arithmetic encoding to the binary data string, and outputs the bitstream which includes the binary data string to which arithmetic encoding has been applied;
   when arithmetic encoding is not applied to the binary data string, skips applying arithmetic encoding to the binary data string, and outputs the bitstream which includes the binary data string to which arithmetic encoding has not been applied;
   when binarizing the image information, binarizes frequency transform coefficient information which is related to frequency components of an image and included in the image information, according to different binarization formats between when arithmetic encoding is applied to the binary data string and when arithmetic encoding is not applied to the binary data string; and
   when binarizing the image information, binarizes a part or an entirety of prediction parameter information which is related to prediction methods of the image and included in the image information, according to a common binarization format between when arithmetic encoding is applied to the binary data string and when arithmetic encoding is not applied to the binary data string,
   wherein the circuitry binarizes at least one of the following kinds of information included in the prediction parameter information: information related to coding modes, information related to prediction directions in intra prediction, information related to reference pictures in inter prediction, and information related to motion vectors in inter prediction, according to the common binarization format between when arithmetic encoding is applied to the binary data string and when arithmetic encoding is not applied to the binary data string.

2. The encoder according to claim 1,
   wherein the circuitry binarizes the following kinds of information included in the prediction parameter information: information related to coding modes, information related to prediction directions in intra prediction, information related to reference pictures in inter prediction, and information related to motion vectors in inter prediction, according to the common binarization format between when arithmetic encoding is applied to the binary data string and when arithmetic encoding is not applied to the binary data string.

3. The encoder according to claim 1, wherein, when binarizing the image information, the circuitry binarizes only the frequency transform coefficient information in the image information according to the different binarization formats, and binarizes all information other than the frequency transform coefficient information in the image information according to the common binarization format.

4. The encoder according to claim 1, wherein, when binarizing the image information, the circuitry binarizes the frequency transform coefficient information according to a format which generates a smaller number of bits when arithmetic encoding is not applied to the binary data string than when arithmetic encoding is applied to the binary data string.

5. An encoding method for encoding image information and outputting a bitstream in which the image information has been encoded, the encoding method comprising:
  binarizing the image information;
  switching whether or not to apply arithmetic encoding to a binary data string in which the image information has been binarized;
  when arithmetic encoding is applied to the binary data string, applying arithmetic encoding to the binary data string, and outputting the bitstream which includes the binary data string to which arithmetic encoding has been applied;
  when arithmetic encoding is not applied to the binary data string, skipping applying arithmetic encoding to the binary data string, and outputting the bitstream which includes the binary data string to which arithmetic encoding has not been applied;
  in the binarizing of the image information, binarizing frequency transform coefficient information which is related to frequency components of an image and included in the image information, according to different binarization formats between when arithmetic encoding is applied to the binary data string and when arithmetic encoding is not applied to the binary data string; and
  in the binarizing of the image information, binarizing a part or an entirety of prediction parameter information which is related to prediction methods of the image and included in the image information, according to a common binarization format between when arithmetic encoding is applied to the binary data string and when arithmetic encoding is not applied to the binary data string,
  wherein the binarizing of the image information includes binarizing at least one of the following kinds of information included in the prediction parameter information: information related to coding modes, information related to prediction directions in intra prediction, information related to reference pictures in inter prediction, and information related to motion vectors in inter prediction, according to the common binarization format between when arithmetic encoding is applied to the binary data string and when arithmetic encoding is not applied to the binary data string.

* * * * *